(12) United States Patent
Landsman et al.

(10) Patent No.: US 6,880,123 B1
(45) Date of Patent: Apr. 12, 2005

(54) APPARATUS AND ACCOMPANYING METHODS FOR IMPLEMENTING A NETWORK DISTRIBUTION SERVER FOR USE IN PROVIDING INTERSTITIAL WEB ADVERTISEMENTS TO A CLIENT COMPUTER

(75) Inventors: Rick W. Landsman, Waccabuc, NY (US); Wei-Yeh Lee, New York, NY (US)

(73) Assignee: Unicast Communications Corporation, New York, NY (US)

( * ) Notice: Subject to any disclaimer, the term of this patent is extended or adjusted under 35 U.S.C. 154(b) by 0 days.

(21) Appl. No.: 09/351,857

(22) Filed: Jul. 13, 1999

Related U.S. Application Data

(60) Division of application No. 09/237,718, filed on Jan. 26, 1999, which is a continuation-in-part of application No. 09/080,165, filed on May 15, 1998, now abandoned.

(51) Int. Cl.[7] .............................................. G06F 17/30
(52) U.S. Cl. .................................... 715/500.1; 709/217
(58) Field of Search .......................... 715/500.1, 501.1, 715/513, 515; 709/217, 203, 202, 219

(56) References Cited

U.S. PATENT DOCUMENTS

| | | | |
|---|---|---|---|
| 4,575,579 A | 3/1986 | Simon et al. ................... | 178/4 |
| 4,719,567 A | 1/1988 | Whittington et al. ........ | 364/200 |

(Continued)

FOREIGN PATENT DOCUMENTS

| | | |
|---|---|---|
| EP | 0 818 742 | 1/1998 |
| EP | 0 822 535 A2 | 2/1998 |

(Continued)

OTHER PUBLICATIONS

U.S. Appl. No. 09/951,001, filed Sep. 13, 2001, Landsman et al.

(Continued)

Primary Examiner—Sanjiv Shah
(74) Attorney, Agent, or Firm—Michaelson & Associates; Peter L. Michaelson

(57) ABSTRACT

A technique for implementing in a networked client-server environment, e.g., the Internet, network-distributed advertising in which advertisements are downloaded, from an advertising server to a browser executing at a client computer, in a manner transparent to a user situated at the browser, and subsequently displayed, by that browser on an interstitial basis, in response to a click-stream generated by the user to move from one web page to the next. Specifically, an HTML advertising tag is embedded into a referring web page. This tag contains two components. One component effectively downloads, from an distribution web server and to an extent necessary, and then persistently instantiates an agent at the client browser. This agent "politely" and transparently downloads advertising files (media and where necessary player files), originating from an ad management system residing on a third-party advertising web server, for a given advertisement into browser cache and subsequently plays those media files through the browser on an interstitial basis and in response to a user click-stream. The other component is a reference, in terms of a web address, of the advertising management system. This latter reference totally "decouples" advertising content from a web page such that a web page, rather than embedding actual advertising content within the page itself, merely includes an advertising tag that refers, via a URL, to a specific ad management system rather than to a particular advertisement or its content. The ad management system selects the given advertisement that is to be downloaded, rather than having that selection or its content being embedded in the web content page.

52 Claims, 26 Drawing Sheets

U.S. PATENT DOCUMENTS

| | | | |
|---|---|---|---|
| 4,775,935 A | 10/1988 | Yourick | 364/401 |
| 4,782,449 A | 11/1988 | Brinker et al. | 364/473 |
| 4,799,146 A | 1/1989 | Chauvel | 364/200 |
| 4,850,007 A | 7/1989 | Marino et al. | 379/67 |
| 5,027,400 A | 6/1991 | Baji et al. | 380/20 |
| 5,029,104 A | 7/1991 | Dodson et al. | 364/514 |
| 5,093,718 A | 3/1992 | Hoarty et al. | 358/84 |
| 5,099,420 A | 3/1992 | Barlow et al. | 395/325 |
| 5,105,184 A | 4/1992 | Pirani et al. | 340/721 |
| 5,159,669 A | 10/1992 | Trigg et al. | 395/159 |
| 5,165,012 A | 11/1992 | Crandall et al. | 395/100 |
| 5,220,420 A | 6/1993 | Hoarty et al. | 358/86 |
| 5,220,516 A | 6/1993 | Dodson et al. | 364/514 |
| 5,220,564 A | 6/1993 | Tuch et al. | 370/94.1 |
| 5,253,341 A | 10/1993 | Rozmanith et al. | 395/200 |
| 5,268,963 A | 12/1993 | Monroe et al. | 380/23 |
| 5,283,639 A | 2/1994 | Esch et al. | 348/6 |
| 5,283,731 A | 2/1994 | Lalonde et al. | 364/401 |
| 5,285,442 A | 2/1994 | Iwamura et al. | 370/17 |
| 5,297,249 A | 3/1994 | Bernstein et al. | 395/156 |
| 5,305,195 A | 4/1994 | Murphy | 364/401 |
| 5,307,456 A | 4/1994 | MacKay | 395/154 |
| 5,313,455 A | 5/1994 | van der Wal et al. | 370/13 |
| 5,319,455 A | 6/1994 | Hoarty et al. | 348/7 |
| 5,321,740 A | 6/1994 | Gregorek et al. | 379/96 |
| 5,325,423 A | 6/1994 | Lewis | 379/90 |
| 5,325,483 A | 6/1994 | Ise et al. | 395/162 |
| 5,327,554 A | 7/1994 | Palazzi et al. | 395/600 |
| 5,333,237 A | 7/1994 | Stefanopoulos et al. | 395/12 |
| 5,347,632 A | 9/1994 | Filepp et al. | |
| 5,355,472 A | 10/1994 | Lewis | 395/600 |
| 5,355,501 A | 10/1994 | Gross et al. | 395/750 |
| 5,361,091 A | 11/1994 | Hoarty et al. | 348/7 |
| 5,361,199 A | 11/1994 | Shoquist et al. | 364/401 |
| 5,361,393 A | 11/1994 | Rossillo | 395/650 |
| 5,367,621 A | 11/1994 | Cohen et al. | 395/154 |
| 5,392,447 A | 2/1995 | Schlack et al. | 395/800 |
| 5,412,720 A | 5/1995 | Hoarty | 380/15 |
| 5,418,549 A | 5/1995 | Anderson et al. | 345/145 |
| 5,438,518 A | 8/1995 | Bianco et al. | 364/460 |
| 5,442,771 A | 8/1995 | Filepp et al. | 395/650 |
| 5,483,466 A | 1/1996 | Kawahara et al. | 364/514 C |
| 5,491,785 A | 2/1996 | Robson et al. | 395/162 |
| 5,500,890 A | 3/1996 | Rogge et al. | 379/91 |
| 5,515,098 A | 5/1996 | Carles | 348/8 |
| 5,515,270 A | 5/1996 | Weinblatt | 364/405 |
| 5,515,490 A | 5/1996 | Buchanan et al. | 395/154 |
| 5,524,195 A | 6/1996 | Clanton, III et al. | 395/155 |
| 5,524,197 A | 6/1996 | Uya et al. | 395/157 |
| 5,530,472 A | 6/1996 | Bregman et al. | 348/15 |
| 5,532,735 A | 7/1996 | Blahut et al. | 348/13 |
| 5,541,986 A | 7/1996 | Hou | 379/201 |
| 5,548,745 A | 8/1996 | Egan et al. | 395/500 |
| 5,563,804 A | 10/1996 | Mortensen et al. | 364/514 A |
| 5,564,043 A | 10/1996 | Siefert | 395/600 |
| 5,572,643 A | 11/1996 | Judson | |
| 5,579,381 A | 11/1996 | Courville et al. | 379/201 |
| 5,583,560 A | 12/1996 | Florin et al. | 348/7 |
| 5,590,046 A | 12/1996 | Anderson et al. | 3654/474.13 |
| 5,594,509 A | 1/1997 | Florin et al. | 348/731 |
| 5,594,779 A | 1/1997 | Goodman | 379/59 |
| 5,596,718 A | 1/1997 | Boebert et al. | 395/187.01 |
| 5,602,905 A | 2/1997 | Mettke | 379/96 |
| 5,606,359 A | 2/1997 | Youden et al. | 348/7 |
| 5,615,131 A | 3/1997 | Mortensen et al. | 364/514 A |
| 5,621,456 A | 4/1997 | Florin et al. | 348/7 |
| 5,629,978 A | 5/1997 | Blumhardt et al. | 379/201 |
| 5,630,081 A | 5/1997 | Rybicki et al. | 395/348 |
| 5,635,979 A | 6/1997 | Kostreski et al. | 348/13 |
| 5,657,450 A | 8/1997 | Rao et al. | 395/610 |
| 5,664,948 A | 9/1997 | Dimitriadis et al. | 434/307 R |
| 5,701,451 A | 12/1997 | Rogers et al. | 395/600 |
| 5,706,502 A | 1/1998 | Foley et al. | 395/610 |
| 5,710,918 A | 1/1998 | Lagarde et al. | 395/610 |
| 5,717,860 A | 2/1998 | Graber et al. | 395/200.12 |
| 5,721,827 A | 2/1998 | Logan et al. | 395/200.47 |
| 5,724,521 A | 3/1998 | Dedrick | 395/226 |
| 5,737,619 A | 4/1998 | Judson | |
| 5,737,739 A | 4/1998 | Shirley et al. | 707/512 |
| 5,740,549 A | 4/1998 | Reilly et al. | 705/14 |
| 5,742,768 A | 4/1998 | Gennaro et al. | 295/200.33 |
| 5,754,830 A | 5/1998 | Butts et al. | 395/500 |
| 5,761,601 A | 6/1998 | Nemirofsky et al. | 455/3.1 |
| 5,768,508 A | 6/1998 | Eikeland | 395/200.32 |
| 5,781,894 A | 7/1998 | Petrecca et al. | |
| 5,787,254 A | 7/1998 | Maddalozzo, Jr. et al. | 395/200.58 |
| 5,794,210 A | 8/1998 | Goldhaber et al. | 705/14 |
| 5,796,952 A | 8/1998 | Davis et al. | 395/200.54 |
| 5,805,815 A | 9/1998 | Hill | 395/200.48 |
| 5,809,242 A | 9/1998 | Shaw et al. | 395/200.47 |
| 5,809,481 A | 9/1998 | Baron et al. | 705/14 |
| 5,838,458 A | 11/1998 | Tsai | 358/402 |
| 5,854,897 A * | 12/1998 | Radziewicz et al. | 709/224 |
| 5,864,823 A | 1/1999 | Levitan | 105/14 |
| 5,870,769 A | 2/1999 | Freund | 707/501 |
| 5,897,622 A | 4/1999 | Blinn et al. | 705/26 |
| 5,913,040 A * | 6/1999 | Rakavy et al. | 709/232 |
| 5,918,012 A | 6/1999 | Astiz et al. | 395/200.47 |
| 5,918,214 A | 6/1999 | Perkowski | 705/27 |
| 5,923,853 A | 7/1999 | Danneels | 395/200.68 |
| 5,931,907 A | 8/1999 | Davies et al. | 709/218 |
| 5,933,811 A * | 8/1999 | Angles et al. | 705/14 |
| 5,937,390 A | 8/1999 | Hyodo | 705/14 |
| 5,937,392 A | 8/1999 | Alberts | 705/14 |
| 5,937,411 A | 8/1999 | Becker | |
| 5,946,646 A | 8/1999 | Schena et al. | |
| 5,946,664 A | 8/1999 | Ebisawa | 705/14 |
| 5,946,697 A | 8/1999 | Shen | 707/104 |
| 5,948,061 A | 9/1999 | Merriman et al. | 709/219 |
| 5,956,716 A | 9/1999 | Kenner et al. | 707/10 |
| 5,960,409 A | 9/1999 | Wexler | 705/14 |
| 5,961,602 A | 10/1999 | Thompson et al. | 709/229 |
| 5,963,909 A | 10/1999 | Warren et al. | 705/1 |
| 5,978,841 A | 11/1999 | Berger | 709/217 |
| 5,978,842 A | 11/1999 | Noble et al. | 709/218 |
| 5,983,244 A | 11/1999 | Nation | 705/501 |
| 5,983,268 A | 11/1999 | Freivald et al. | 709/218 |
| 5,987,466 A | 11/1999 | Greer et al. | 707/10 |
| 5,991,799 A | 11/1999 | Yen et al. | 709/218 |
| 5,996,007 A | 11/1999 | Klug et al. | 709/218 |
| 5,999,740 A | 12/1999 | Rowley | |
| 5,999,912 A | 12/1999 | Wodarz et al. | 705/14 |
| 6,006,252 A | 12/1999 | Wolfe | |
| 6,009,410 A | 12/1999 | LeMole et al. | 705/14 |
| 6,011,537 A | 1/2000 | Slotznick | 345/115 |
| 6,012,083 A | 1/2000 | Savitzky et al. | |
| 6,014,698 A | 1/2000 | Griffiths | 709/224 |
| 6,035,332 A | 3/2000 | Ingrassia, Jr. et al. | |
| 6,047,318 A | 4/2000 | Becker et al. | |
| 6,061,659 A | 5/2000 | Murray | 705/14 |
| 6,091,411 A | 7/2000 | Straub et al. | |
| 6,092,196 A * | 7/2000 | Reiche | 713/200 |
| 6,094,677 A | 7/2000 | Capek et al. | |
| 6,098,065 A * | 8/2000 | Skillen et al. | 707/3 |
| 6,112,246 A | 8/2000 | Horbal et al. | |
| 6,119,165 A | 9/2000 | Li et al. | |
| 6,125,388 A | 9/2000 | Reisman | |
| 6,157,946 A | 12/2000 | Itakura et al. | 709/217 |
| 6,167,453 A | 12/2000 | Becker et al. | |
| 6,178,443 B1 * | 1/2001 | Lin | 709/208 |

| | | | |
|---|---|---|---|
| 6,185,586 B1 | 2/2001 | Judson | 707/513 |
| 6,275,854 B1 * | 8/2001 | Himmel et al. | 709/224 |
| 6,314,451 B1 | 11/2001 | Landsman et al. | 709/203 |
| 6,317,761 B1 | 11/2001 | Landsman et al. | 707/513 |
| 2002/0198778 A1 | 12/2002 | Landsman et al. | |
| 2003/0004804 A1 | 1/2003 | Landsman et al. | |
| 2003/0005000 A1 | 1/2003 | Landsman et al. | |
| 2003/0018885 A1 | 1/2003 | Landsman et al. | |
| 2003/0023488 A1 | 1/2003 | Landsman et al. | |
| 2003/0028565 A1 | 2/2003 | Landsman et al. | |

FOREIGN PATENT DOCUMENTS

| | | |
|---|---|---|
| EP | 0 903 903 A2 | 3/1999 |
| FR | 2784254 A | 4/2000 |
| JP | 09091215 A | 4/1997 |
| JP | 9-114781 | 5/1997 |
| JP | 10-312344 | 11/1998 |
| JP | 11-003072 | 1/1999 |
| JP | 11-154159 | 6/1999 |
| KR | 97-78058 | 12/1997 |
| WO | WO 96/30864 | 10/1996 |
| WO | WO 97/10502 | 4/1997 |
| WO | WO 97/21183 | 6/1997 |
| WO | WO 98/25198 | 6/1998 |
| WO | WO 99/09486 | 2/1999 |

OTHER PUBLICATIONS

U.S. Appl. No. 09/950,963, filed Sep. 13, 2001, Landsman et al.

U.S. Appl. No. 09/950,941, filed Sep. 13, 2001, Landsman et al.

U.S. Appl. No. 09/651,691, filed Jul. 13, 1999, Landsman et al.

U.S. Appl. No. 09/352,623, filed Jul. 13, 1999, Landsman et al.

U.S. Appl. No. 09/352,624, filed Jul. 13, 1999, Landsman et al.

U.S. Appl. No. 09/352,626, filed Jul. 13, 1999, Landsman et al.

U.S. Appl. No. 09/352,378, filed Jul. 13, 1999, Landsman et al.

U.S. appl. No. 09/237,718, filed Jan. 26, 1999, Landsman et al.

Kipp Cheng, "Rich Media Match for Unicast and Engage", Brandweek, Nov. 1, 1999, vol. 40, No. 41, p. 62 and following.

Cartellieri et al., "The Real Impact of Internet Advertising", McKinsey Quarterly 1997, 1997, vol. 3, p. 3 of reprint.

C. Taylor, "Going Beyond the Banner", *Adweek Marketing Week* (now *Brandweek*), Interactive Quarterly Section, Jul. 8, 1996, pp. 22 et seq (downloaded as six pages, specifically pp. 36–41).

J. Hodges, "Marketers play web games as serious biz", *Advertising Age*, Interactive Media and Marketing section, Mar. 14, 1996, one page.

"Web Ads Start To Click", *Business Week*, Oct. 6, 1997, pp. 128, 130–132, 134 and 138.

P. van der Linden, *Just Java 1.2—fourth Edition*, (© 1999, Sun Microsystems, Inc.), specifically Chapter 13, "All About Applets", pp. 322–346.

* cited by examiner

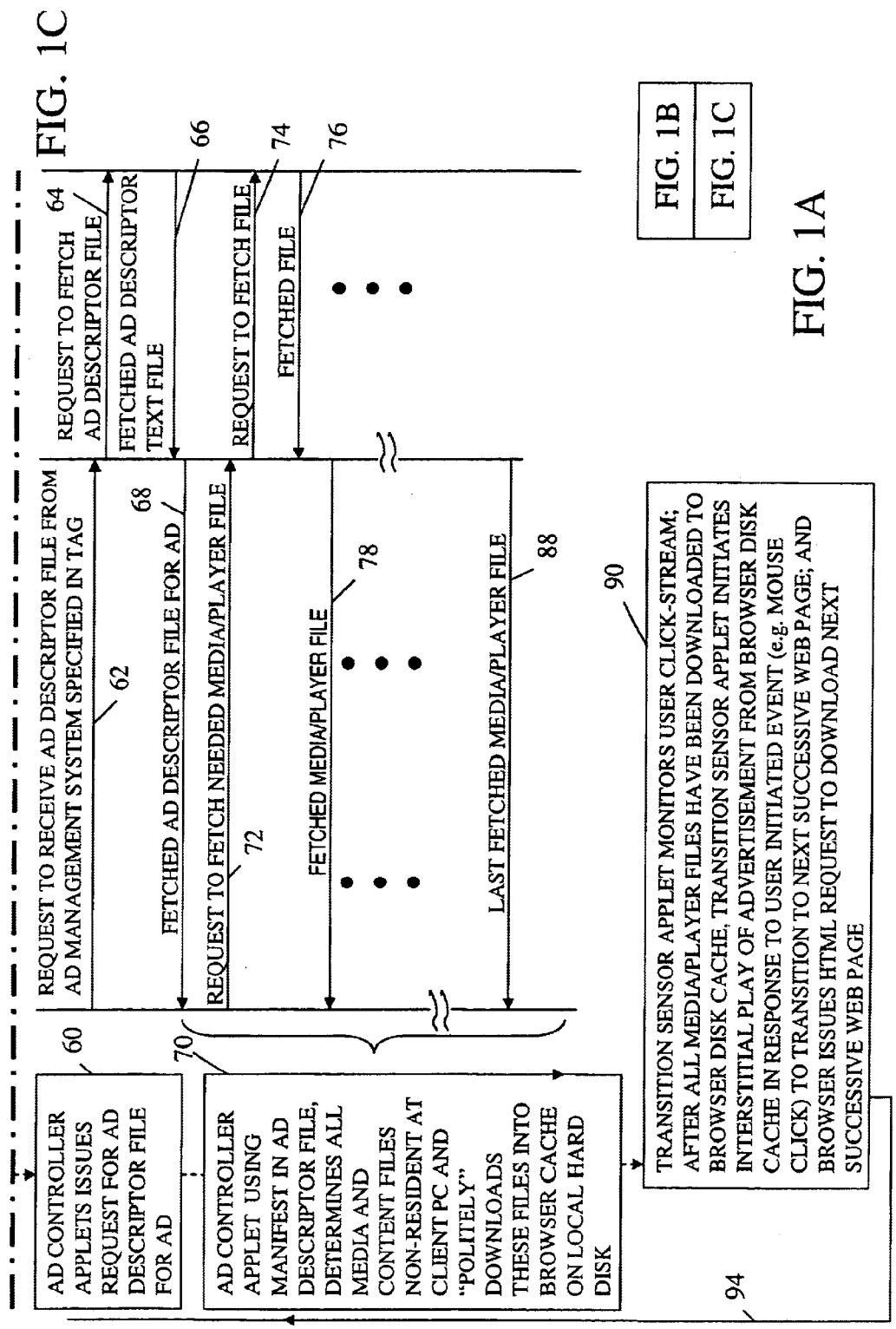

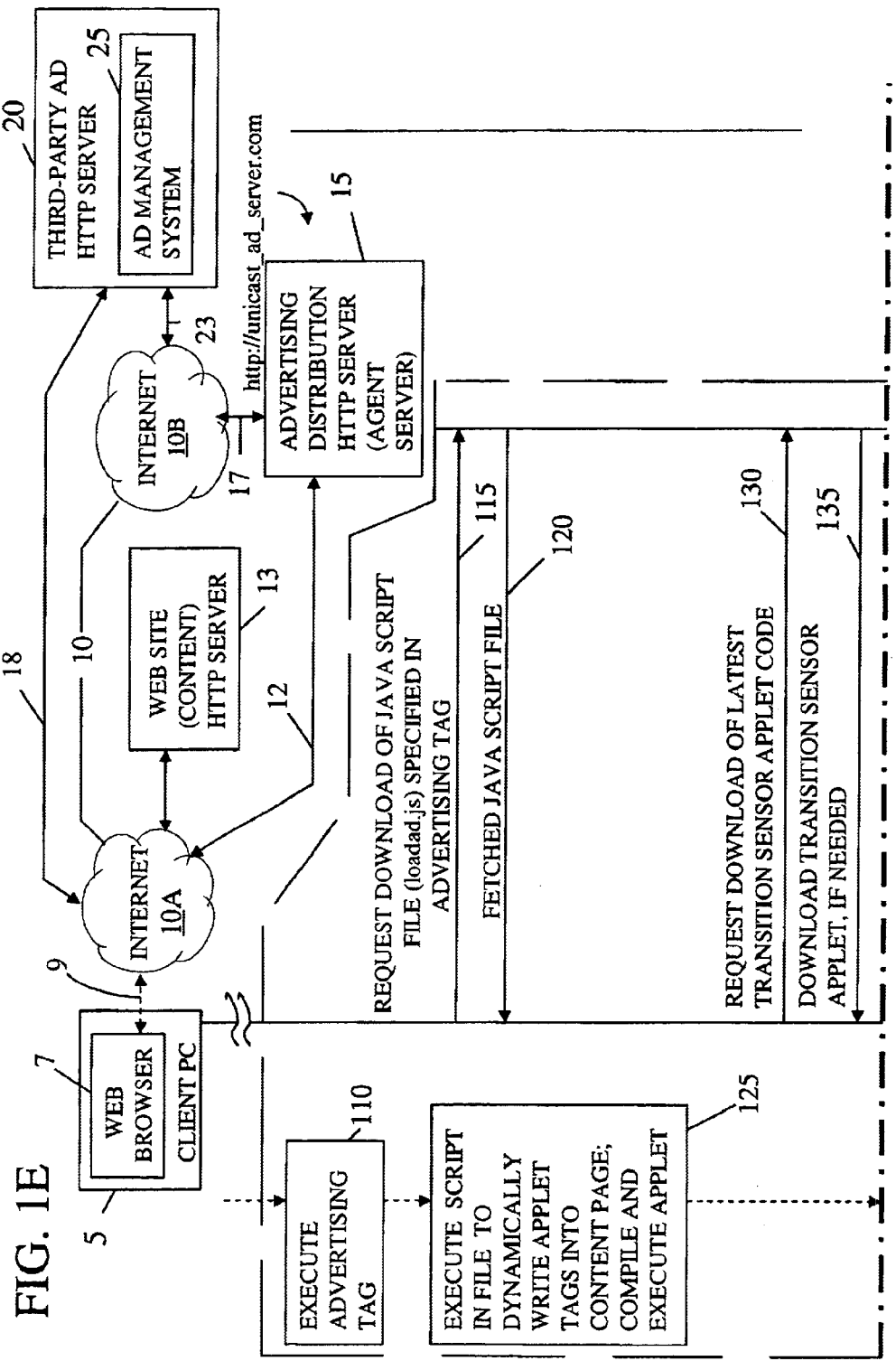

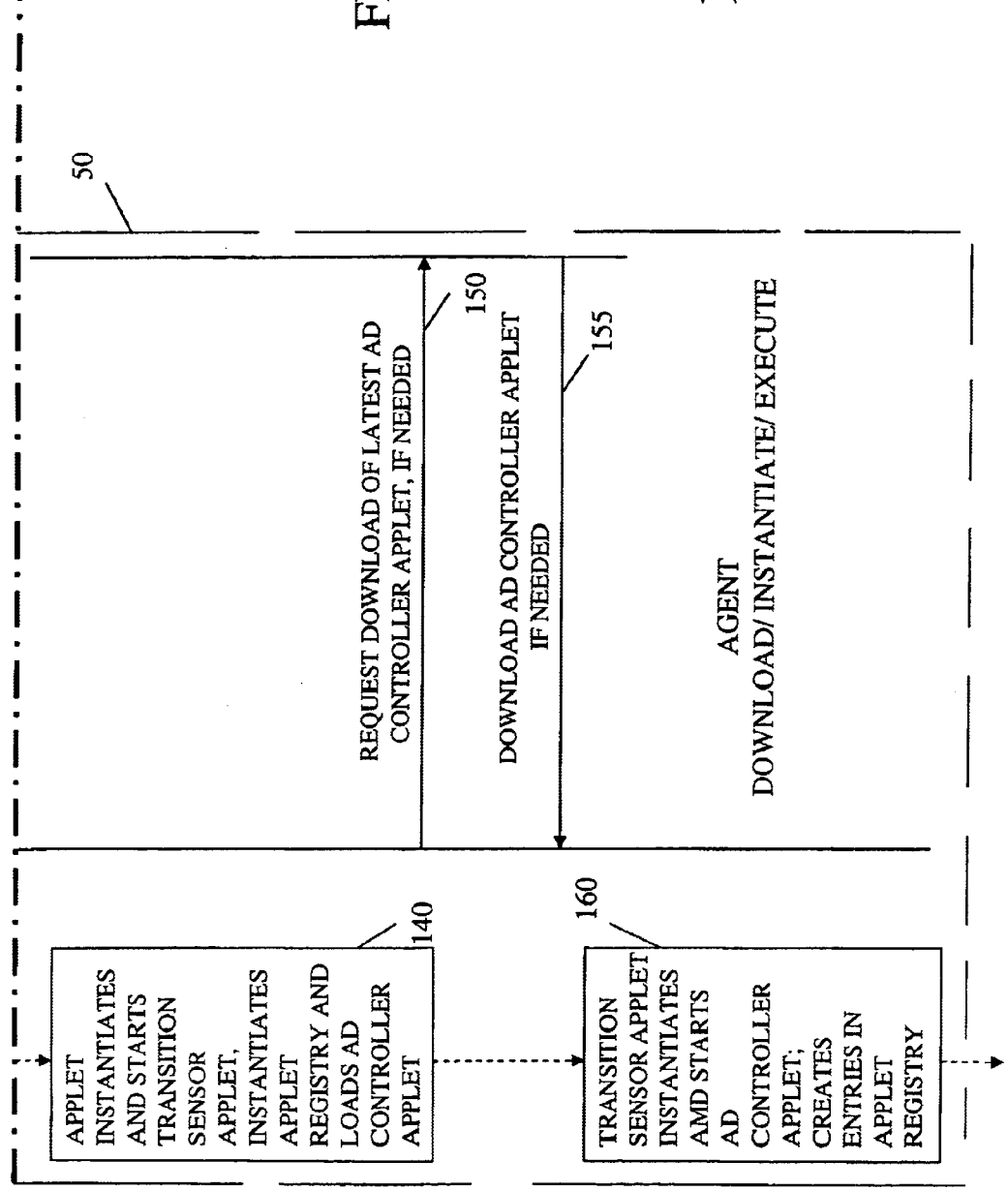

FIG. 2A

REFERRING CONTENTS PAGE — 35

```
<HTML>
<HEAD><TITLE>          <TITLE></HEAD>
<BODY>
```
} HTML CODE 35A

ADVERTISING TAG — 40

```
<SCRIPT>
SRC=http://unicast.com/loadad.js>AdServer="http://AdManagement_system"
</SCRIPT>
```
42, 44

} HTML CODE 35B

```
</BODY>
</HTML>
```

FIG. 2

| FIG. 2A | FIG. 2B |
|---------|---------|

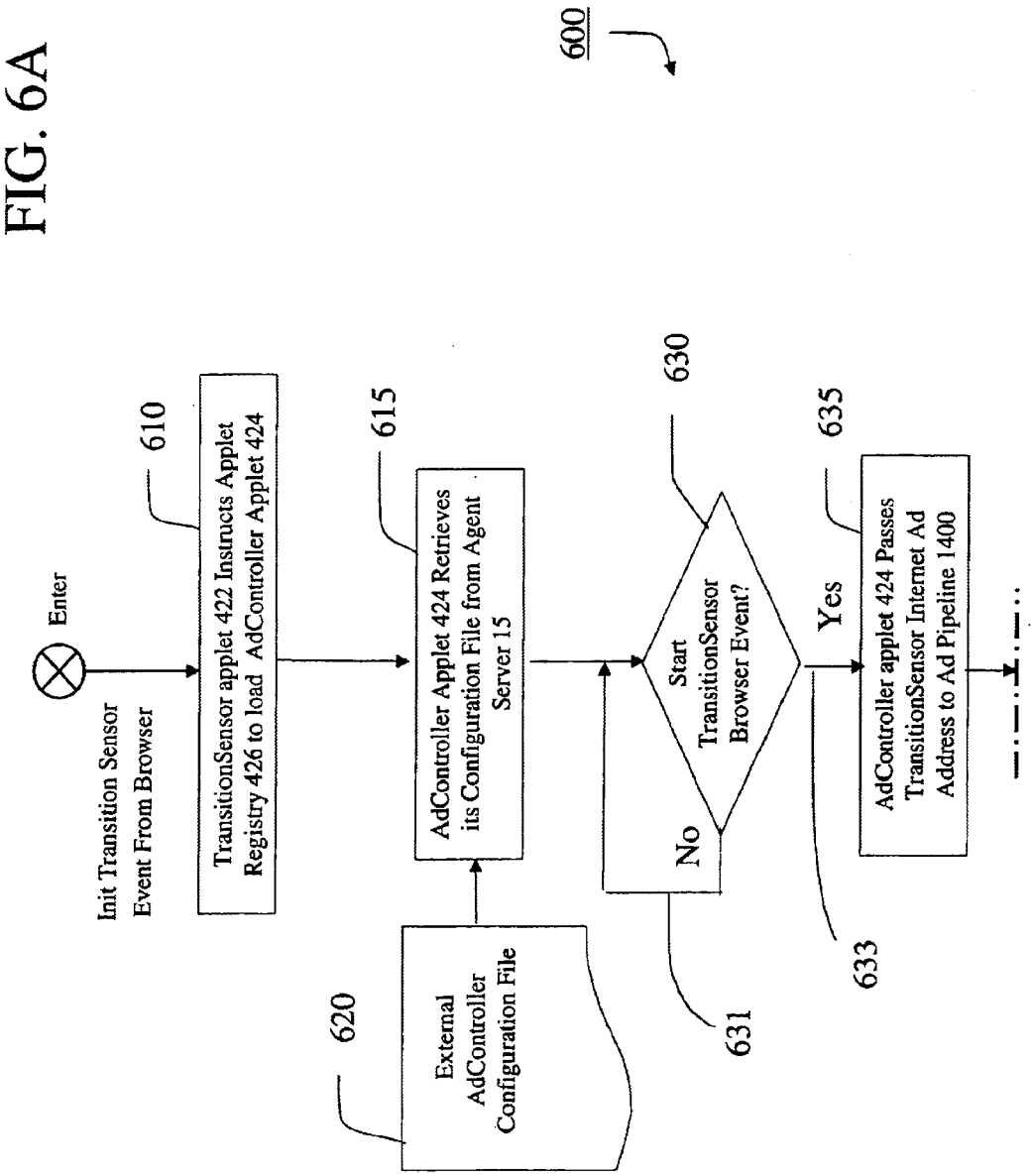

| FIG. 6A |
| FIG. 6B |

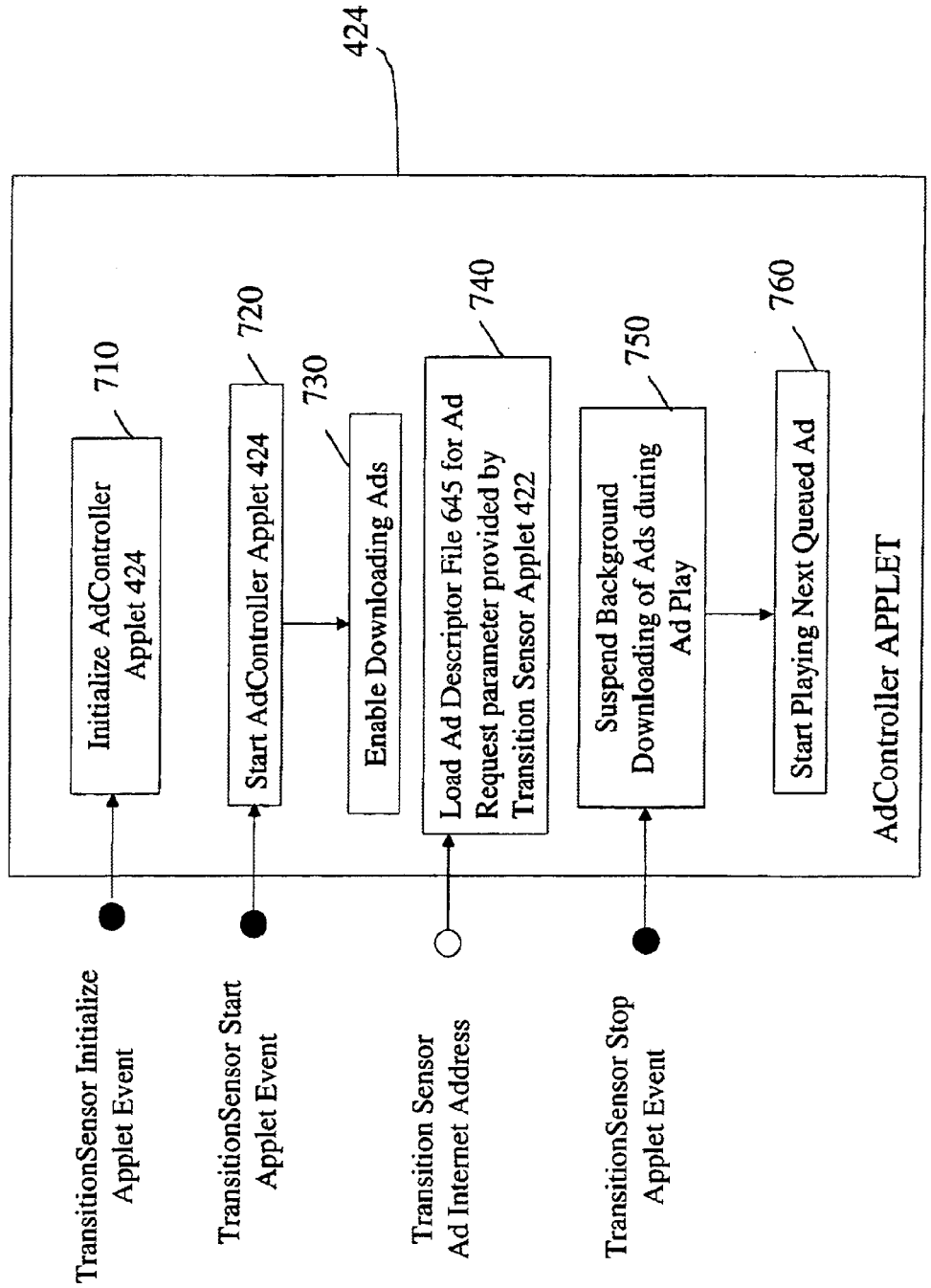

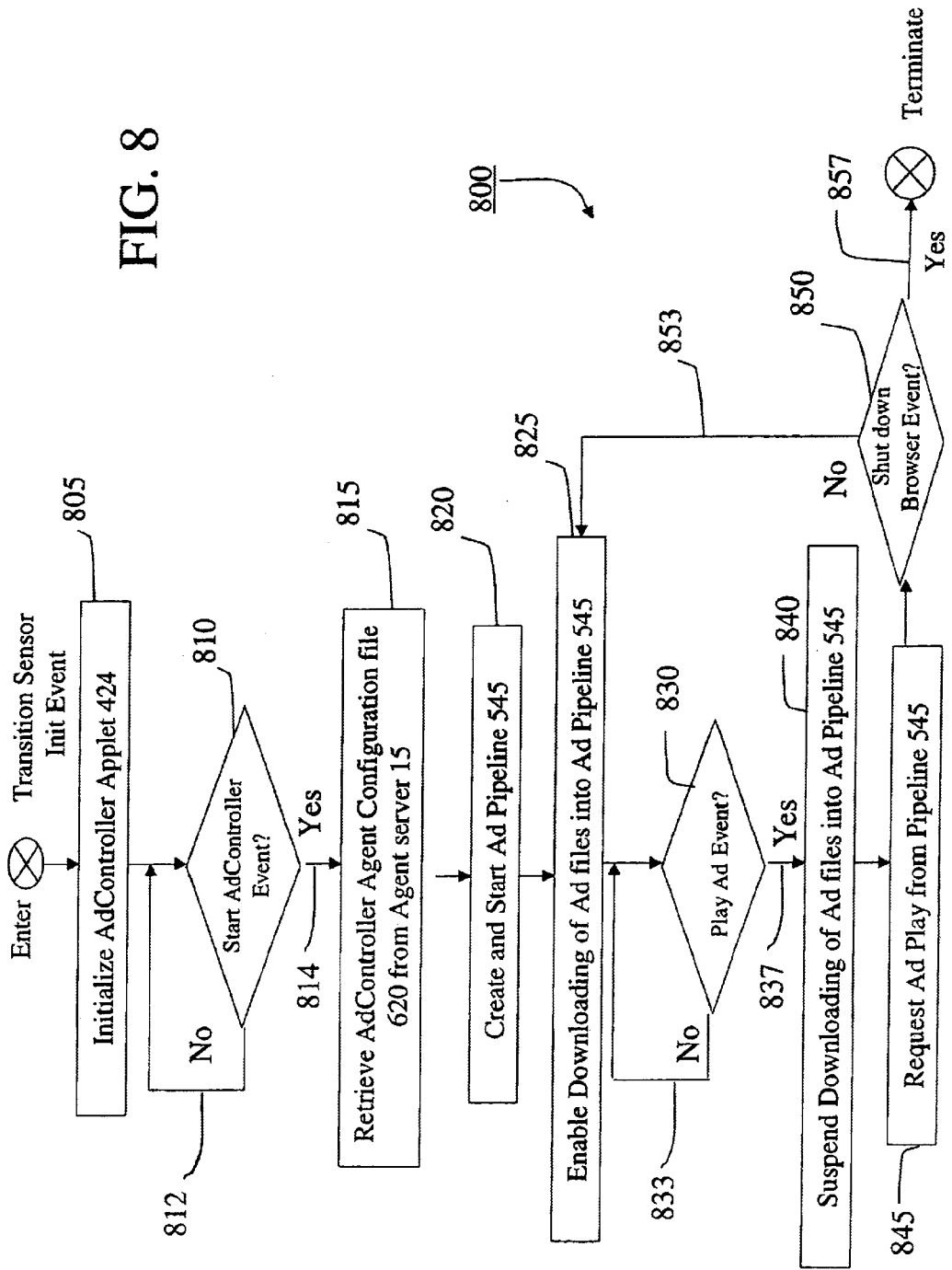

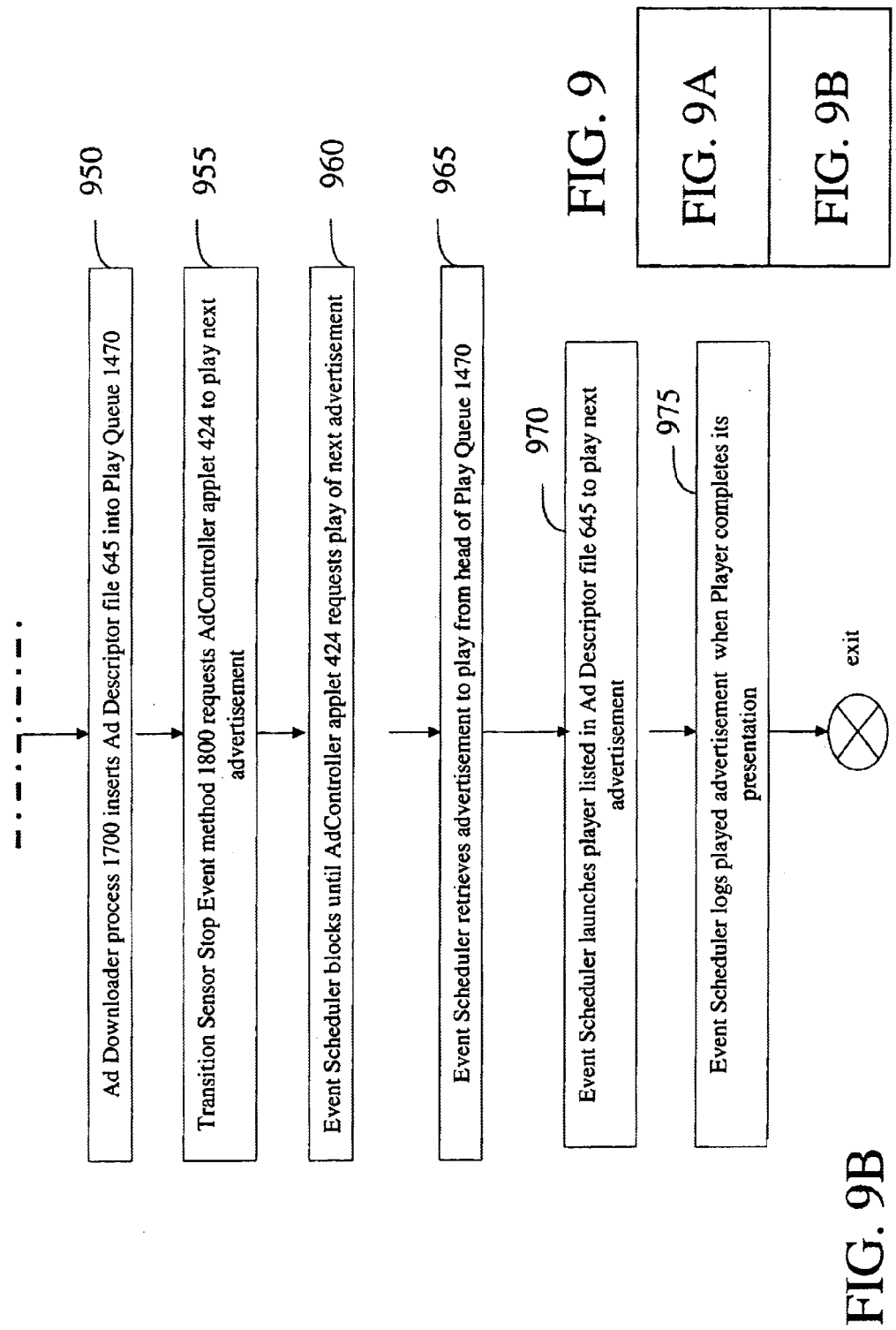

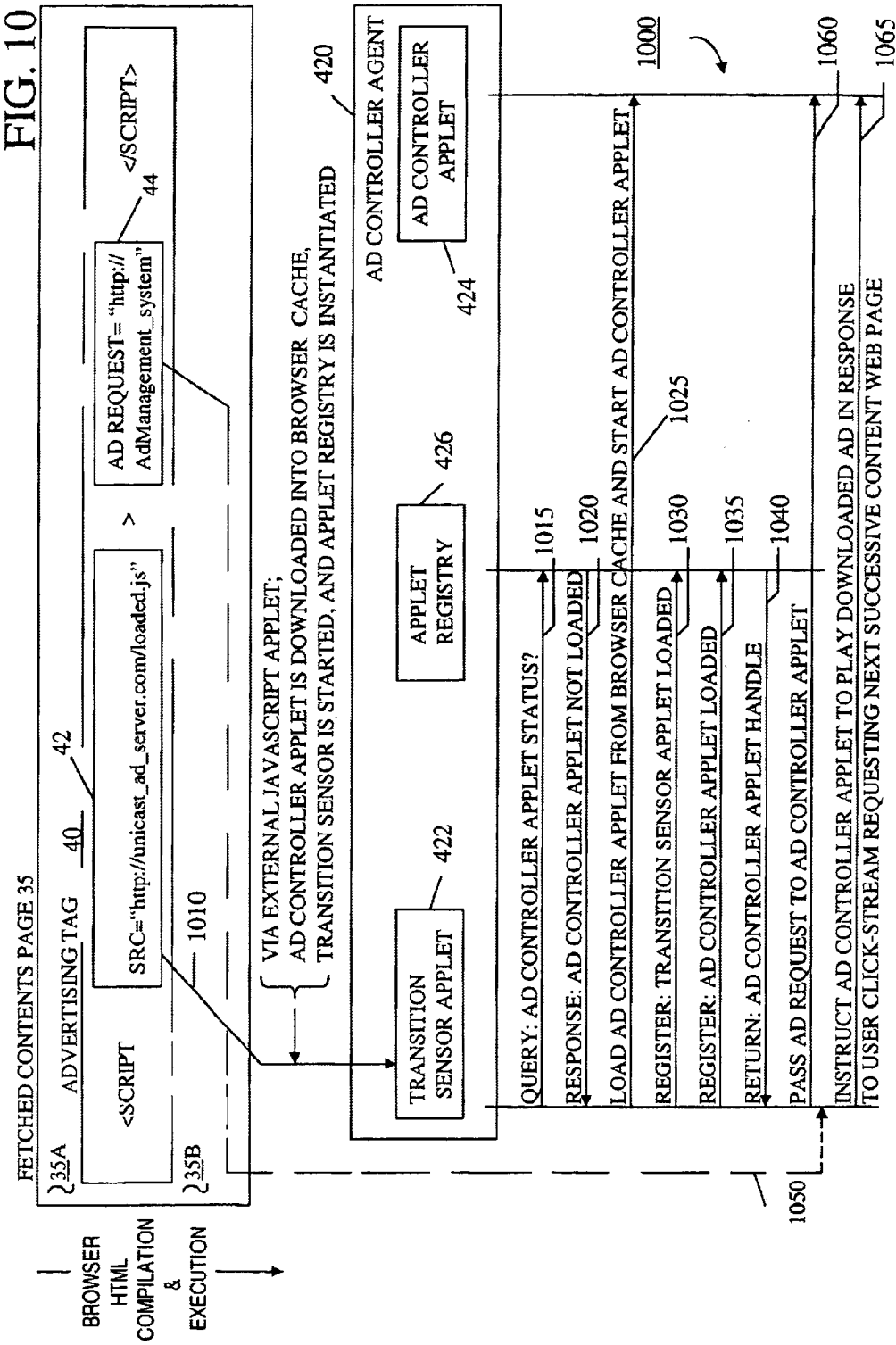

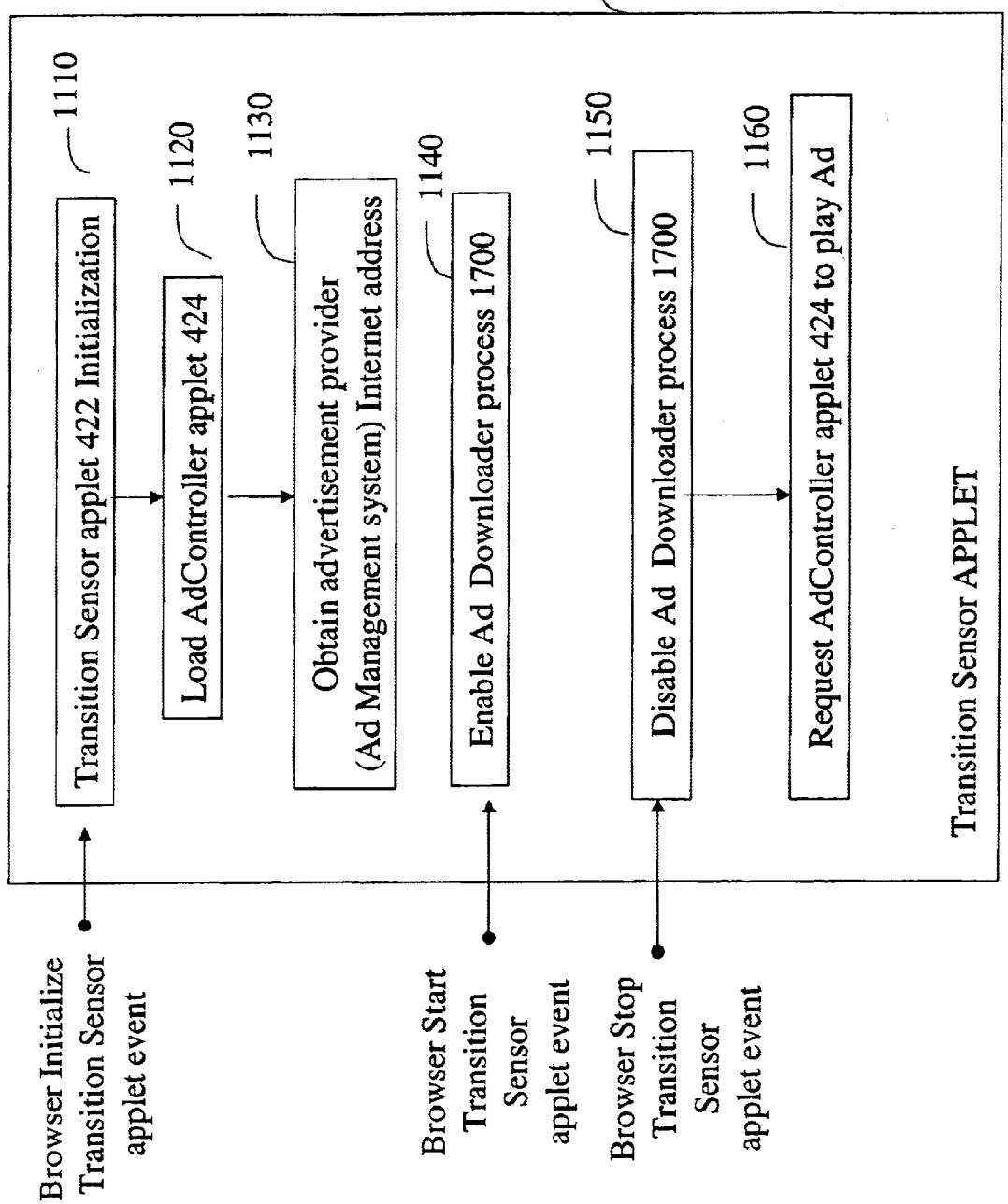

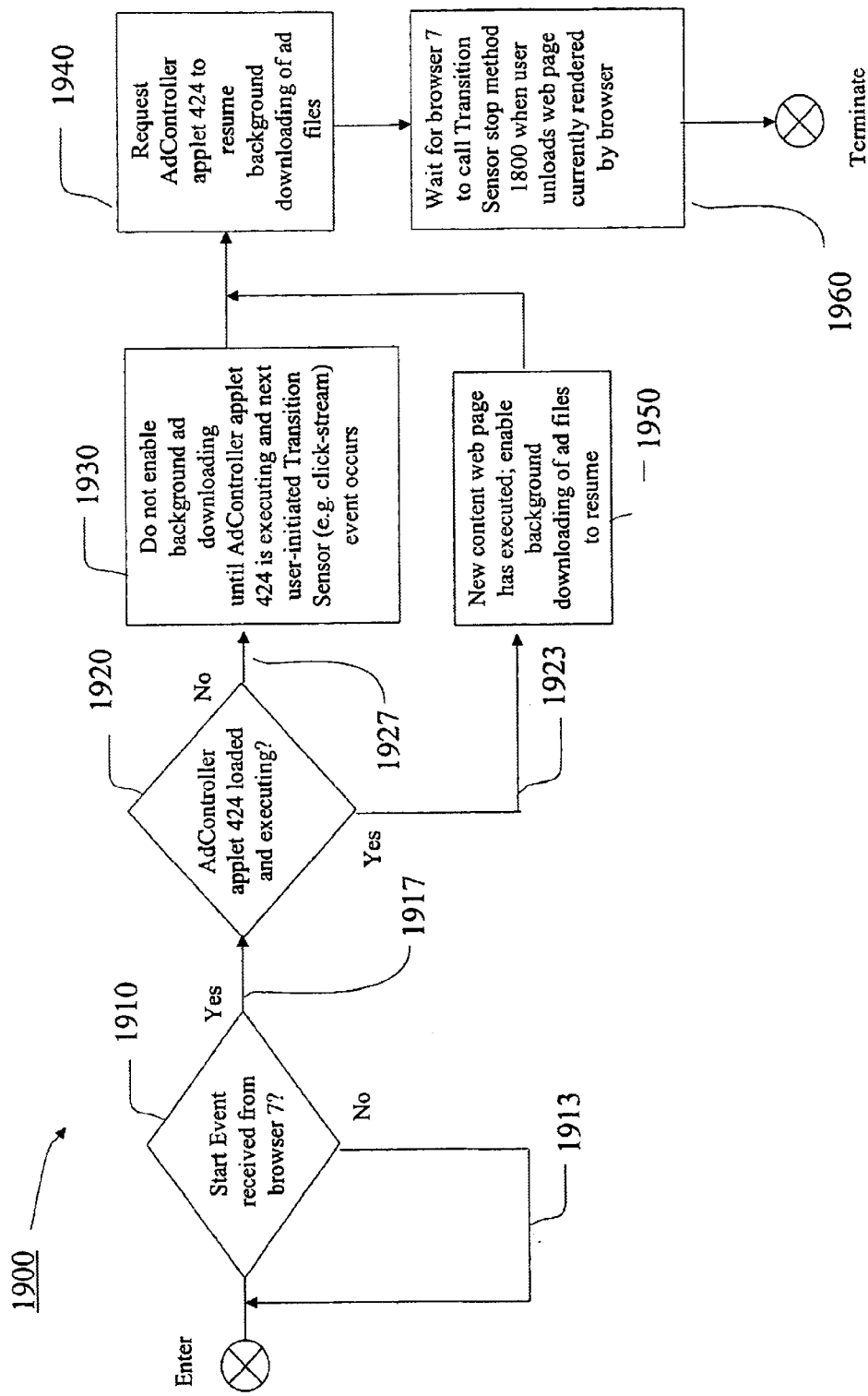
FIG. 19 – Transition Sensor Start Method

```
# Section 1 - Applet Player Java Class Configuration
playerName=AppletViewerPopup
playerClass=com.unicast.adcontroller.players.AppletViewerPopup
# Section 2 - Ad Java Classes Configuration
AppletViewerPopup.adAppletName=ANM_AnimationLoaderApplet
AppletViewerPopup.adAppletClass=
com.pointcast.applets.AnimationApplet.ANM_AnimationLoaderApplet
# Section 3 - Player Execution Configuration
AppletViewerPopup.windowTitle=AdController PointCast Ad
AppletViewerPopup.playerRefreshRate=1000
AppletViewerPopup.allowExit=true
AppletViewerPopup.xPosition=50
AppletViewerPopup.yPosition=50
AppletViewerPopup.windowWidth=280
AppletViewerPopup.windowHeight=355
AppletViewerPopup.isResizable=false
AppletViewerPopup.secondsWindowIsOpen=180
AppletViewerPopup.secondsToOverlay=1
AppletViewerPopup.closeButtonLabel=Close
AppletViewerPopup.openButtonLabel=More Info
AppletViewerPopup.saveButtonLabel=Save
AppletViewerPopup.openURL=http://www.pointcast.com/
# Section 4 - Ad Applet Configuration
# A. Ad Applet DocumentBase
AppletViewerPopup.ANM_AnimationLoaderApplet.documentBase=
http://www2.unicast.com/~rlandsma/AdController/MacromediaApplet/
# B. Ad Applet Parameters
AppletViewerPopup.ANM_AnimationLoaderApplet.AdToPlay=deepsea.anm
AppletViewerPopup.ANM_AnimationLoaderApplet.AltImage=test.gif
AppletViewerPopup.ANM_AnimationLoaderApplet.MaxCycles=5
AppletViewerPopup.ANM_AnimationLoaderApplet.TargetURL=http://www.pointcast.com/
AppletViewerPopup.ANM_AnimationLoaderApplet.TargetFrame=_top
AppletViewerPopup.ANM_AnimationLoaderApplet.BorderWidth=2
AppletViewerPopup.ANM_AnimationLoaderApplet.BorderType=Standard
# C. Ad Applet MediaList
AppletViewerPopup.ANM_AnimationLoaderApplet.mediaURLList=new
AppletViewerPopup.ANM_AnimationLoaderApplet.mediaURLList.size=2
AppletViewerPopup.ANM_AnimationLoaderApplet.mediaURLList.element0=deepsea.anm
AppletViewerPopup.ANM_AnimationLoaderApplet.mediaURLList.element0=animApplet.jar
```

FIG. 20

APPARATUS AND ACCOMPANYING METHODS FOR IMPLEMENTING A NETWORK DISTRIBUTION SERVER FOR USE IN PROVIDING INTERSTITIAL WEB ADVERTISEMENTS TO A CLIENT COMPUTER

CROSS-REFERENCE TO RELATED APPLICATION

This application is a divisional of our co-pending application Ser. No. 09/237,718, filed Jan. 26, 1999 and entitled "A TECHNIQUE FOR IMPLEMENTING BROWSER-INITIATED USER-TRANSPARENT NETWORK-DISTRIBUTED ADVERTISING AND FOR INTERSTITIALLY DISPLAYING AN ADVERTISEMENT, SO DISTRIBUTED, THROUGH A WEB BROWSER IN RESPONSE TO A USER CLICK-STREAM", which itself is a continuation-in-part of, now abandoned, patent application Ser. No. 09/080,165, filed May 15, 1998 and entitled "LOCALLY-SUMMONED NETWORK-DISTRIBUTED CONFIRMED INFORMATIONAL PRESENTATIONS".

BACKGROUND OF THE DISCLOSURE

1. Field of the Invention

The invention relates to a technique, specifically apparatus and accompanying methods, for implementing in a networked client-server environment, such as the Internet, network-distributed advertising in which an advertisement is downloaded, from an advertising server to a web browser executing at a client computer, in a manner transparent to a user situated at the browser, and subsequently displayed, by that browser and on an interstitial basis, in response to a click-stream generated by the user to move from one web page to the next.

2. Description of the Prior Art

Currently, Internet usage, and particularly that of the World Wide Web (henceforth referred to as simply the "web"), is growing explosively, particularly as the number of web sites and users that have access to the Internet continue to rapidly and to a great extent, exponentially, expand.

In essence, after establishing a suitable network connection to the Internet, a user at a client computer can easily employ a graphical web browser, such as the Internet Explorer ("IE") browser presently available from Microsoft Corporation of Redmond, Wash., to connect to a web site and then download a desired web page by simply supplying a specific address (known as a URL or uniform resource locator) of that page to the browser. The URL identifies both an address of the site, in terms of its Internet domain name, and a page of information at that site, in terms of its corresponding file name. Each web site stores at least one, and often times substantially more pages all arranged in a pre-defined hierarchy, generally beginning, at its root, with a so-called "home page". Each such page is written in HTML (hypertext markup language) form. A page, in this context, refers to content accessed via a single URL, including, e.g., text, graphics and other information specified in HTML code for that particular page. Once a user supplies a URL of interest, the browser operated by that user sends an appropriate command, using a TCP/IP protocol (transmission control protocol/internet protocol), to a remote HTTP (hypertext transport protocol) server, located at the web site and which stores that page, to access and download a corresponding file for that page. In response, the server then sends, using the TCP/IP protocol, a stored file containing HTML code that constitutes that page back to the browser. As the file that constitutes the page itself is received by the browser, the browser interprets and executes the HTML code in that file to properly assemble and render the page on, e.g., a monitor to a user situated at the client computer. Such a page may itself contain HTML commands that reference other files, residing on the same or different web sites, which, when these commands are appropriately interpreted and executed by the browser, result in those files being downloaded and their resulting content properly assembled by the browser into the rendered page. Once all the content associated with the page is rendered, the user can then position his(her) mouse cursor on a suitable hypertext link, button or other suitable user input field (whichever here implements a "hotlink") displayed on that page and then, through, e.g., a mouse "click", effectively download a file for and render another desired page in succession until the user has finished his(her) visit to that site, at which point, the user can transition through a hotlink to a page at another site, and so forth. A hotlink specifies a complete web address of an associated page, including a domain name of its hosting web site at which that page is situated. Consequently, by simply and successively positioning and "clicking" his(her) mouse at an appropriate hotlink for each one of a number of desired web pages, the user can readily retrieve an HTML file for each desired page in succession from its corresponding web site and render that page, and, by doing so, essentially effortlessly jump from site to site, regardless of where those sites are physically located.

Ever since their introduction several years ago, HTML and accompanying browser software, now including, e.g., attendant programming languages such as Java and JavaScript languages ("Java" is a registered trademark of Sun Microsystems in Mountain View, Calif.; "JavaScript" is a trademark of Netscape Communications in Mountain View, Calif.), have undergone rather rapid and continual evolution. A major purpose of which has been and continues to be to provide web page authors with an ability to render increasingly rich content through their pages and, as a result, heighten a "user experience" for those users who visit these pages. Consequently, web pages are no longer limited to relatively simple textual displays—as occurred with early versions of HTML and browser software, but can now encompass even full-motion multimedia presentations and interactive games that use rather sophisticated graphics.

The simplicity of browsing the web coupled with the relative low-cost of accessing the Internet, and the relative ease through which a web site can be established are collectively fueling unparalleled growth and diffusion of the Internet itself, web sites and the Internet user community throughout the world. In that regard, by establishing web sites, merchants, vendors and other information providers have an unparalleled opportunity, basically unheard of as little as 5–10 years ago, to reach enormous numbers of potential consumers—regardless of where these consumers reside—at costs far less than previously thought possible. Moreover, given the staggering amount and wide diversity of information currently available on the web, web browsing is becoming so popular a past-time for sufficient numbers of individuals that browsing is beginning to divert significant viewership away from traditional forms of mass entertainment, such as television and cable. While such diversion is relatively small at present, it is likely to rapidly grow. Moreover, given the ease and convenience with which users, situated at their personal computers and with basically nothing more complicated than a few mouse clicks, can effectively interact with remote web sites, electronic commerce, through which goods and services are ordered through the Internet without ever visiting a physical store, is rapidly emerging as a significant sales medium. This medium is likely to significantly challenge and possibly, over a relatively short time, may even alter traditional forms of retailing.

Given the wide and ever-growing reach of the web as a source of consumer information and the increasing consumer acceptance of electronic commerce, advertisers have clearly recognized the immense potential of the web as an effective medium for disseminating advertisements to a consuming public.

Unfortunately, conventional web-based advertising, for various practical reasons—some being technical in nature and others relating to a nature of traditional web advertisements themselves, has generally yielded unsatisfactory results and thus has usually been shunned by most large advertisers. In that regard, several approaches exist in the art for implementing web based advertisements. However, all suffer serious limitations of one form or another that have sharply restricted their desirability and use.

Currently, a predominant format, referred to as a "banner", for a web advertisement takes the form of a rectangular graphical display situated, typically at a fixed location, in a rendered web page. A banner, which can be static or animated, can be situated anywhere within a rendered web page but most often is situated at a top or bottom, or along a vertical edge of that page. A banner, depending on its size, can extend across an entire page width or length, and usually contains, in a graphical eye-catching form, a name of a product or service being advertised. Increasingly, a banner for a given product or service implements a hotlink to enable a consumer to "click-through" the banner (i.e., generate a mouse click on the banner) in order to transition, via his browser, to a web site maintained by a corresponding advertiser and, from that site, fetch a web page to provide additional information regarding that product or service. Hence, the consumer could easily obtain more information by a click-through; while an advertiser, monitoring counts of such click-throughs that occur in a given period of time, could gain feedback on the effectiveness of the corresponding banner.

A banner is generally produced by properly embedding specific HTML code for that banner within the HTML coding for a given web page in which the banner is to appear. A client browser, as it interprets and sequentially executes the HTML code for a fetched page, will, in turn, compile and execute the embedded code for the banner and hence display the banner, as part of a rendered page and at a specified location thereon.

In implementing a banner, whether static or even animated, its HTML coding generally involved downloading an appropriate file, for that banner, to a client browser. The file may be stored on the same server that stores the HTML file for the page, or accessed from a remote server. The file may contain a graphic itself, such as in a GIF (graphic interchange format) file, or a Java applet which, once interpreted and executed by the browser, generates and renders a desired animated graphic. This file, whether it be a graphic or applet, requires time to download and must be downloaded and assembled by the browser on the page prior to that page being fully rendered. The download time for that file, particularly as it increases in size, clearly, a priori, lengthens a time interval during which that page would completely download, thereby extending the time to fully render the page, including the banner, after a user transitioned to that page. Channel bandwidth to a client computer (e.g., personal computer—PC), such as that provided through a modem connection, is often rather limited. Consequently, if the file size for the banner were relatively large—as would certainly be the case for relatively "rich"content, e.g., audio or video content, the delay in downloading such a file over such a limited bandwidth connection could be excessive, and consequently highly frustrating to the user. Hence, a user would likely wait a considerable amount of time before all the page components for multimedia content are fully downloaded to permit that page to be rendered. Such delay, if encountered during a page transition, can be rather frustrating to a user, even to the point at which the user, just to end his(her) waiting, will prematurely terminate the download and transition to another page. Therefore, in an effort to preserve an appropriate "editorial experience" for a user, content suppliers sharply limit the file size, of such banners to be rendered on their pages, in order to minimize page download and hence latency times.

Unfortunately, such restricted file sizes effectively limit the richness of the content of a banner to a rather simplistic advertisement—even with animation. Thus, banners often failed, as advertisers soon recognized by relatively low click-through counts, to attract sufficient viewer attention to justify their use and expense.

In an effort to overcome the content limitation associated with banners, the art teaches the use of a different advertising modality: so-called "interstitial" advertisements. See, e.g., U.S. Pat. No. 5,305,195 (issued to A. J. Murphy on Apr. 19, 1994—hereinafter the "Murphy" patent) which discloses the concept of using interstitial advertisements though not in the context of web advertising. As described in the Murphy patent, pre-stored advertisements are displayed at specific intervals on each one of a group of networked ATM (automated transaction machines) terminals. In particular, the advertisements are downloaded, either directly or via a server, from a remote computer and locally stored on each such terminal and subsequently displayed on that terminal while it waits for a response, from a remote mainframe transaction server, to a transaction initiated at that terminal.

Generally speaking and with specific reference to web advertising, interstitial ads are displayed in an interval of time that occurs after a user has clicked on a hot-link displayed by a browser to retrieve a desired web page but before that browser has started rendering that page. Such an interval, commonly referred to as an "interstitial", arises for the simple reason that a browser requires time, once a user clicks on a hotlink for a new page, to fetch a file(s) from a remote web server(s) for that particular page and then fully assemble and render that page. The length of an interstitial interval, which is quite variable, is governed by a variety of factors, including, e.g., a number of files required to fully render the new page and the size of each such file, and network and server congestion and attendant delays occurring when the user activated the hotlink.

Interstitial web advertising is taught in, e.g., U.S. Pat. Nos. 5,737,619 and 5,572,643 (both of which issued to D. H. Judson but on Apr. 7, 1998 and Nov. 5, 1996, respectively— hereinafter the "Judson" patents). The Judson patents disclose the concept of embedding an advertisement, as an information object, in a web page file in such a manner that the object will remain hidden and not displayed when the file is executed to render the page. Rather than being displayed, the information object is locally cached by the browser during execution of the code for that page. Then, during a transition initiated by user activation of a hotlink to move from that page to a next successive page, i.e., during an interstitial, the browser accesses the advertisement from local cache and displays it until such time as that next successive page is downloaded and rendered. See also, published International patent application WO 97/07656 (to E. Barkat et al and published on Mar. 6, 1997) which teaches the concept of "polite" downloading. Here, a browser, on a local computer (e.g., a client PC) downloads, from an remote advertising system server and ostensibly as a background process, file(s) for a web advertisement only during those intervals when bandwidth utilization of a communication channel (link) connected to the browser is less than a pre-established threshold. Such "polite" downloading is intended to minimally interfere with other communication applications, then executing on the client PC, which will utilize the link. The browser displays the downloaded ad(s) to the user only after the user has not interacted, as detected by a conventional screen saver process, with his(her) PC for a predefined period of time, such as by neither moving a mouse nor depressing a key on a keyboard during that period. The server selects those advertisements for download to the client PC based on a user-ID and preference information of the user, who is then situated at that PC, and configuration information of that PC, which, when a connection is established between the client PC and the server, the client PC uploads to the server. Though the files associated with an interstitial advertisement can be large, these files are advantageously fetched by a client browser during those intervals when otherwise the browser would be idle and hence bandwidth utilization of its network connection would be relatively low. Such "idle times" would occur, in the absence of processing an interstitial ad, after the browser has fully rendered a web page and a user is viewing the page but has not yet clicked on a hotlink to transition to another page. During such an idle time, the browser would simply wait for further user input.

By reducing, if not eliminating, problems, inherent in banners and engendered by download latency, interstitial web advertisements, by employing idle time downloading and local caching, provide a theoretical promise of conveying very rich media content with a pleasing "user experience". However, interstitial advertisements, as conventionally implemented, have serious practical deficiencies which have severely limited their use.

Conventional interstitial, as well as other forms of current, web advertisements—here not unlike banners—rely on embedding HTML ad code, as, e.g., a separate non-displayable object, within HTML coding for a web page. Unfortunately, this approach, inherent in that taught by the Judson patents, can be inflexible and expensive for an advertiser to implement and particularly later should that advertiser, for whatever reason, seek to modify his(her) ad content. In particular and presently, ad coding is manually inserted into each and every content web page that is to carry advertising. Consequently, insertion of increasingly sophisticated embedded advertising, such as multi-media or video or audio, in existing web site content requires a large investment in terms of human resources, time and cost as web sites, particularly large sites, increase a number of content pages available for advertising. In that regard, where a banner usually required insertion of, e.g., a single line of HTML code, content rich advertisements, such as those now implemented by parameterized embedded Java advertising applets, often consist of an entire page of coding and hence require far more extensive and increasingly labor-intensive and costly insertions. Moreover, over time, advertisers do change their ads—such as by replacing one ad with a totally new version. However, once HTML ad coding is embedded within a number of web pages, it can be quite impractical and rather costly for an advertiser to access each and every page in which his(her) ad coding has been inserted and then manually change the ad coding, as desired. The impracticality and attendant cost compound if these pages are copied to other web sites and hence diffuse through the Internet.

Given these deficiencies, the art teaches a concept of implementing web advertising through using so-called "push" technology. See, e.g., U.S. Pat. No. 5,740,549 (issued to J. P. Reilly et al on Apr. 14, 1998—hereinafter the "Reilly et al" patent). In essence and as described in the Reilly et al patent, a client PC, through execution of a "push" application program (called "administration manager"), establishes a network connection with an information server, i.e., a "push" web server, typically during off-hours, such as in the late evening or early morning, or at a predefined interval (e.g., every four hours). The information server then downloads, i.e., "pushes", to the administration manager, content files, such as for advertisements and/or other predefined information, that are to be played to the user sometime later. The administration manager, i.e., the "push" application, in turn, stores all the "pushed" content files into a local database (referred to as the "information database") on a local hard disk and, in response to instructions received from the information server, deletes those previously "pushed" content files which have already been displayed. The administration manager also maintains a user profile, which specifies user preferences as to the specific advertising and/or other information (s)he wants to receive, in the information database. As such, through each connection, the information server, by selecting content from its database relative to preferences specified in the user profile, attempts to "push" fresh content to the client PC that is likely to be of interest to the user but without duplicating that which was already displayed. Stored "pushed" content is later displayed, using a data viewer, either on user demand or during those times when the user is not interacting with the system, here too detected by a conventional screen saver procedure.

While push technology reduces download latency, by shifting downloads to occur at off-hours, this technology also suffers serious drawbacks which have greatly restricted its practical acceptance.

In particular, to access "pushed" content, a user must initially download and install to his(her) client PC a separate, platform-specific, software application program, as well as subsequent updates to that program as new push capabilities are released by the manufacturer of the program. Unfortunately, these application programs can often extend to tens of megabytes in length. Since typical Internet users establish modem connections to their Internet service providers these users will find that downloading these relatively large program files, even in compressed form, will consume an inordinate amount of time and is generally impractical while (s)he is actively using his(her) client PC. Consequently, these users are constrained to purchasing, at some cost, an off-the-shelf version of the application program or downloading that program, typically at no cost for the program itself, at off-hours, when network congestion is relatively light. Furthermore, while some efforts are underway in the art to automatically "push" and install incremental software updates to a client PC, thus eliminating a need for a user to manually do so, the user still faces the burden associated with the initial download and installation of the "push" application program.

In addition, "push" application programs continue to increase in size, often considerably, as they provide added capabilities to a user. Downloading and then regularly updating a push application will reduce, sometimes considerably, the amount of disk space available to the user on his(her) client PC. Furthermore, "push" applications rely on periodically "pushing" large quantities of media content from a push server to the client PC and storing that content on the hard disk of that PC pending subsequent display. This content, depending on its volume, can consume inordinate amounts of hard disk space. Furthermore, advertisers have discovered, not surprisingly, that relatively few PC users will undertake any affirmative action, such as by downloading and installing an application program—almost regardless of its size, to receive advertisements and other such information.

Faced with these practical, and rather acute, deficiencies inhering in web advertising conventionally provided on either an interstitial or "push" basis, web advertisers have apparently relegated their efforts to displaying their advertisements on a banner-like approach, through real-time downloading and rendering of advertising HTML files. Here, the advertising files are sited on remote web servers, rather than being embedded within given web page HTML files, with appropriate HTML tags, which reference the ad files, being embedded into the web page files themselves. Such a tag specifies when and where, within the page, an advertisement is to appear.

To surmount the latency problems inherent in such banner-like advertisements, various proprietary media formats have appeared in the art. These formats employ increasingly sophisticated data compression, sometimes in conjunction with video and/or audio streaming. Rather than waiting for a media file to fully download prior to its being rendered, streaming permits content in a "streamed" media file to be presented in real-time to the user as that content arrives at his(her) client browser. While this approach clearly provides enhanced richness in content over that obtainable through a conventional banner and thus can heighten a "user experience", it nevertheless relies, to its detriment, on a continuous real-time network connection existing to a remote web server.

Unfortunately, any network or server congestion which stops the download, even if temporary, can suspend, i.e., freeze, or totally halt the "streamed" media presentation to the user prior to its completion. This interruption, if noticeable and sufficiently long, will likely frustrate the user and degrade the "user experience".

In spite of these drawbacks, particularly with respect to interstitial advertisements and push technology, and apparently for lack of a better alternative, most web advertising currently in use employs real-time streaming of graphic files with their content being rendered by the browser.

Web advertisements, like other forms of mass advertising, do generate revenue, often in the form of an on-going stream of payments to the host of the ads, in this case web site owners. Accurate user accounting is essential to ensure that an advertiser is not over- or under-charged given an extent to which an ad is actually disseminated. Hence, these payments are often tied to a function of the number of web users whom the ad reached. But with web advertisements, accurately ascertaining that number has been difficult and problematic at best, and, given a basic technique employed to do so, manifestly error-prone, thereby causing unreliable user counts and erroneous ad charges.

In particular and as conventionally employed, delivery of a web advertisement, such as, e.g., a streamed ad, is logged as a "user impression" at a web server at an instant an advertising file(s), e.g., a streamed file, is served, rather than after the browser has completely rendered the advertisement to the user. Unfortunately, serving these ad files does not guarantee that these files will be ultimately and completely rendered by a client browser to a user. Consequently, web server generated "user impression" counts can be grossly over-or under-stated. For example, if a user navigates to a new content page after an advertisement has started playing but before that advertisement completes and, by doing so, prematurely terminated the advertisement, a full impression is nevertheless logged—erroneously—since that advertisement was completely served. Additional errors arise if a proxy server is situated between multiple client PCs situated on an intranet or a local area network (LAN) and a web advertisement server situated on the Internet (or other insecure public network). In this case, a request from one of the client PCs for the advertisement files will be routed to the proxy server, which, in turn, will direct that request onward to the advertisement web server. The latter, in response to the request, will serve one complete copy of the advertisement files to the proxy server. The resulting fetched advertisement files will be locally cached in the proxy server and, from there, provided to the requesting client PC. Should any of the other client PCs request the same files, the proxy server will provide these files, totally unbeknownst to the web server, from its local cache rather than directing a request from that other PC back to the web server. Hence, the web server will be totally oblivious to each additional instance in which the proxy server accessed the ad files from its local cache and disseminated the advertisement to any client PC other than that which first requested the ad. Inasmuch as some intranets situated behind a proxy server(s) can be rather extensive with tens or hundreds of thousands of individual client PCs, server-based user impression accounting based on copies delivered by a web server may, owing to the presence of proxy servers, be inordinately low and result in significant under-charges to the advertiser. As of yet, no solution apparently exists in the art that can provide accurate counts of "user impressions" of web advertisements.

Other conventional approaches aimed at reducing latency times associated with downloading content files through relatively slow speed communication links, e.g., modem connections, have involved development and use of new facilities within various programming languages. These approaches, most notably involving the Java and JavaScript programming languages, while helpful, still cause inefficient use of available link bandwidth and still constrain the size of the content files. These limitations arise from premature terminations of preloaded files whenever a user transitions to a new web page. Specifically, with these approaches, if a user activates a hotlink to transition to a new web page while an ad file is being downloaded but before the downloading has completed, then the downloading simply stops. The downloading will need to be re-started, but from the beginning of the file, the next time that particular ad file is requested. Hence, the time and bandwidth that has then been expended in downloading part of that ad file is completely wasted. In practice, many users tend to quickly navigate through a series of web pages until they reach a desired destination. Consequently, advertisers are constrained to again minimize content file sizes and hence "richness" of their advertisements in an effort to decrease a number of premature terminations per unit time and in doing so reduce latency caused by downloading duplicate sections of the same ad file. Therefore, these approaches have generally proven to be wholly unsatisfactory.

In view of the fundamental drawbacks associated with various web based advertising techniques known in the art, interstitial web advertising appears to hold the most promise of all these techniques. Yet, the limitations inherent in conventional implementations of conventional interstitial advertising have effectively prevented this form of web advertising from effectively fulfilling its promise. Moreover, the deficiencies inherent in all known web advertising techniques have, to a significant extent, collectively inhibited the use of web advertising in general.

Thus, a pressing need exists in the art for a new web-based interstitial advertising technique which does not suffer from infirmities associated with such interstitial advertising techniques known in the art.

In that regard, this new technique should preferably not embed advertising HTML files within a web page. If this could be accomplished, then advantageously such a technique would likely provide considerable economies to advertisers in saved labor, time and cost in terms of both inserting advertisements into web page files, and later changing any of those advertisements. In addition, such a new technique should preferably function in a manner that is substantially, if not totally, transparent to a user and which neither inconveniences nor burdens that user. In particular, this new technique should preferably not require a user to download and install on his(her) PC a separate application program, let alone any update to it, specifically to receive web advertising, or perform any affirmative act, other than normal web browsing, to receive such advertising. Furthermore, this new technique should preferably be platform independent and, by doing so, operate with substantially any web browser on substantially any PC. Also, this new technique, when in use, should preferably not consume excessive hard disk space on a client PC. Moreover, to provide a pleasing "user experience", this new technique should render an ad fully and without any interruptions that might otherwise result from network and/or server congestion. Lastly, this new technique should provide proper accounting to an advertiser by accurately and validly ascertaining user impressions of fully rendered advertisements.

We believe that if such a new web-based interstitial advertising technique could be provided, then this technique, which should be both effective and desirable, may well achieve broad support and use by advertisers and acceptance by web users; hence, substantially expanding the use of web-based advertising in general.

SUMMARY OF THE INVENTION

Advantageously, our present inventive technique satisfies this need by overcoming the deficiencies associated with conventional web-based interstitial advertising techniques.

Our present invention accomplishes this, in accordance with our broad inventive teachings, by: completely "decoupling" advertising content from a web content page (also hereinafter referred to as a "referring" page); "politely" downloading advertising files, through a browser executing at a client computer, into browser caches (e.g., browser disk and RAM cache) at that computer and in a manner that is transparent to a user situated at the browser; and interstitially displaying advertisements through the browser in response to a user click-stream associated with normal user navigation across different web pages.

Specifically, our technique relies on embedding an HTML tag (which, where necessary, to distinguish this tag from other HTML tags, will also be referred to hereinafter as an "advertising tag") into a referring page. This tag contains two components. One component effectively downloads, from a distribution HTTP (web) server and to an extent necessary, and then persistently instantiates an agent, implemented as a "light-weight" Java applet, at the client browser. This agent then "politely" and transparently downloads advertising files (media and where necessary, player files), originating from an ad management system residing on a third-party advertising HTTP (web) server, for a given advertisement into browser disk cache (also in the case of media files into the browser RAM cache) and subsequently plays those media files through the browser on an interstitial basis and in response to a user click-stream. The other component is a reference, in terms of a web address, of the advertising management system from which the advertising files are to be downloaded. This latter reference totally "decouples" advertising content from a web page such that a web page, rather than embedding actual advertising content within the page itself—as conventionally occurs, merely includes an advertising tag that refers, via a URL, to a specific ad management system rather than to a particular advertisement or its content. The ad management system selects the given advertisement that is to be downloaded, rather than having that selection or its content being embedded in the web content page.

Advantageously, the agent operates independently, in the client browser, of the content in any referring web page. Once loaded and started, the agent executes in parallel, with standard browser functionality, continually and transparently requesting and downloading advertisements to browser cache residing in a client computer (e.g., personal computer—PC) and interstitially playing those advertisements.

In particular, once the agent is started, the agent politely and transparently downloads, through the client browser and to the browser cache, both media and player files, originating from the advertisement management server, for an advertisement that are needed to fully play content in that advertisement. The agent also monitors a click-stream generated by a user who then operates the browser. In response to a user-initiated action, e.g., a mouse click, which instructs the client browser to transition to a next successive content web page and which signifies a start of an interstitial interval, the agent, if all the media and player files are then resident on the client hard disk, plays the media files, through the browser and during that interstitial interval, directly from the browser cache. Advertisements are interstitially played typically in the order in which they were downloaded to the client browser. Interstitial play from browser cache advantageously permits previously cached content rich advertisements to be played through the browser without adversely affecting communication link bandwidth then available to the client browser. Thus, the full available link bandwidth can be used, while an advertisement is being played, to download a next successive content web page.

Employing a user click-stream to trigger play of cached advertisements frees the user, for receiving advertising, of any need either to undertake any affirmative action, other than normal web browsing, or to learn any new procedure; thus, advantageously imposing no added burden on the user.

Advantageously, the agent "politely" downloads advertisement media and player files, originating from the advertising server, to the browser cache, during what otherwise would be browser idle times, i.e., while a web page is being displayed to a user and the browser is waiting for user input. Caching advertisement files in this fashion advantageously circumvents variable latency and erratic (e.g., intermittent or suspended) play that frequently occurs with conventional streamed and static media delivered over the web.

At the start of an interstitial interval, the agent determines whether all the media and player files required to play a given advertisement (typically that having its so-called AdDescriptor file situated in a head of a play queue) then reside on the disk of the client PC or, with respect to media files, are resident in browser RAM cache. If so, the agent then accesses these files from the disk to "play" that advertisement. Since all the media and player files are then locally resident, the advertisement, from a user's perspective, is immediately rendered from the client hard disk or browser RAM cache with essentially no downloading delay, thus providing a highly pleasing "user experience" with rich multi-media content approaching that obtainable through current CD-ROM based delivery. Thereafter, the agent returns control to the browser to permit the browser, if a next successive web page has been downloaded, assembled and ready to be rendered, to render that particular page to the user. If, however, an advertisement is prematurely terminated by a user, that advertisement (in terms of its AdDescriptor file) will remain in a play queue (with its media and player files remaining on the client hard disk or, in the case of media files, in browser RAM cache) and will be re-played from its beginning at the start of a next successive interstitial interval. Furthermore, if download of the media and player files for an advertisement were to be interrupted by a user click-stream, i.e., start of interstitial interval, the agent suspends further downloading until after the ensuing interstitial interval terminates. To conserve communication link bandwidth, the agent then resumes downloading of these files at a point it was suspended, rather than, as conventionally occurs, totally re-starting the download.

In accordance with our specific inventive teachings, the agent contains two applets: a Transition Sensor applet and an "AdController" applet. Only the Transition Sensor applet is itself associated with any content page. Though the AdController applet, once started, executes under the browser, it is not under the control of the browser itself.

The advertising tag is itself embedded in a content web page. The advertising tag, as one of its components, references a JavaScript file (which contains a "script") stored on a distribution server. The JavaScript file, when executed, downloads and implements, through dynamic writing of applet tags, the Transition Sensor applet. This particular applet remains visually transparent to a user who displays, with his(her) browser, the HTML coding for that page. Specifically, when the JavaScript file is downloaded and the script it contains is then executed by the browser, the script dynamically writes a predefined number and combination of applet tags, i.e., which collectively form the Transition Sensor applet, into the retrieved web page content in lieu of the advertising tag. Subsequent execution of these tags, by the client browser, invokes the Transition Sensor applet. As discussed, the advertising tag also, as the other of its components, encapsulates a reference, i.e., a URL to a specific ad management server, typically sited on a third party advertising server, containing specific media, that collectively constitutes web advertisements, and accompanying player files.

In particular, when executed, the Transition Sensor applet instantiates an Applet Registry, which is used for inter-applet communication. Thereafter, the Transition Sensor applet determines whether the AdController applet has been downloaded to the browser disk cache or whether an updated version of this particular applet resides on a distribution server. If an updated version of this applet exists on the distribution server relative to that previously downloaded to the browser disk cache or if this applet has not been download at all onto this cache, the Transition Sensor applet loads the AdController applet from the distribution server into the browser disk cache. The Transition Sensor applet then instantiates the AdController applet. Once this occurs, the Transition Sensor applet then establishes appropriate entries in the Applet Registry for itself and the AdController applet.

The Transition Sensor applet then passes the URL of the ad management system, as specified in the advertising tag, to the AdController applet in order for the latter applet to request delivery of an advertisement, specifically an associated AdDescriptor file, originating from that system. The system then selects the advertisement to be delivered and, via the third party advertising server, so informs the AdController applet by returning the requested AdDescriptor file. For a given advertisement, this particular file, which is textual in nature, contains a manifest, i.e., a list, of: file names and corresponding web addresses of all media files that constitute content for that advertisement and all player files necessary to play all the media files; an order in which the various media files are to be played; and various configuration and other parameters need to configure and operate the operation of each player in order for it to properly play a corresponding media file(s). The AdController then "politely" downloads, typically via the advertising distribution server, the associated media and player files, as specified in the AdDescriptor file—and to the extent they do not already reside on the hard disk of the client PC. As noted above, the Transition Sensor applet also monitors a click-stream produced by the current user to detect a user-initiated page transition and hence the start of an interstitial interval.

Advantageously, the AdDescriptor file implements a data abstraction that totally separates the media and player files from the referring web page thus assuring that the advertisement content itself remains completely independent of the content web page that invoked its presentation. This abstraction permits our technique to provide a highly effective, generalized and very flexible mechanism for delivering rich web advertisements, particularly those that require complex sets of media files and players. Through use of this abstraction, our technique is able to handle present and future media formats, regardless of their requirements, including proprietary streaming and other content delivery technologies that rely on Java applets as a delivery mechanism—all transparently to the user. Moreover, since the AdDescriptor file can specify media and player files for different browsers, operating systems and computing platforms then in use, our technique can readily function with a wide variety of different computing and browsing platforms.

The Transition Sensor and AdController applets are each implemented through appropriate Java classes and collectively persist, through storage in the browser disk cache, across different content pages within a site, across different web sites, and across successive browser sessions. Once either of these applets is completely downloaded, providing it is not subsequently flushed from the browser disk cache as the user navigates across web sites on the web, the files for that applet will be loaded from that cache, rather than being downloaded from the distribution server, the next time that applet is required, e.g., when the user next navigates, either during a current browser session or a subsequent session, to any content page that contains an advertising tag.

Whenever the client browser encounters a next successive page containing an advertising tag, then the browser will first and automatically inquire with the distribution server to ensure that executable code for the Transition Sensor applet, if previously downloaded into the browser disk cache, has not been superseded by an updated version. If such an updated version then exists, the browser will collectively download updated files from the distribution server and replace, to the extent necessary, each Transition Sensor applet file residing in the browser disk cache with its updated version. Alternatively, if the Transition Sensor applet has not been previously downloaded into the browser disk cache, then the browser will download all the necessary files for the Transition Sensor applet from the distribution server into that cache. The Transition Sensor applet, once executing, will load, through the browser, the AdController applet. To do so, the browser will, if necessary, obtain an updated version, from the distribution server, in the same manner as it did for the Transition Sensor. As a result, any corrections or enhancements made to the agent (specifically the Transition Sensor and/or the AdController applets) since the agent was last downloaded to the client browser will be automatically and transparently, from a user perspective, distributed to that browser and downloaded into the browser disk cache the next time the browser encounters a web page containing an advertising tag. By operating in this fashion, the user is totally and advantageously relieved of any need to: both initially load and install an application program to obtain advertising and/or later update that program.

Furthermore, the agent advantageously persists and functions transparently in background, independent and transparent to user navigation across pages on a common web site and across web sites. The agent effectively implements a background process which runs in parallel with and is transparent to normal HTML and HTTP operations implemented by the client browser.

Moreover, in sharp contrast to conventional server-based accounting of web advertisements, our inventive technique provides highly accurate client-side accounting of each user impression. Each log entry, produced by the AdController applet, specifies a successful presentation of a complete advertisement at a client browser. This entry may include a source of the ad content, i.e., in terms of the URL of the associated ad management system, a title of the advertisement and the URL of the referring web page. Other client-side information can be measured and included in each entry, such as: an amount of time during which the advertisement was rendered by the browser (presumably during which the user dwelled on the advertisement); as well as an identification, in terms of a URL, of a content web page to which the user next navigated (particularly if the user reached that page through a hotlink displayed in the advertisement). Subsequently, the AdController applet uploads the log entries to the advertising server. These entries will be collectively processed, as needed, to permit shared ad revenues from web-based advertisers to be properly allocated among different web page content providers.

Advantageously, our inventive technique, by totally decoupling referring web page content from its corresponding advertising content, easily permits an advertiser to change or update any of its advertisements by just modifying, as needed, appropriate media and AdDescriptor files that reside in the third-party advertising management system. Since a referring web page merely incorporates an advertising tag totally devoid of advertising content, no changes whatsoever need to be made to that page. Hence, use of our inventive technique substantially reduces the burden, time and cost associated with maintaining and updating web-based advertising over that conventionally required.

As a feature, our inventive technique advantageously implements, in conjunction with its persistent agent approach, multi-threaded pipelining. By processing each different advertisement as a different thread, each one of a sequence of different processing operations can be performed, effectively on a pipe-lined parallel basis, on different sequentially occurring advertisements, thereby enhancing a rate (increasing throughput) at which advertisements can be queued for playback. In addition, through such pipe-lining, logging of a fully presented advertisement can occur as a last operation in a pipeline and essentially in parallel either with: presentation of cached advertisement having its AdDescriptor file situated in the play queue immediately behind that for the just presented advertisement, or downloading and caching of a next successive advertisement.

BRIEF DESCRIPTION OF THE DRAWINGS

The teachings of the present invention can be readily understood by considering the following detailed description in conjunction with the accompanying drawings, in which:

FIG. 1A depicts the correct alignment of the drawing sheets for FIGS. 1B and 1C;

FIGS. 1B and 1C collectively depict a high-level block diagram of an illustrative client-server distributed processing environment, implemented through the Internet, which embodies the teachings of our present invention, along with, as pertinent to the invention, basic inter-computer actions that occur in that environment and associated client processing operations;

FIG. 1D depicts the correct alignment of the drawing sheets for FIGS. 1E and 1F;

FIGS. 1E and 1F collectively depict the same environment as shown in FIGS. 1B and 1C but showing a detailed version of agent download/instantiate/execute operations 50 shown in the latter figures;

FIG. 2 depicts the correct alignment of the drawing sheets for FIGS. 2A and 2B;

FIGS. 2A and 2B collectively depict generalized web page HTML code 35, specifically inclusion of advertising tag 40, which transparently invokes our invention, and changes which our invention dynamically makes to that code, specifically substitution of Transition Sensor applet 210 for tag 40 to yield page 35', in order to download and render web advertisements;

FIG. 6 depicts the correct alignment of the drawing sheets for FIGS. 6A and 6B;

FIGS. 6A and 6B collectively depict a high-level flowchart of processing operations 600 performed by AdController agent 420 shown in FIG. 5;

FIG. 7 depicts a high-level block diagram of basic processing threads that implement AdController applet 424 which, as shown in FIG. 4, forms part of AdController agent 420;

FIG. 8 depicts a high-level flowchart of processing operations 800 performed by AdController applet 424 shown in FIG. 7;

FIG. 9 depicts the correct alignment of the drawing sheets for FIGS. 9A and 9B;

FIGS. 9A and 9B collectively depict a flowchart of processing operations 900 performed by AdController applet 424, shown in FIG. 7, specifically for processing an advertisement;

FIG. 10 depicts inter-applet events that occur within AdController agent 420 during execution of Transition Sensor applet 422;

FIG. 11 depicts a high-level block diagram of basic processing threads that implement Transition Sensor applet 422 which, as shown in FIG. 4, forms part of AdController agent 420;

FIG. 19 depicts a flowchart of start method 1900 invoked by Transition Sensor applet 422 shown in FIG. 4; and FIG. 20 depicts contents of actual illustrative AdDescriptor file 2000 for use in interstitially rendering a PointCast type Java advertisement through our present invention.

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in any networked client-server environment in which advertising or other information is to be presented to a user during interstitial intervals, i.e., during a transition between successively displayed web pages. Such an environment can encompass the Internet or an intranet, or any client-server environment in which a client browser (regardless of whether that browser executes on a dedicated client computer or not) is used to access and download web pages or, more generally speaking, files through a network communication channel (link) from a server (again regardless of whether that server executes on a dedicated computer or not). In that regard, the server can be a separate software application which executes on any computer in the networked environment, even if that computer is itself a client to another server in the network.

For purposes of simplicity and to facilitate reader understanding, we will discuss our present invention in the illustrative context of use in rendering interstitial web-based advertisements to a client personal computer (PC) connected to the Internet, where specifically a client browser executing in the PC is used to download and render web pages from a remote networked Internet accessible web server. Clearly, after considering the ensuing description, anyone skilled in the art will readily appreciate how the teachings of our invention can be easily incorporated into any client-server or other similar distributed processing environment in which a client can encompass not only a specific computer connected to a network but a software process that possesses network connectivity to another such process and requests information from and, in response, obtains information supplied by the latter.

We will first present an overview of our invention, particularly in the context of its use with an Internet web browser in a client PC, followed by describing each basic component of its implementation.

A. Overview

Figure 1B:
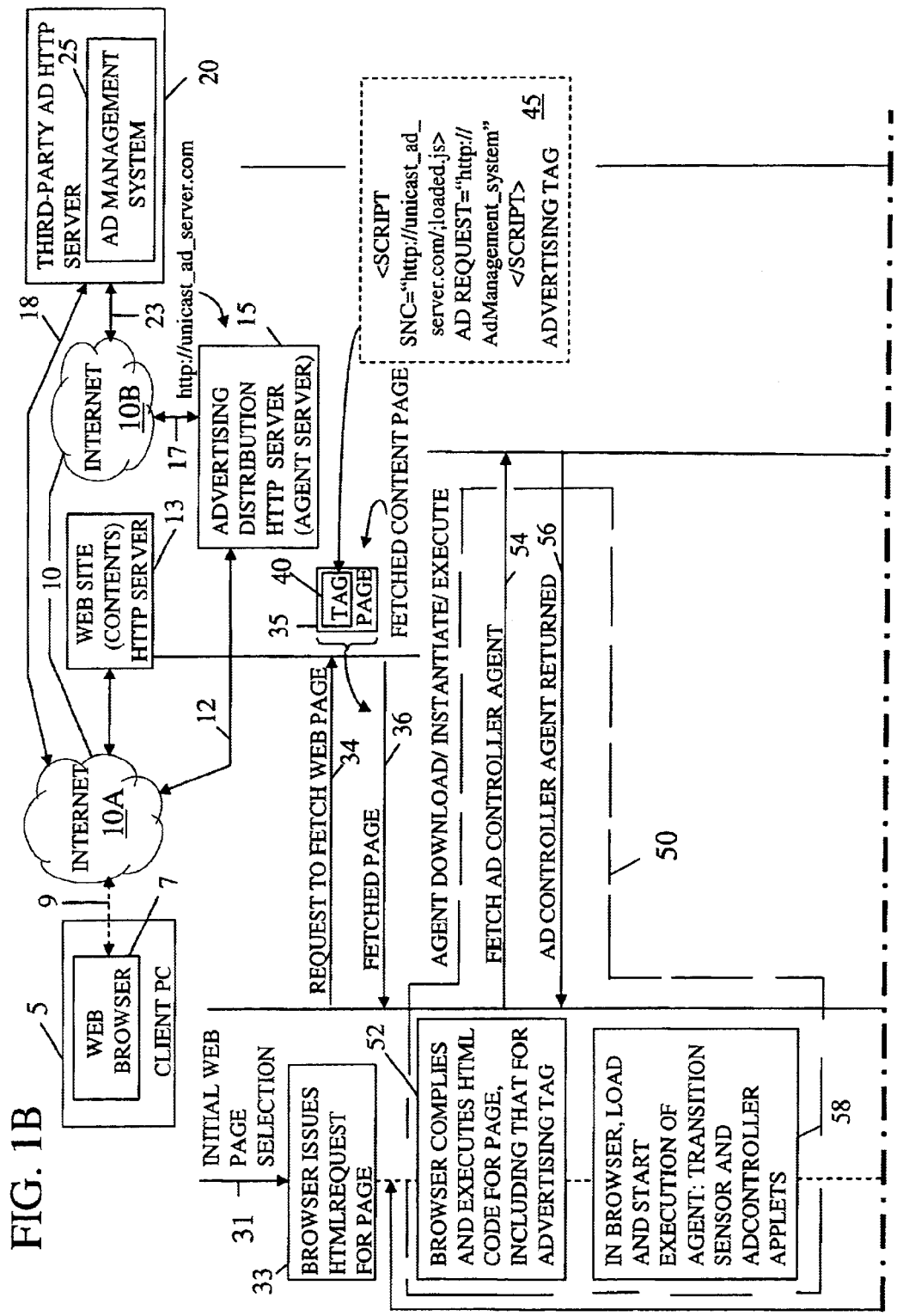
Figure 2B:
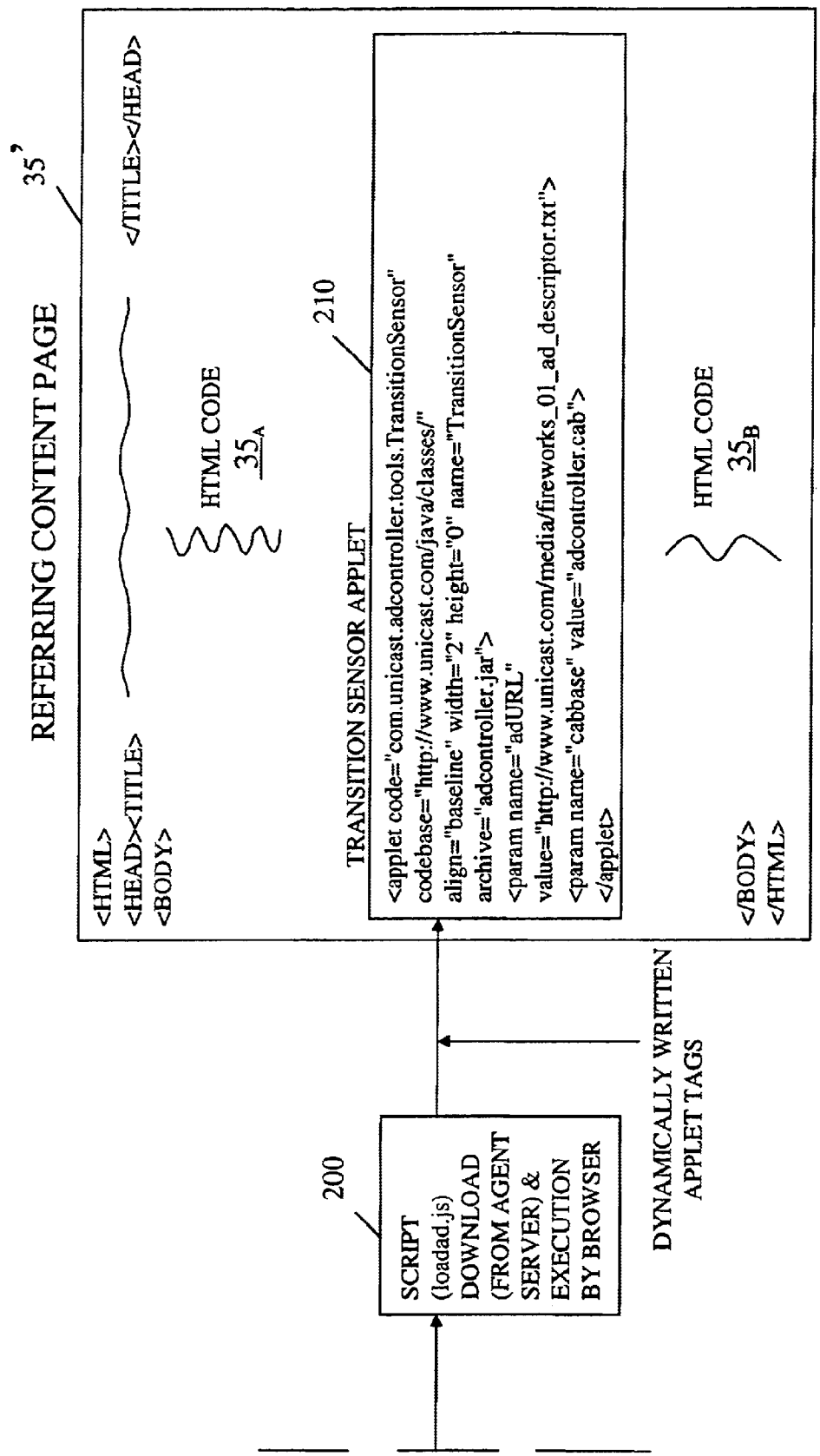

A general deployment of our invention in an Internet environment is collectively shown in FIGS. 1B and 1C, with a detailed view of a portion of the inter-processor agent download/instantiation operations 50 shown in these figures being depicted in FIGS. 1E and 1F. The correct alignment of the drawing sheets for FIGS. 1B and 1C, and 1E and 1F is shown in FIGS. 1A and 1D, respectively. FIGS. 2A and 2B, for which the correct alignment of the drawing sheets for these figures is shown in FIG. 2, collectively depicts generalized web page HTML code which transparently invokes our invention, and changes which our invention dynamically makes to that code in order to download and render web advertisements. For a understanding, the reader should simultaneously refer to FIGS. 13 and 1C, 1E and 1F, and 2A and 2B throughput the following discussion.

As shown, client PC 5, upon which client browser 7 executes, is connected through communication link 9 to Internet 10. Browser 7 is a conventional web browser, such as Internet Explorer or Netscape Navigator commercially available from Microsoft Corporation or Netscape Corporation, respectively. Preferably, for reasons that will shortly become clear, that browser should preferably support dynamic writing of applet tags. Though, for ease of illustrating inter-computer actions, we depicted Internet 10 as having portions 10$_A$ and 10$_B$, we will collectively refer to both portions as simply Internet 10. Web server 13, connected, via link 11, to Internet 10 represents any web HTTP (hypertext transfer protocol) server. This server, in response to a request to fetch a specific file from web browser 7, downloads that file, using conventional TCP/IP protocols (transmission control protocols/internet protocols), through the Internet to browser 7. Browser 7 will, in turn, render that file typically on a monitor to a user situated at the client PC.

Advertising distribution HTTP server (also referred to as "agent" server) 15 is connected, via communications link 17, to Internet 10 and stores files that collectively implement a predefined agent, specifically, a light weight Java applet. This agent (referred to herein as the "AdController" agent) transparently pre-loads itself, as well as media rich advertising content, into a local hard disk cache associated with the browser ("browser disk cache") on client PC 5. Server 15 downloads the AdController agent in a manner to be described below, to client browser 7. This agent, once instantiated and started, then transparently and politely downloads (actually pre-loads) advertisements into the browser disk cache, and subsequently plays each of those advertisements, on an interstitial basis, in response to a click stream generated by the user as (s)he navigates, through use of browser 7, between successive web pages. Such hard disk caching advantageously circumvents variable latency and erratic play associated with conventional streamed and static media delivered over the Internet. The agent enables rich advertising to be presented in a highly-controlled fashion, resulting in user experiences approaching that of CD-ROM.

Third-party ad HTTP server 20, connected to Internet 10 via, e.g., communications links 18 and 23, hosts ad management system 25. In essence and as discussed in detail below, this system, in response to a request originating from the AdController agent executing in browser 7, selects a given advertisement and then downloads, in a "polite" manner controlled by the agent, media and player files that form that advertisement to the agent for storage in the browser disk cache. Inasmuch as Java applets are currently restricted under constraints inherent in the Java programming language itself to retrieving files from an identical Internet host that served the applet itself, the request for an advertisement to system 25 as well as resulting media and player files served by system 25 are routed through agent server 15 as a proxy server.

Advantageously, our inventive technique completely "decouples" advertising content from a web content page (also hereinafter referred to as a "referring" page). This, in turn, permits our technique to render media-rich advertisements without requiring inclusion of any advertising content into a referring web page. This "decoupling" is effectuated through inclusion of an HTML tag into a content web page, which when the latter is downloaded, interpreted and executed by the browser, effectively loads and instantiates the agent and then retrieves advertisement files from an ad management system specified in the tag. Thus, advertising files (both media and player files) can be maintained totally independently of their referring web page(s), with advantageously any changes made to the former having no effect on HTML coding contained in the latter.

In particular, HTML tag 40 (which, where necessary, to distinguish this tag from other HTML tags, will also be referred to hereinafter as an "advertising tag") is embedded by a content provider(s) into HTML code that constitutes each referring web page, e.g., here page 35. Generally, the position of this tag relative to existing HTML code (shown as HTML code portions $35_A$ and $35_B$ in FIGS. 2A and 2B) for this page is not critical. Advantageously, very rarely, if ever at all, do any changes need to be made to these code portions to accommodate the tag. As shown and as reproduced in Table 1 below, this tag, which typically consumes one line in a web page, implements a script.

TABLE 1

ADVERTISING TAG

<SCRIPT SRC=http://unicast.com/loadad.js>
AdServer="http://AdManagementsystem"
</SCRIPT>

One portion of the advertising tag ("SRC=http://unicast.com/loadad.js"), when executed by the browser, downloads a JavaScript file (named "loadad.js") from the agent server. This file, in turn, is then interpreted and executed, as a script, by the browser. The effect of executing this script, as symbolized by block 200 shown in FIGS. 2A and 2B, is to substitute applet tags, dynamically written by the script, into the referring web page in lieu of advertising tag 40 so as to form a modified web page, here referring content page 35', residing in the browser disk cache. The script, by invoking a feature associated with dynamic writing, completely hides these tags from view should the user then display HTML source code for page 35' with his browser. This, in turn, hinders the user, to a certain degree, from readily ascertaining the source of the agent and ad management systems. Collectively, these applet tags form Transition Sensor applet 210. This script, as described in detail below and is reproduced in Table 2 below, when interpreted and executed by a Java virtual machine (Java interpreter) resident in the browser persistently loads and then instantiates the Transition Sensor itself which, in turn, loads and instantiates the remainder of the agent in the client browser.

TABLE 2

TRANSITION SENSOR APPLET

<applet code="com.unicast.adcontroller.tools.TransitionSensor"
codebase="http://www.unicast.com/java/classes/"
align="baseline" width="0" height="0" name="TransitionSensor"
archive="adcontroller.jar">
(param name="adURL"
value="http://www.unicast.com/media/fireworks_01_ad_descriptor.txt">
(param name="cabbase" value="adcontroller.cab">
</applet>

The value of attribute CODE in the Transition Sensor applet specifies a Java executable that will be executed by the client browser, when it renders this applet, to launch the Transition Sensor. The executable, implemented through an appropriate Java class, was originally compiled from its associated Java source code file. Tags labeled "<WIDTH>" and "<HEIGHT>" jointly specify a rectangular portion of a web page, as displayed by browser 7, in which the applet will be rendered. Since, here that portion is non-existent, nothing will be rendered. Applets, such as this one, can be delivered transparently over the Internet to the client PC and require no user-assisted installation.

Another portion of the advertising tag ("AdServer= "http://AdManagement_system") references a URL of a particular ad management system (where "AdManagement_system" represents a web address (URL) of that particular system), here illustratively system 25, from which the agent is to download an advertisement. As will be seen below, the Transition Sensor applet, during its execution, passes this URL, as part of an advertising download request, to the remainder of the AdController agent to subsequently download appropriate advertising files, also as described below, from that system necessary to interstitially play an advertisement.

If advertisements are to play on client browsers (specifically Microsoft Internet Explorer version 3) that do not support dynamic writing of applet tags, then applet 210 would need to be inserted by content providers into each referring web page in lieu of advertising tag 40. Unfortunately, Transition Sensor applet 210 identifies both the agent server, and an actual advertisement in terms of a URL of its source components (through contents of an "AdDescriptor" file—which will be discussed in detail below—specified in this applet). Since browser technology continues to rapidly advance with most users continually upgrading their browsers, most browsers now in use, and in a very short time nearly all such browsers, will support such dynamic writing. Hence, we see little, and very shortly essentially no need, to embed applet 210 into any referring web pages, thus minimizing ad insertion cost, effort and time while restricting disclosure of the agent server and advertisement source information.

The agent, during its execution, "politely" and transparently downloads advertising files (media, and where necessary player files), originating from ad management system 25 for a given advertisement into browser disk cache (with the media files also being written into browser RAM cache) and subsequently plays those media files through the browser on an interstitial basis and in response to the user click-stream.

Advantageously, the agent operates independently, in the client browser, of the content in any referring web page. Once loaded and started, the agent executes in parallel, with standard browser functionality, continually and transparently requesting and downloading advertisements to a browser disk cache residing on a local hard disk ("browser disk cache"), as well as in the case of media files into browser RAM cache, in a client computer (e.g., personal computer—PC) and interstitially playing those advertisements.

Now, with the above in mind and specific reference to FIGS. 1B and 1C, we will now describe the basic inter-computer actions associated with use of our invention, as well as the basic attendant processing steps that occur in the client PC.

To begin a browsing session, the user first invokes client browser 7. Once the browser is executing, the browser obtains, as an initial web page—selection of this page being referenced by numeral 31, an address either of a prior so-called default" content page previously specified by the user and having its URL 1 stored in the browser or of a content page manually entered by the user. The client browser then issues, as symbolized by block 33, a request to fetch a file for that page; with the request containing a URL of that page (i.e., its complete web address including its file name). We assume for simplicity that the file for that page resides on web server 13. We also assume that page 35 is being requested which will invoke an associated interstitial advertisement in accordance with our invention. In response to the request routed to server 13—as symbolized by line 34, this particular server downloads, as symbolized by line 36, to client PC 5 a file for page 35, where the coding stored in this file contains advertisement tag 40. Illustrative contents of this tag are shown in dashed block 45, as well as in FIGS. 2A and 2B.

Once this file is received as shown in FIGS. 1B and 1C, browser 7 interprets and then executes, as symbolized by block 52, the HTML code in page 35, which includes tag 40 and thus undertakes the actions shown in agent download/ instantiate/execute operations. 50. These operations eventually result in the AdController agent being downloaded, instantiated and started in the client browser. Generally speaking, the browser in response to executing the advertising tag, issues a request, as symbolized by line 54, to agent server 15 to download the AdController agent. Through various inter-processing operations, as shown in further detail in FIGS. 1E and 1F and which will be described below shortly, server 15 accesses and downloads, as symbolized by line 56, the needed files to install the AdController agent to execute under browser 7 on the client PC. Once files for the agent are downloaded to the browser disk cache on the client PC, the browser then instantiates and starts the agent executing, as symbolized by block 58. Operations 50 effectively conclude once the agent begins executing.

Now referring to operations 50 as shown further detail in FIGS. 1E and 1F, upon entry into these operations, browser 7 executes, as symbolized by block 110, advertising tag 40. The browser then issues a request, as symbolized by line 115, to agent server 15, to download a JavaScript file (named, e.g., "loadad.js") specified in the request. This file is specified as the first portion of the advertising tag. In response to this request, server 15 downloads, as symbolized by line 120, this particular file onto browser 7 where that file is cached appropriately. Once the file is fully downloaded, it is interpreted and executed by a Java virtual machine (a Java interpreter integrated into the browser and which generates code compatible with and executable by the browser). As indicated by block 125, the browser then executes the interpreted code for the script which, in turn, dynamically writes applet tags—in the manner generally shown in FIGS. 2A and 2B and described above—into web page 35 in lieu of the advertising tag. These tags, which collectively form Transition Sensor applet 210, include a reference to a specific ad management system as specified in the second portion of advertising tag 40.

Once these tags are dynamically written into content web page 35 (to yield modified version 35' shown in FIGS. 2A and 2B), Transition Sensor applet 210 is instantiated and then executed. In particular, browser 7 determines whether executable code for the Transition Sensor applet has been previously downloaded to the browser disk cache. If this code has not been downloaded or an updated-version of this code exists on agent server 15, the browser issues, as symbolized by line 130, a request to download a latest version of the Transition Sensor executable code from the agent server. Server 15, in response to this request, downloads, as symbolized by line 135, file(s) for the latest version of the transition sensor code to the browser which, in turn, stores these file(s) into the browser disk cache. Thereafter as symbolized by block 140, the browser instantiates and starts execution of the Transition Sensor applet. This latter applet, as part of its initial execution, instantiates an Applet Registry. This registry provides a mechanism, within the agent, for inter-applet communication between the constituent Transition Sensor and AdController applets.

Thereafter, the Transition Sensor applet attempts to load, also as symbolized by block 140, the AdController applet, through the browser, from the browser disk cache. To do so, the browser first determines whether the AdController applet has been downloaded to the browser disk cache or whether an updated version of this particular applet resides on agent server 15. If an updated version of this applet exists on the agent server relative to that previously downloaded to the browser disk cache or if the AdController applet has not been download at all into this cache, the browser issues a request, as symbolized by line 150, to download a latest version of the AdController applet from agent server 15. Server 15, in response to this request, downloads, as symbolized by line 155, file(s) for the latest version of the AdController applet to the client browser which, in turn, stores these file(s) into the browser disk cache. Lastly, as symbolized by block 160, the Transition Sensor applet then instantiates and starts the AdController applet; and thereafter establishes appropriate entries in the Applet Registry for itself and the AdController applet.

Returning to FIGS. 1B and 1C, once operations 50 have completed, such that the agent is executing under browser 7, the AdController applet issues, as symbolized by block 60, a request, via agent server 15, to download an AdDescriptor file from the ad management system, e.g., ad management system 25, specified in advertising tag 40. This request contains the URL of the ad management system contained in advertising tag 40. Currently, Java applets are restricted under constraints inherent in the Java programming language itself to retrieving files from an identical Internet host that served the applet itself. As such, rather than directing this request to advertising server 20, on which ad management system 25 resides, this request, as symbolized by line 62, is addressed to agent server 15, which serves as a proxy server between client PC 5 and advertising server 20. Both the request and resulting advertising (including media and player) files will be served to the client PC through agent server 15. As such, once the request has been received by the agent server, this server passes the request onward, as symbolized by line 64, to advertising server 20.

In response to this request for an AdDescriptor file, ad management system 25 then selects a specific advertisement to be delivered to client PC 5. This selection can be selected on a predefined or random basis, or based on user preference or other user-specific information previously collected from and associated with the user then operating browser 7. Such user-specific information, such as prior buying patterns, could have been appropriately pre-collected at the client PC, previously uploaded to ad management system 25 and processed there such that, upon receipt of the AdDescriptor request, system 25 would then select and download an appropriate advertisement specifically targeted to the user then situated at the client PC. In any event, once system 25 selects the advertisement, through whatever selection metric it employs, the corresponding AdDescriptor file is then downloaded, as symbolized by line 66, to agent server 15 (here being a proxy server) which, in turn, as symbolized by line 68, supplies that file to the AdController agent then executing under web browser 7.

To digress slightly, for the selected advertisement, the AdDescriptor file is a text file that contains a manifest, i.e., a list, of file names and corresponding network locations (URLs) at which these files reside, and player instructions and configuration parameter values necessary to play the entire advertisement through web browser 7 to the user. FIG. 20 shows contents of typical AdDescriptor file 2000 for a PointCast Java advertisement. Specifically and as shown in section 4C of file 2000, this AdDescriptor file lists file names with partial addresses on the ad management system of all media files that constitute content for that advertisement, and, in section 1 of this file, all Java player files necessary to play all the media files. This file also respectively specifies, here shown in sections 3 and 4B, an order in which the various media files are to be played, and various configuration parameters needed to properly configure the operation of each player to play each corresponding media file.

The AdDescriptor file implements a data abstraction that totally separates the media and player files from the referring web page, here page 35, thus assuring that the advertisement content itself remains completely independent of the content web page that invoked its presentation. This abstraction permits our technique to provide a highly effective, generalized and very flexible mechanism for delivering rich web advertisements, particularly those that require complex sets of media files and players. Through use of this abstraction, our inventive technique can handle present and future media formats, regardless of their requirements, including proprietary streaming and other content delivery technologies that rely on Java applets as a delivery mechanism—all transparently to the user. Moreover, the AdDescriptor file can contain separate listings (though not contained in file 2000 shown in FIG. 20) that delineate media and player files for different browsers, client operating systems or computing platforms (to the extent any of these require different versions of the media and/or player files) then in use. As such, our technique can readily function with a wide variety of different client computers and browsing platforms.

Once the AdDescriptor file is downloaded to the client PC, via agent server 15, the AdController then "politely" downloads, as symbolized by block 70 shown in FIGS. 1B and 1C, into the browser disk cache each media and player file, as specified in the AdDescriptor file—to the extent that file does not already reside on the hard disk of the client PC. Through so-called "polite" downloading, media and player files are downloaded to browser 7 during browser idle time intervals, with the downloading suspended during each ensuing interstitial interval after the user instructs browser 7 to navigate to a new content web page. In this manner, while a fully downloaded advertisement is interstitially played from browser cache, the new content page is downloaded over the full bandwidth of communications link 9. Advantageously, the communications link is freed during each interstitial interval to just carry web page content, thereby expediting download of content pages. If, due to the occurrence of an interstitial interval, the AdController applet suspends downloading of an advertisement file, then upon termination of this interval, this applet then resumes downloading at a location in that file at which downloading had stopped, thus conserving communication bandwidth and reducing download time.

In particular, as part of the operations symbolized by block 70, the AdController applet determines which files, of those listed on the AdDescriptor, do not then reside on the hard disk of client PC 5. Once it has made that determination, this applet issues a request, as symbolized by line 72, to agent server 15, to fetch a first one of these files. The agent server, again serving as a proxy server, issues a request, as symbolized by line 74, to fetch this file from a networked server, anywhere on Internet 10, on which that file resides. For simplicity, we assume that all such files reside on server 20 and are accessible through ad management system 25. Hence, system 25, via server 20, issues a response, as symbolized by line 76 to agent server 15, containing this first advertisement file. The agent server, in turn and as symbolized by line 78, downloads this particular file to client browser 7 for storage in the browser disk cache. Downloading of advertisement files continues in this manner until, as symbolized by line 88, a last required file for the advertisement has been downloaded, via agent server 15, to the browser disk cache on client PC 5.

As the advertisement files for a common advertisement are being downloaded, the Transition Sensor applet also monitors, as symbolized in block 90, a click-stream produced by the current user so as to detect a user-initiated page transition. Once such a transition occurs, usually caused by a user engendered mouse click, and hence an interstitial interval starts, the AdController applet plays, also as symbolized by block 90, a fully cached advertisement (assuming all its media and player files have been downloaded) in the manner specified in its associated AdDescriptor file and using the players specified therein. Also, at the inception of the interstitial interval, the browser issues, also as symbolized by block 90, a request to fetch the next successive web page to which the user desires to transition. Once the advertisement has fully played, or until the next successive content web page is fully downloaded and assembled, or a user has closed an advertisement window, whichever occurs first (assuming the AdDescriptor file specifies that the advertisement can be prematurely terminated), then control is returned, as symbolized by path 94, to the client browser to await completion of the download and interpretation of HTML code that forms that next content page and subsequent execution, of an advertising tag therein to invoke agent download/instantiate/execute operations 50 for that page; and so forth.

The Transition Sensor and AdController applets are each implemented through appropriate Java classes and collectively persist, through storage in the browser disk cache, across different content pages within a site, different web sites, and successive browser sessions. Once either of these applets is completely downloaded through operations 50, providing that applet is not subsequently flushed from the browser disk cache as the user navigates across web sites on the web, the files for that applet will be loaded from that cache, rather than being downloaded from agent server 15, the next time that applet is required, e.g., when the user next navigates, either during a current browser session or a subsequent session, to any successive content page that contains advertising tag 40.

Whenever client browser 7 encounters a next successive content page containing advertising tag 40, then the browser, will first and automatically inquire with agent server 15 to ensure that executable code for the Transition Sensor applet, if previously downloaded into the browser disk cache, has not been superseded by an updated version. If such an updated version then exists, the browser will collectively download updated files from the agent server and replace, to the extent necessary, each Transition Sensor applet file residing in the browser disk cache with its updated version. Alternatively, if the Transition Sensor applet has not been previously downloaded into the browser disk cache, then the browser will download all the necessary files for the Transition Sensor applet from the agent server into that cache. The Transition Sensor applet, once executing, will load, through the browser, the AdController applet. To do so, the browser will, if necessary, obtain an updated version, from the agent server, in the same manner as it did for the Transition Sensor. As a result, any corrections or enhancements made to the agent (specifically the Transition Sensor and/or the AdController applets) since the agent was last downloaded to the client browser will be automatically and transparently, from a user perspective, distributed to that browser and downloaded into that disk cache the next time the browser encounters a web page containing an advertising tag. By operating in this fashion, the user is totally and advantageously relieved of any need to: both initially load and install an application program to obtain advertising and/or later update that program.

Specifically, cross page persistency of the Transition Sensor agent is accomplished by using a Java "singleton" design. A singleton design allows only a single object to ever be created and is accomplished by declaring a Java class as static. Since all applets run in a same instance of a Java virtual machine, therefore all applets and their associated code share all static class variables. A static Applet Registry class is instantiated automatically by the Transition Sensor applet at its run time and, by implementing the Applet Registry, provides all inter-applet communication between A the Transition Sensor and the AdController applets and their threads. The Applet Registry class implements a "loadAdController" method which, in turn, instantiates the persistent AdController applet. Through this method, the Transition Sensor applet downloads the AdController applet only if the latter applet has either been updated, relative to that version of this applet then resident in the browser disk cache, or does not then reside on the browser disk cache. The AdController applet then instantiates all its own threads that collectively implement transparent advertisement downloading and play mechanisms.

The AdController applet is itself created by an. Applet Registry singleton object and creates all other objects that collectively constitute a run time agent execution module. This applet extends standard applet class definitions by over-riding standard Java applet init (initialize), start, run, stop and destroy life cycle methods, conventionally implemented in the client browser, with corresponding substitute methods. The substitute stop method ensures that a traditional response provided by the browser of halting execution for either the AdController applet does not occur whenever the browser calls the stop method to terminate the lifecycle of this applet; hence, advantageously providing persistence to the agent across successive content pages. Consequently, the agent continues executing until the user terminates execution of (closes) the browser itself.

Thus, the agent persists and functions transparently in background, independent and transparent to user navigation across pages on a common web site and across web sites. In that regard, the agent effectively implements a background process which runs in parallel with and is transparent to normal HTML and HTTP operations implemented by the client browser.

To significantly simplify the description and the accompanying drawings, we have intentionally omitted from this discussion specific Java classes that constitute the AdController agent as well as, to increase a rate at which advertisements can be queued for playback, an accompanying software architecture for processing these classes on a multi-threaded pipelined basis. Such details are conventional in nature; hence, their use in implementing our present invention would be readily apparent to any one skilled in the art.

B. Client PC

Figure 3:
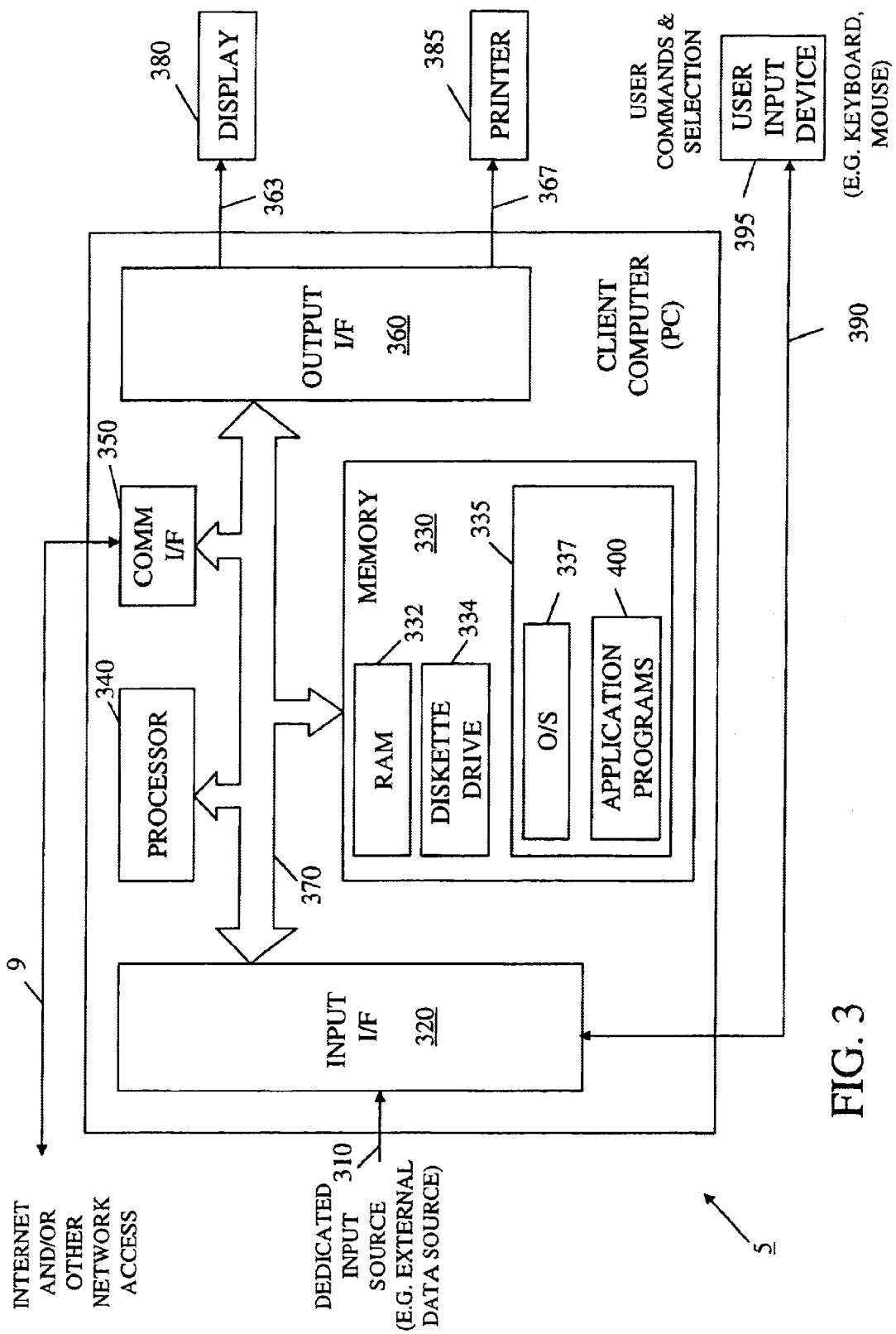
FIG. 3 depicts a high-level block diagram of client PC 5 shown in FIGS. 1B and 1C, and 1E and 1F.

FIG. 3 depicts a block diagram of client PC 5.

As shown, the client PC comprises input interfaces (I/F) 320, processor 340, communications interface 350, memory 330 and output interfaces 360, all conventionally interconnected by bus 370. Memory 330, which generally includes different modalities, including illustratively random access memory (RAM) 332 for temporary data and instruction store, diskette drive(s) 334 for exchanging information, as per user command, with floppy diskettes, and non-volatile mass store 335 that is implemented through a hard disk, typically magnetic in nature. Mass store 335 may also contain a CD-ROM or other optical media reader (not specifically shown) (or writer) to read information from (and write information onto) suitable optical storage media. The mass store stores operating system (O/S) 337 and application programs 400; the latter illustratively containing browser 7 (see, e.g., FIGS. 1B and 1C) which implements our inventive technique. O/S 337, shown in FIG. 3, may be implemented by any conventional operating system, such as the WINDOWS NT, WINDOWS 95, or WINDOWS 98 operating system ("WINDOWS NT", "WINDOWS 95" and "WINDOWS 98" are trademarks of Microsoft Corporation of Redmond, Wash.). Given that, we will not discuss any components of O/S 337 as they are all irrelevant. Suffice it to say, that the browser, being one of application programs 400, executes under control of the O/S.

Incoming information can arise from two illustrative external sources: network supplied information, e.g., from the Internet and/or other networked facility, through communication link 9 to communications interface 350, or from a dedicated input source, via path(es) 310, to input interfaces 320. Dedicated input can originate from a wide variety of sources, e.g., an external database. In addition, input information, in the form of files or specific content therein, can also be provided by inserting a diskette containing the information into diskette drive 334 from which client PC 5, under user instruction, will access and read that information from the diskette. Input interfaces 320 contain appropriate circuitry to provide necessary and corresponding electrical connections required to physically connect and interface each differing dedicated source of input information to client PC 5. Under control of the operating system, application programs 400 exchange commands and data with the external sources, via network connection 9 or path(es) 310, to transmit and receive information typically requested by a user during program execution.

Input interfaces 320 also electrically connect and interface user input device 395, such as a keyboard and mouse, to client PC 5. Display 380, such as a conventional color monitor, and printer 385, such as a conventional laser printer, are connected, via leads 363 and 367, respectively, to output inter-faces 360. The output interfaces provide requisite circuitry to electrically connect and interface the display and printer to the computer system.

Furthermore, since the specific hardware components of client PC 5 as well as all aspects of the software stored within memory 335, apart from the modules that implement the present invention, are conventional and well-known, they will not be discussed in any further detail. Generally speaking, agent server 15 and third-party ad server 20 each has an architecture that is quite similar to that of client PC 5.

C. Software

1. Application Programs 400

Figure 4:
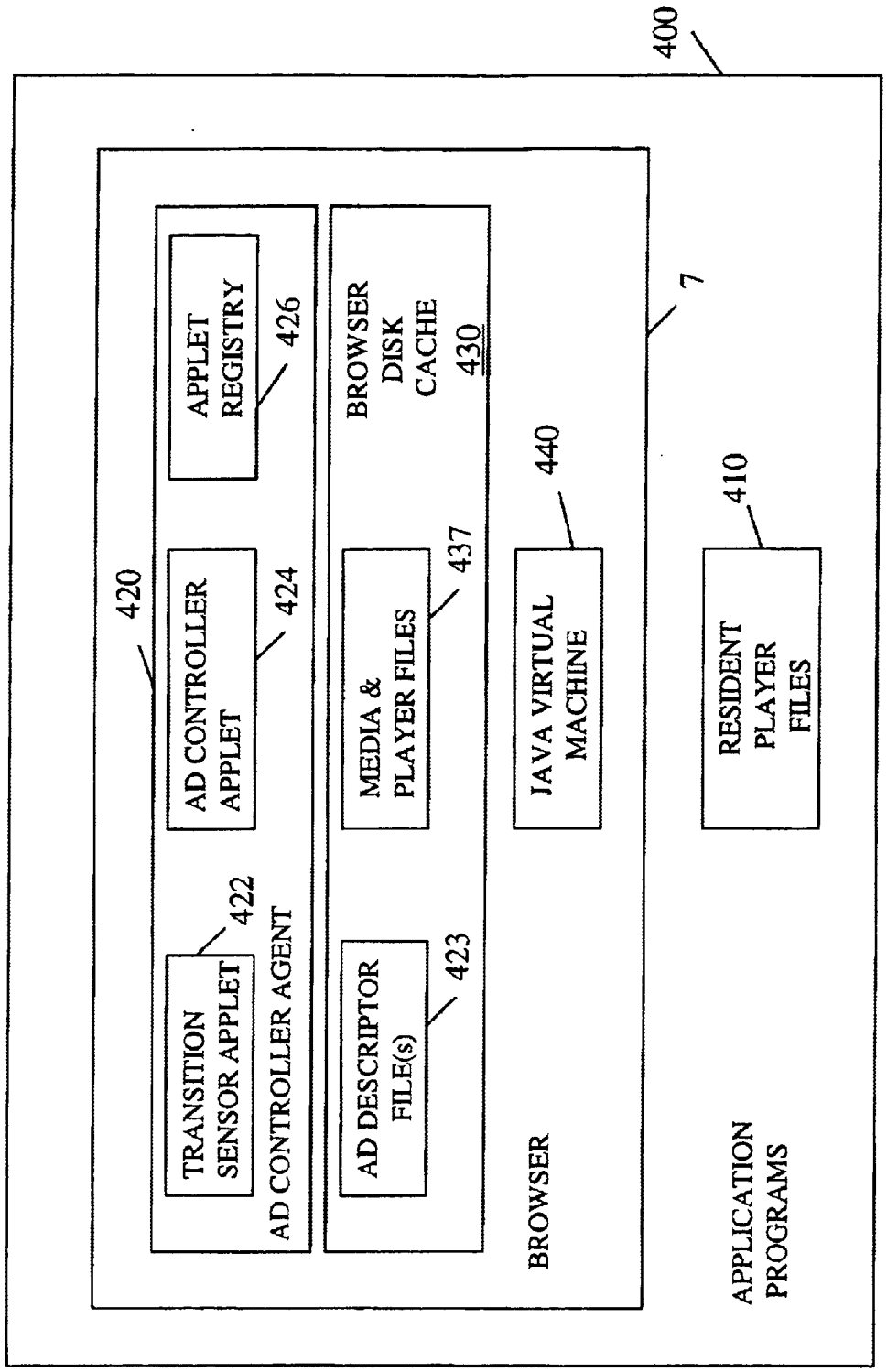
FIG. 4 depicts a simplified high-level block diagram of application programs 400 resident within client PC 5 shown in FIG. 3.

FIG. 4 depicts a simplified high-level block diagram of application programs 400 resident within the client PC.

As shown, the application programs, to the extent relevant, contain browser 7 and resident JAVA player files 410, i.e., files for JAVA media players that have previously been installed onto the hard disk of the client PC. These players may illustratively include audio, streaming audio, Video and multi-media players.

Browser 7 contains AdController agent 420, when it has been fully loaders or execution into browser cache, browser disk cache 430 and Java virtual machine 440 (which has been discussed above to the extent relevant). As noted, this agent persists whenever the user causes browser 7 to transition across different web content pages or different web sites, and functions independently and transparently of any such pages and sites. The AdController agent includes applet registry 426 for facilitating inter-applet communication within the agent.

The AdController agent contains two applets, Transition Sensor applet 422 and AdController applet 424. As discussed above, the Transition Sensor applet accomplishes three basic functions. First, this applet loads, instantiates and starts the AdController applet. Second, the Transition Sensor applet communicates an Internet address of an advertising server, here server 20, to request an advertisement, specifically an AdDescriptor file therefor, that is to be downloaded and subsequently presented. Lastly, the Transition Sensor applet, through associated click-stream monitoring (performed by a Transition Sensor implemented by this applet), determines when a user situated at client browser 7 undertakes an affirmative action, such as, e.g., causing a mouse click, to request a next successive web page be downloaded and rendered, and so notifies the AdController agent of that event. This event signals a start of an ensuing interstitial interval.

AdController applet 424, which is not embedded in any content page, executes under but is not controlled by browser 7. This applet, also as discussed above, accomplishes several basic functions. First, it creates all other objects that collectively form a run time agent execution module for the agent. As noted above, this includes extending standard Java applet class definitions by over riding standard Java applet init, start, run, stop and destroy life cycle methods. Second, the AdController applet "politely" downloads advertising (including media and, where necessary, player) files, through the client browser executing at a client computer, into browser disk cache and in a manner that is transparent to a user situated at the browser. Lastly, the AdController applet interstitially plays advertisements through the client browser in response to the user clickstream associated with normal user navigation across different web pages.

Browser disk cache 430 stores downloaded AdDescriptor files 433 and accompanying and downloaded media and player files 437.

2. AdController Agent 420

Figure 5:
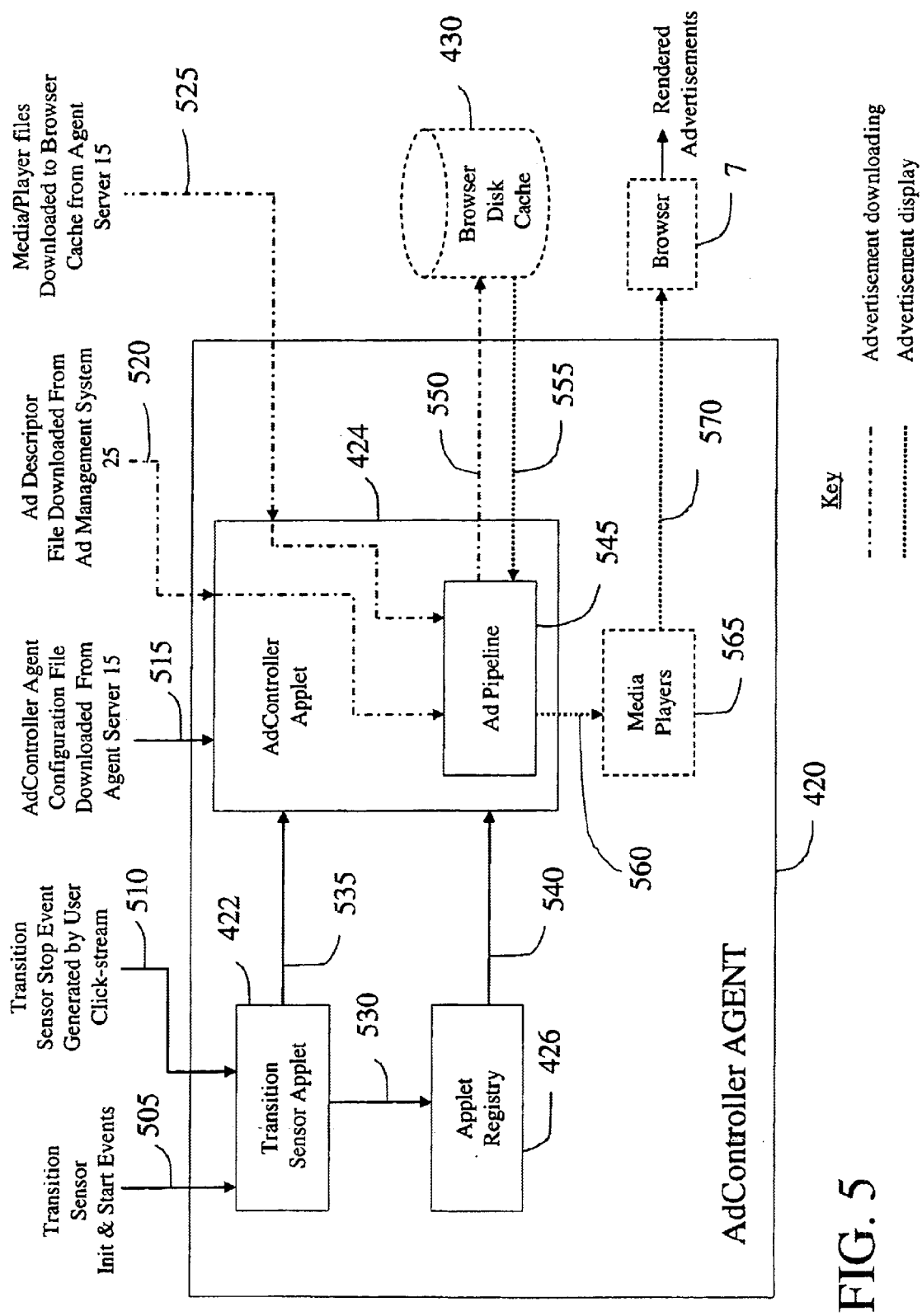
FIG. 5 depicts a high-level block diagram of AdController agent 420 shown in FIG. 4, which implements our present invention.

FIG. 5 depicts a high-level block diagram of AdController agent 420.

As shown, the agent specifically contains Transition Sensor applet 422, AdController applet 424 and applet registry 426.

As discussed generally above, the Transition Sensor applet implements, as one of its functions, a transition sensor which detects, through user navigation click-stream monitoring, a user-initiated transition to a new web page, and produces, in response, a corresponding Transition Sensor event. Such a transition occurs in response to an actual user initiated mouse click or key depression to activate a hotlink appearing on a currently displayed content page in order to move to new content page, either on the same site or on another site. Another such transition occurs whenever a stored history of web pages just visited by the user changes state. The latter is sensed by a JavaScript function that monitors a history stored in browser disk cache 430 of visited web page URLs and generates an event whenever the history changes state. For ease of reference, we will collectively define the term "click-stream" to encompass any user-initiated transition to a new content page, whether it is a mouse click, key depression or history state change.

Transition Sensor events are used to trigger the play of an advertisement only if, by then, all the media and player files for that advertisement have been fully cached into browser disk cache 430. Otherwise, play of that advertisement is deferred until after all those files are cached and the advertisement is ready to be rendered and, importantly, in response to the next user-initiated transition.

Client browser 7 produces init (initialize) and start and stop Transition Sensor events, as symbolized by line 505 and 510, respectively. The init and start events are produced by the browser to initialize (i.e., load and instantiate) and start the Transition Sensor applet. The stop events are also produced by the browser, though through a Transition Sensor stop method which has been substituted for a standard browser stop method, in response to detection, by the Transition Sensor, of user-initiated page transitions. These events control the state of applet 422. Transition Sensor applet 422 communicates directly with AdController applet 424, as symbolized by line 535—such as to pass an Internet address of an advertising server, and indirectly, as symbolized by line 530, through applet registry 426. Registry 426 passes information, as symbolized by line 540, to AdController applet 424.

As noted above, AdController applet 424 extends standard Java applet class definitions by over riding standard Java applet init, start, run, stop and destroy life cycle methods. Doing so, particularly in the case of the Stop method (which will be described below in go conjunction with FIG. 18), permits the AdController 9 applet to persist in browser disk cache 430 as the user navigates across successive pages and web sites.

Advantageously, the AdController applet can readily function in a wide variety of environments, without changes to the coding of the applet itself. This is accomplished through downloading of an external configuration file (specifically file 620 shown in FIGS. 6A and 6B, which will be discussed below), as part of the applet files, from agent server 15. Suitably changing parameter values in the configuration file permits the behavior of applet 424 to be readily changed to suit a desired environment without a need to utilize a different version of that applet for each different environment, otherwise requiring different software classes and with attendant modifications and re-compilation.

Execution of AdController applet 424 begins by Transition Sensor applet 422 calling a standard init Applet method, which downloads the external configuration files, followed by extracting and saving its configuration parameters. These parameters are supplied, as symbolized by line 515, to the AdController applet, during its execution in order to define its behavior given its current execution environment.

As noted above, AdController applet 424 "politely" and transparently downloads advertising (including media and, where necessary, player) files, through browser 7 into browser disk cache 430, for each and every advertisement that is to be subsequently and interstitially played. A data path through which advertisements are downloaded is shown in FIG. 5 by dot-dashed lines; while that for advertisement play is shown in this figure by dotted lines.

Figure 14:
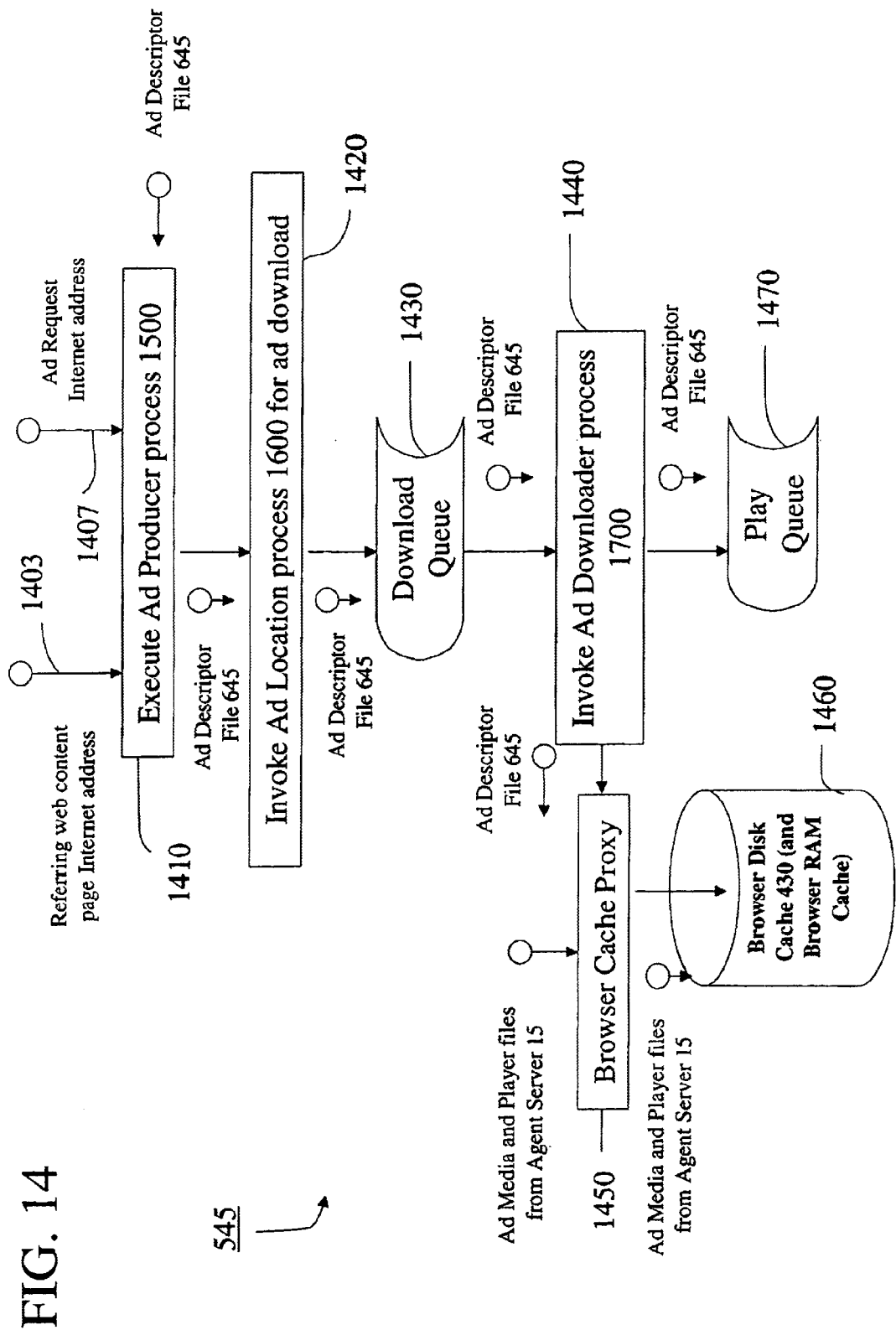
FIG. 14 depicts a high-level block diagram of Ad Pipeline 545 that is implemented by and forms part of AdController applet 424 shown in FIG. 4.

Specifically, to download and play advertisements, applet 424 implements Ad Pipeline 545 (which will be discussed in detail below in conjunction with FIG. 14). Pipeline 545 implements various threads (processes) and data structures which collectively load advertising files into browser disk cache 430 (and, for media files, also into browser RAM cache) and then present fully downloaded advertisements. The pipeline implements Ad Producer, Ad Location and Ad Downloader processes (processes 1500, 1600, 1700 shown in FIGS. 15, 16 and 17, respectively, and discussed in detail below), and download queue 1430 and play queue 1470 (both of which are shown in FIG. 14 and discussed in detail below).

In essence, once Transition Sensor applet 422, as shown in FIG. 5, supplies AdController applet 424 with a URL of an AdDescriptor file, Ad Pipeline 545 then downloads, as symbolized by dot-dashed line 520, the AdDescriptor file, via agent server 15 (serving as a proxy server), from a remote advertising management system. As noted above, this file contains a manifest of media and player files necessary to fully play a complete advertisement. Once this AdDescriptor file has been downloaded into Ad Pipeline 545, pipeline 545 then "politely" downloads, as symbolized by line 525, each file specified in the manifest—to the extent that file does not already reside on the client hard disk. Pipeline 545 then, once the downloading (to the extent needed) is complete writes the AdDescriptor file to the play queue and each downloaded file specified therein to browser disk cache 430; hence forming a queued advertisement for subsequent access.

At the inception of an interstitial interval, signaled by a Transition Sensor stop event, the AdController applet interstitially plays an advertisement that has then been completely queued—both in terms of its media and player files. In particular, at the start of that interval, the Ad Pipeline retrieves an AdDescriptor that is then situated at the head of a play queue. Media players 565 required by that advertisement, as specified in the AdDescriptor file, are started in the order specified in that file along with their corresponding media file(s). A resulting processed media stream, produced by the player(s), and as symbolized by line 570, is rendered through browser 7 to the user. Media players 565 may permanently reside, i.e., apart from being downloaded by agent 420, on the client hard disk (thus being implemented by resident player files 410 as shown in FIG. 4) or be downloaded by pipeline 545 into browser disk cache 430 (and also browser RAM cache) for subsequent access and use (thus stored within files 437 shown in FIG. 4).

Once an advertisement completely plays, AdController applet 424, as shown in FIG. 5, establishes an appropriate log entry for a "user impression" for that advertisement. Advertisement files are retained in the browser disk cache until that cache completely fills, at which point these files, like any other content files stored in that cache, are deleted by the browser on a first-in first-out (i.e., age order) basis. Media players 565, browser 7 and browser disk cache 430 are all shown in dashed lines as these components, while being used by the AdController agent, are not viewed as constituting components solely within the agent itself.

Figures 6, 6B:
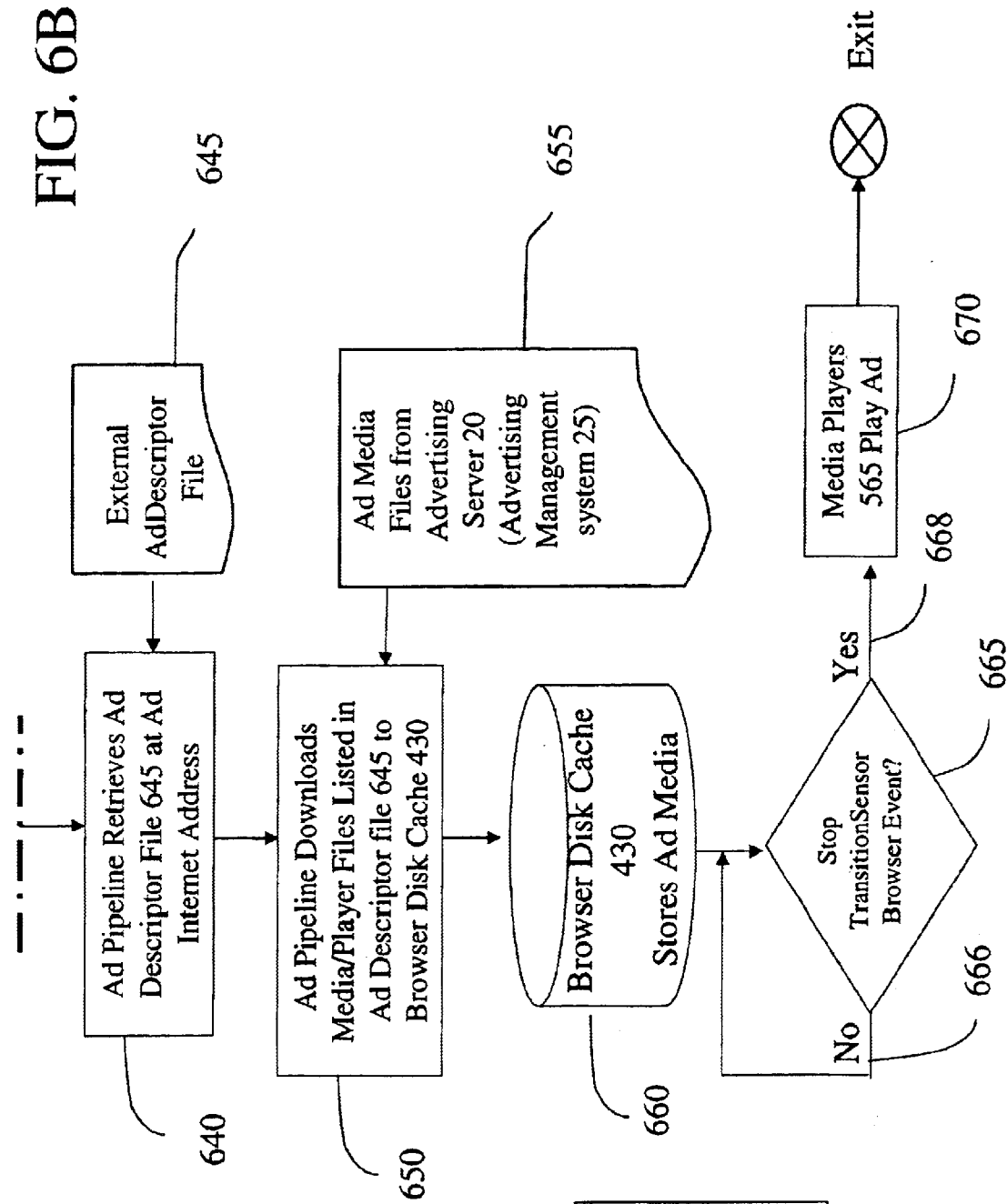

FIGS. 6A and 6B collectively depict a high-level flowchart of processing operations 600 performed by AdController agent 420; the correct alignment of the drawing sheets for these figures is shown in FIG. 6. Though, the operations depicted in this figure—and also in FIGS. 8, 9A and 9B, 12, and 14–19—occur through a multi-threaded approach to process multiple advertisements on a pipelined basis, to simplify all these figures, the sequential processing flow shown in each of these figures is that which processes a single common advertisement. Description of threads and classes is provided to the extent needed to provide a sufficient understanding to those skilled in the art as to how these sequential processing flows would preferably be implemented through a multi-threaded Java class methodology.

Upon entry into process 600 as shown in FIGS. 6A and 6B, which occurs in response to an Transition Sensor init event from browser 7, block 610 is performed. Through this block, Transition Sensor applet 422 instructs the applet registry to load the AdController applet. Once that occurs, block 615 is performed through which external AdController configuration file 620 is retrieved from agent server 15. Thereafter, through decision block 630, agent 420 waits, by looping through NO path 631, until browser 7 generates a Transition Sensor start event. When such an event occurs, execution proceeds, via YES path 633 emanating from this decision block, to block 635. Through this latter block, AdController applet 424 obtains an Internet address of an advertisement management system (e.g., system 25) from which the agent is to retrieve AdDescriptor file 645. Applet 424 then passes this address to Ad Pipeline 545. The Ad Pipeline, as indicated in block 640, than retrieves AdDescriptor file 645 from this address and particularly through agent server 15 serving as a proxy server. Once this file is retrieved, the agent performs block 650 which "politely" downloads all the media and player files 655 (to the extent each file does not already reside on the client hard disk), from advertising management system 25 (residing on advertising server 20), and, through block 660, stores these files into browser disk cache 430 (and, in the case of media files, into browser RAM cache). As noted above, these files are downloaded via agent server 15, which here too serves as a proxy server. This downloading continues until either it finishes or a Transition Sensor stop event generated by the browser arises, whichever occurs first. As to the stop event, decision block 665 tests for its occurrence, with execution looping back, via NO path 666, in the absence of such an event. However, whenever this event occurs, such as (as discussed above) in response to a user-initiated page transition, decision block 665 routes execution, via YES path 668, to block 670. This latter block then, using media players 565, plays an advertisement then fully queued in the play queue on the browser disk cache, i.e., an AdDescriptor file for this ad then resides at a head of the play queue and all associated media and player files for that advertisement, as specified in that AdDescriptor file, then reside on the client hard disk.

3. AdController Applet 424

FIG. 7 depicts a high-level block diagram of basic execution threads that implement AdController applet 424.

As shown, in response to a Transition Sensor init event produced by the client browser, one thread executes block 710 to initialize AdController applet 424. This block performs the downloading (to the extent necessary) and instantiation of applet 424. In response to a Transition Sensor start event produced by the client browser, another thread, by executing block 720, starts the AdController applet. Once this applet is started, this applet, in turn and as discussed above, through execution of block 730, enables downloading of advertising (media and player) files to commence. In response to a received Internet address of a remote ad management system (here, e.g., system 25 shown in FIGS. 1B and 1C) supplied by the Transition Sensor applet, a third thread requests, through execution block 740 shown in FIG. 7, an AdDescriptor file from the ad management system situated at this address and then downloads AdDescriptor file 645 received in response. If, by this time, block 730 has enabled advertisement downloading, then advertising files, as specified in AdDescriptor file 645, are "politely" downloaded as required. In response to a Transition Sensor stop event produced by the client browser and which signals an inception of an interstitial interval, another thread, here commencing with execution of block 750, suspends downloading of advertisement files in favor of displaying a queued advertisement. Once this downloading is suspended, this last thread invokes block 760 to commence play of an advertisement then situated, in terms of its AdDescriptor file, at a head of the play queue.

FIG. 8 depicts a high-level flowchart of processing operations 800 performed by AdController applet 424.

Upon entry into operations 800, which occurs in response to an init event produced by the Transition Sensor applet, block 810 is performed. Through this block, the AdController applet is initialized. This includes downloading files, to the extent needed, for this applet from the agent server and then instantiating this applet. Once this occurs, block 810 tests for an occurrence of AdController start event produced by the Transition Sensor applet. Until this event occurs, execution merely loops back, via NO path 812, to block 810. When this event occurs, decision block 810 routes execution, via YES path 814, to block 815. This latter block, retrieves external AdController configuration file 620 from the agent server. Thereafter, block 820 occurs through which the AdController applet creates and starts Ad Pipeline 545. Once the pipeline is fully started, then, block 825 is performed to enable advertisement files to be "politely" downloaded into the Ad Pipeline and to thereafter actually download such files. While advertisement files are being downloaded or thereafter, if such downloading has completed, decision block 830 tests for an occurrence of a Play Ad event. If no such event occurs, then execution loops back, via NO path 833, to decision block 830 to continue any further downloading. If however, a Play Ad event occurs, then decision block 830 routes execution, via YES path 837, to block 840. This latter block suspends further downloading of advertisement files into the Ad Pipeline. Once this occurs, than block 845, when performed, issues a request to the Ad Pipeline to play an advertisement having its AdDescriptor file then located at the head of the play queue. While the advertisement is being played, decision block 850 tests for an occurrence of an shutdown event generated by the browser, such as caused by, e.g., a user-initiated transition or the user closing an advertisement window or closing the browser itself. If such an event does not occur, decision block 850 routes execution, via NO path 853, back to block 825 to re-enable "polite" download of advertisement files once again. If such a shutdown event occurs, then processing operations 800 terminate, via YES path 857.

Figure 9A:
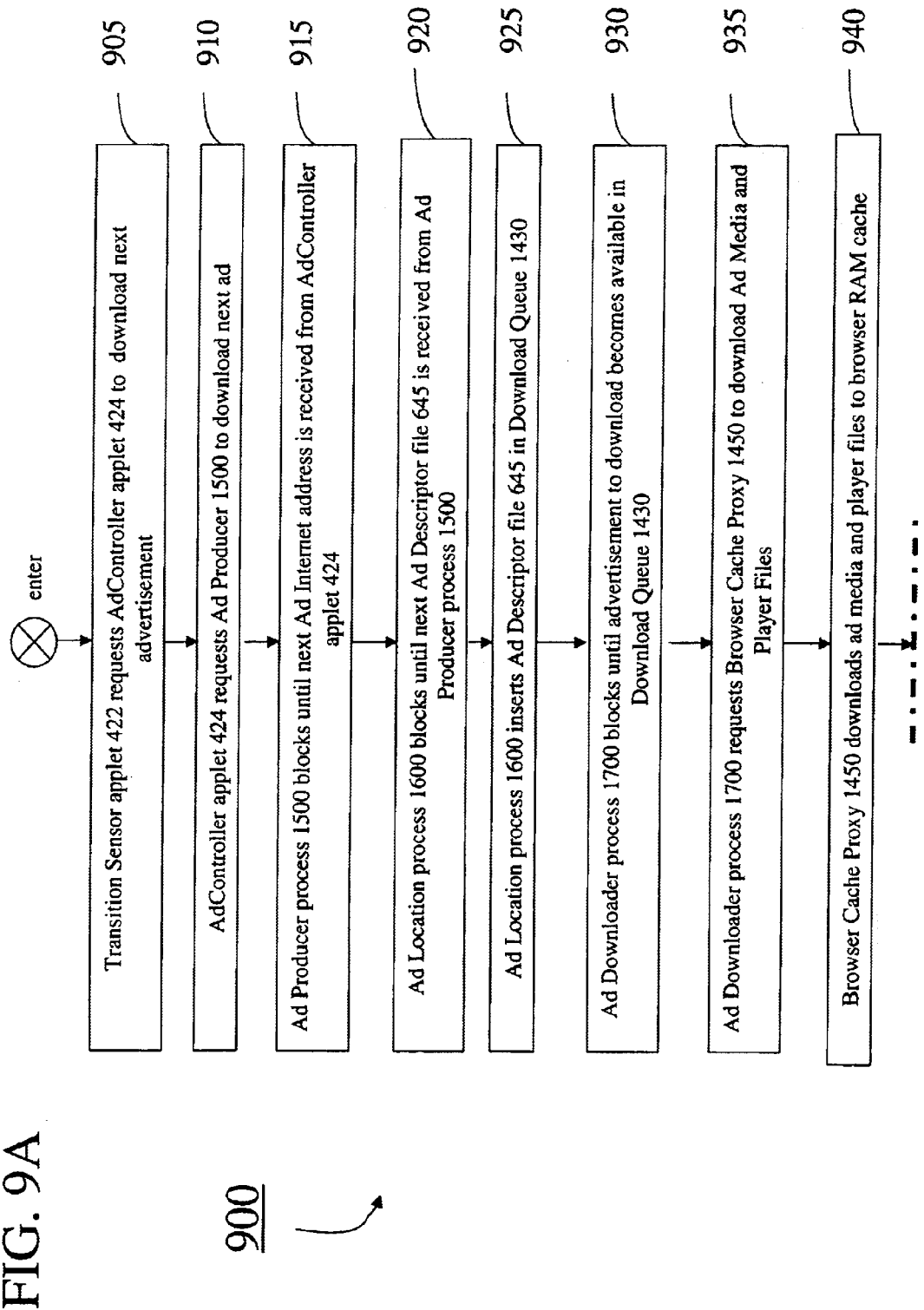

FIGS. 9A and 9B collectively depict a flowchart of processing operations 900 performed by AdController applet 424 specifically for processing an advertisement; the correct alignment of the drawing sheets for these figures is shown in FIG. 9.

Upon entry into operations 900, block 905 is performed to receive a request, issued by the Transition Sensor applet, to download a next advertisement, specifically a corresponding AdDescriptor file. This request contains an Internet address of a remote ad management system. In response to this request, AdController applet 424 performs block 910 to request Ad Producer process (also being a thread) 1500 to download an ad. The Ad Producer process, as will be discussed below in conjunction with FIG. 15, requests advertisement files, specifically an AdDescriptor file, from an Internet address communicated by the Transition Sensor applet. Thereafter, through block 915, the Ad Producer process blocks (i.e., it actively waits for its input data) until this process receives the Internet address of the remote advertising management system. Thereafter, block 920 executes to cause Ad Location process (also being a thread) 1600 to block until such time as the AdDescriptor file is fully downloaded by Ad Producer process 1500 and is provided to the Ad Location process. Ad Location process 1600, as will be discussed below in conjunction with FIG. 16, performs the following tasks: (a) on startup of process 1600, this process creates an Ad Producer object; (b) it asks Ad Producer process 1500 for next AdDescriptor file 645; and (c) once process 1600 obtains such AdDescriptor file 645 and if download queue 1430 (see FIG. 14) is not full, it writes that file into this queue. If this queue is then full, process 1600 simply waits until the queue is not full before writing the AdDescriptor file into the queue. Once the AdDescriptor file has been completely downloaded, Ad Location process 1600 inserts, as shown in block 925, this file into download queue 1430.

Once AdDescriptor file 645 is inserted into the download queue, then Ad Downloader process (also being a thread) 1700 executes. This process, as will be discussed below in conjunction with FIG. 17, performs a single chain of tasks.

First, as shown by block 930, process 1700 blocks until such time as the AdDescriptor file for the advertisement to then be downloaded becomes available in the download queue. During its execution, this process asks download queue 1430 if there is an AdDescriptor file therein, i.e., such a file for which advertising files need to be downloaded. If the download queue is empty, then AdDescriptor process 1700 both waits until that queue is not empty and also retrieves the AdDescriptor file over the network. Once the Ad Downloader process has retrieved the AdDescriptor file, this process downloads, as shown by block 940, all the advertising files specified in the AdDescriptor file, into browser disk cache (and, in the case of media files, into browser RAM cache), by using Browser Cache Proxy 1450 (see FIG. 14). Once all the advertising files have finished downloading, the Ad Downloader process, as shown in block 950, moves the AdDescriptor file to play queue 1470 (see FIG. 14). However, if the play queue is then full, the Ad Downloader process will wait until the play queue is not full before moving the AdDescriptor file into this queue.

The Browser Cache Proxy implements an interface to an abstract cache. The cache implementation could be any kind of cache—the browser disk or RAM cache, a Java virtual memory cache, a local raw disk cache, and so forth. Once passed through this cache proxy, the media files that constitute an advertisement will have been downloaded into both disk and ROM cache of the browser. Whenever the Ad Downloader process subsequently tries to access any media file having ar identical URL to that downloaded, this process will first attempt to load the files from the browser disk cache or browser RAM cache instead of downloading the file, via the Internet, from its advertising management server; thus leveraging, even across different referring web pages or sites and to the extent possible, a one time download of an advertising file across different advertisements.

Next, should a Transition Sensor stop event occur, i.e., indicative of a start of a next interstitial interval, then Transition Sensor stop method 1800 will request that AdController applet 424 then play an advertisement. In response to his request, an event scheduler thread within the applet will block, as shown in block 955, until such time as applet 424 responds to this request by initiating play of an advertisement. The event scheduler thread controls playing of advertisements to the user. This process determines when to execute media players specific to the next advertisement in the play queue (i.e., in terms of corresponding AdDescriptor files situated in that queue), as well as provides a callback method which the player executes when that player has successfully completed presenting an advertisement as specified in its corresponding AdDescriptor file. Once the AdController applet has initiated play of an advertisement, then, as shown by block 965, the event scheduler retrieves an advertisement, specifically the corresponding AdDescriptor file, then situated at the head of the play queue. Thereafter, the event scheduler, as shown in block 970, launches execution of the specific media player(s) 565 (see FIG. 5), as specified in the corresponding AdDescriptor file, to play this particular advertisement. The browser disk cache provides the associated content files for this advertisement to the media player(s). Once the advertisement has been fully presented, then, as shown in block 975, AdController applet 424 appropriately logs this presentation into a log file maintained in the browser disk cache for subsequent uploading to the agent server. Execution then exits from operations 900.

A logger process (also implemented as a thread) keeps track of all log entries that need to be sent back to the agent server. This process simply timestamps entries and adds them to a log buffer. Then, periodically, the logger process will flush the log back to the agent server where those entries can be archived and analyzed.

For an advertisement, player mechanisms take associated media files specified in the associated AdDescriptor file from the browser cache and actually display these files to a user via a viewable frame or window. The user will view a pre-cached smoothly playing advertisement out of the browser disk cache and, where appropriate for media files, from browser RAM cache, rather than being streamed in over the Internet. Four modes for displaying advertisements are supported; namely, user-event triggered ad play, frame targeted ad play, timer based ad play and PopUp Java frame play. Each of these player mechanisms uses a media player module (contained within media players 565 shown in FIG. 5) and a player thread. The player thread provides an actual presentation of advertising media to the user then operating the client browser. The combination of a player and a player thread provides capabilities of: controlling time-based frequency of advertisement play using an agent configurable timer; displaying advertising media files in a browser window or Java frame; waiting a configurable amount of time (usually the length of the advertisement as specified in its AdDescriptor file); and terminating the advertisement visually upon completion, or at a request of the user if the advertisement, as configured in its AdDescriptor file, permits pre-mature termination.

A frame targeted play renders advertisement media onto a browser window. Such play is interruptible and restartable upon user-demand. Timer based ad play utilizes a separate thread that continuously loops to: obtain an AdDescriptor file from the play queue; display that advertisement using a player and player thread; and sleep for a specified amount of time before repeating this sequence. Timer-based ad play is also interruptible and restartable upon user-demand. The result of this type of advertisement play is that the user will periodically view advertisements delivered at regular time intervals rather than by user initiated events. The PopUp Java frame play is a separate thread that also continuously loops to: obtain an AdDescriptor file from the play queue; waits for a signal that a user-initiated transition is occurring; pops up a display window ("pop-up" window) in the browser, for a pre-defined period of time, and presents the advertisement in that window; and removes the pop up window before repeating this sequence. The result of the PopUp Java Player is that the user will view successive advertisements each for pre-defined time interval (which can vary from one advertisement to the next, as specified in the AdDescriptor files for each such advertisement) whenever the user transitions between one web page and the next. Once an advertisement is completely played and in the absence, as discussed above of any instructions in the AdDescriptor file to replay that advertisement, such as through, e.g., timer-based ad play, the associated AdDescriptor file is effectively "pulled off" the play queue.

In particular, downloading of advertisement files occurs, as discussed previously, continuously as effectively a background process, using a separate asynchronous thread. The stop method of the Transition Sensor (specifically Transition Sensor stop method 1800 as will be described below in conjunction with FIG. 18) is responsible for generating a play event to the AdController agent. This event notifies the agent of an opportunity to present a downloaded advertisement to the user. This stop method is called automatically by the client browser whenever a user transitions off a web page that contains the embedded advertising tag. In particular, this method invokes a start player method in the AdController agent. The start player method, in turn, invokes a similarly named method, in the event scheduler, which initiates and controls the presentation of advertisements during content page transitions. The event scheduler ensures all media files for an advertisement have been transparently downloaded before their presentation, as well as exercises control over actual execution of the appropriate player classes required to visibly render the advertisement. In that regard, the event scheduler instantiates and invokes a player class appropriate for the current advertisement by calling a start method of that class. This start method creates the player thread that performs visual rendering of the advertisement. Then, this start method calls a run method of the player thread in order to visually present the advertising media from the browser disk and RAM caches. Upon completion, based on the configuration of the advertisement, the run method, by executing its own stop method, terminates the advertisement either upon detecting a close request by the user or completion of ad play timeout. The stop method performs any player software termination and cleanup, finally executing a callback to the scheduler object.

4. Inter-Applet Events Involving Transition Sensor Applet 422

FIG. 10 depicts inter-applet events 1000 that occur within AdController agent 420 during execution of Transition Sensor applet 422.

As shown and discussed above, whenever a browser interprets and then executes advertising tag 40, specifically tag 42 therein, situated within content page 35, this causes the browser to download script 200 (see FIGS. 2A and 2B) from the agent server. This applet, in turn, dynamically writes Transition Sensor applet 210 into the referring web content page. As discussed above, once this applet is instantiated executed by the client browser, the applet, in turn, instantiates applet registry 426.

Once the applet registry is instantiated, the Transition Sensor queries the registry, this operation being symbolized by line 1015, to determine current status of the AdController applet. If, as symbolized by line 1020, the registry indicates that the AdController applet is not loaded and hence is not executing, then Transition Sensor applet 422 loads, as symbolized by line 1025, AdController applet 424 from the browser disk cache, and then instantiates and starts this applet. Once the AdController applet is instantiated, the Transition Sensor applet writes, as symbolized by line 1030, appropriate entries, indicating that both the Transition Sensor applet is loaded and, as symbolized by Transition Sensor applet is loaded and, as symbolized by line 1035, that the AdController applet is loaded, into the applet registry. Once this occurs, then the applet registry returns, as symbolized by line 1040, an appropriate handle for the AdController applet to the Transition Sensor in order to permit the latter to refer to the former. Thereafter, as symbolized by line 1060, the Transition Sensor passes, as discussed above a request containing an Internet address of an advertisement management system to the AdController applet to download an AdDescriptor file, for an advertisement, from that address. This address is specified in tag 44 of advertising tag 40 and, as symbolized by dashed line 1050, incorporated into the request. Thereafter, the Transition Sensor, in response to a user-initiated transition (click-stream) to a next content web page, executes its stop method (method 1800 shown in FIG. 18) to instruct, i.e., issue a request to, as symbolized by line 1065, the AdController applet to play a fully downloaded advertisement having its corresponding AdDescriptor file then situated at the head of the play queue. Once this occurs, the Transition Sensor applet terminates its execution until the browser next encounters, interprets and executes a content page containing advertising tag 40 at which point the Transition Sensor applet is re-loaded ard re-started; and so forth.

5. Transition Sensor Applet 422

FIG. 11 depicts a high-level block diagram of basic processing threads that implement Transition Sensor applet 422.

As shown, in response to a Init (Initialize) Transition Sensor applet event produced by the client browser, a thread commences by executing block 1110 to initialize Transition Sensor applet 422. This thread, in turn, executes block 1120 to load AdController applet 424 from browser disk cache or download it from the agent server, if necessary, and then load it. Thereafter, this thread executes block 1130 to obtain the Internet address of an advertising management system (e.g., system 25 shown in FIGS. 1B and 1C, 2A and 2B, and 10) in tag 44 from advertising tag 40.

As shown in FIG. 11, in response to a Start Transition Sensor applet event generated by the client browser, another thread commences by executing block 1140 to enable Ad Downloader process 1700 (as discussed above, and to be discussed in detail below in conjunction with FIG. 17) to commence "polite" downloading an AdDescriptor file and all required and associated advertisement files (both media and player) into the browser disk cache.

Further, as shown in FIG. 11, in response to a Stop Transition Sensor applet event generated by the client browser, a third thread commences by executing block 1150 to disable Ad Downloader process 1700 and thus suspend further downloading of advertisement files. Once this occurs, this thread then executes block 1160 to instruct the AdController applet to play a fully downloaded advertisement having its corresponding AdDescriptor file then situated at the head of the play queue.

Figure 12:
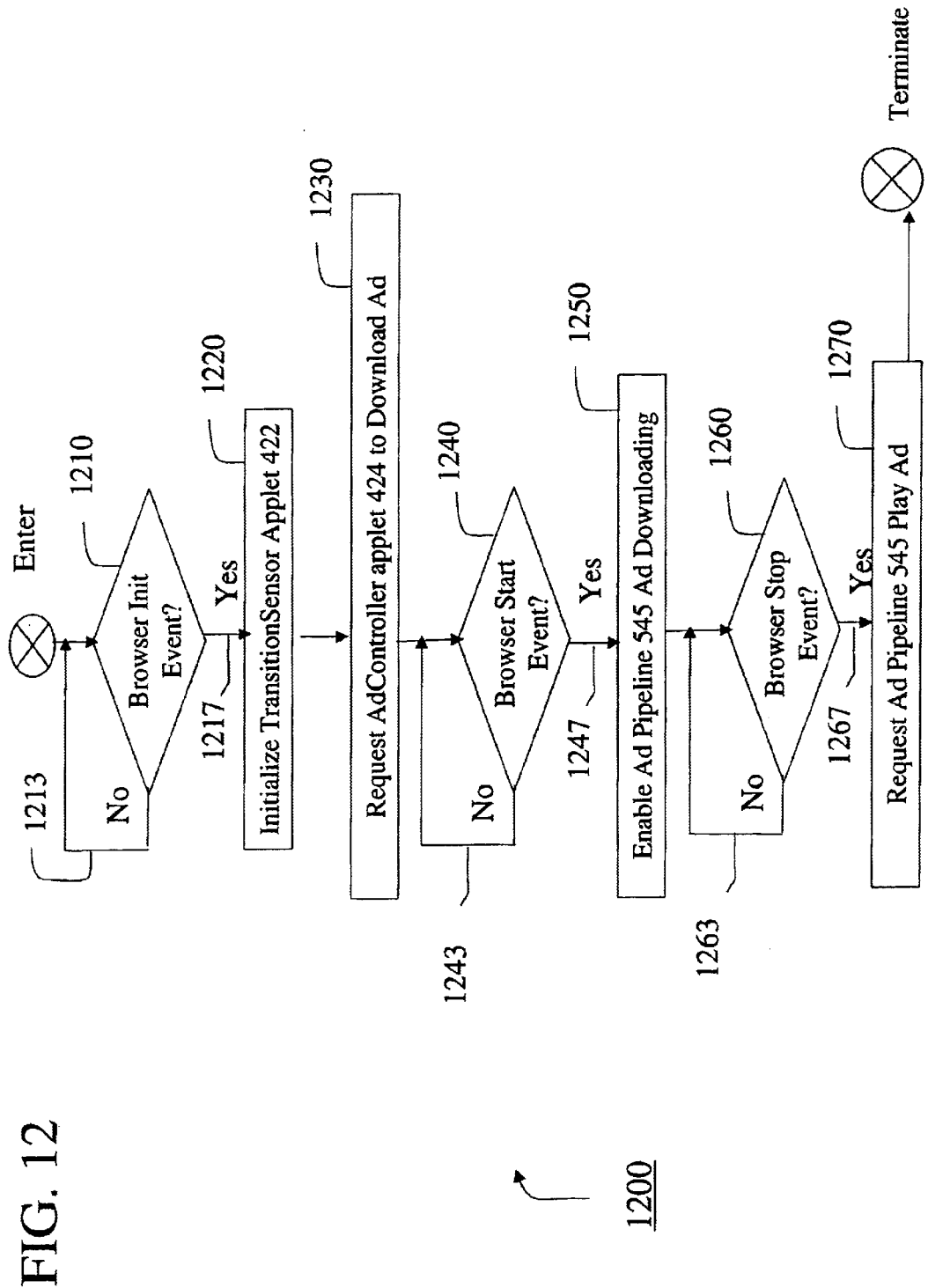
FIG. 12 depicts a high-level flowchart of processing operations 1200 performed by Transition Sensor applet 422 shown in FIG. 11.

FIG. 12 depicts a high-level flowchart of processing operations 1200 performed by Transition Sensor applet 422.

Upon entry in operations 1200, decision block 1210 tests for an occurrence of an init event produced by the client browser. Until such an event occurs, execution loops back, via NO path 1213, to block 1210. When this event occurs, execution proceeds, via YES path 1217 to block 1220 which, when performed, initializes Transition Sensor applet 422. Thereafter, block 1230 is performed through which the Transition Sensor applet 424 instructs, by issuing a request to, the AdController applet to download an advertisement, specifically as discussed above an AdDescriptor file from an ad management server specified in the advertising tag. Once this occurs, decision block 1243 tests for an occurrence of a Transition Sensor start event generated by the client browser. Until such an event occurs, execution loops back, via NO path 1243, to block 1240. When this particular event occurs, execution proceeds, via YES path 1247 to block 1250 which, when performed, enables Ad Pipeline 545 to download the AdDescriptor file and associated advertising files.

Next, decision block 1260 tests for an occurrence of a Transition Sensor stop event generated by the client browser. Until such an event occurs, execution loops back, via NO path 1263, to block 1260. When a Transition Sensor stop event occurs, execution then proceeds, via YES path 1267 to block 1270 which, when performed, requests that AdController applet 424, specifically via Ad Pipeline 545, then play an advertisement.

6. Ad Loader Process 1300

Figure 13:
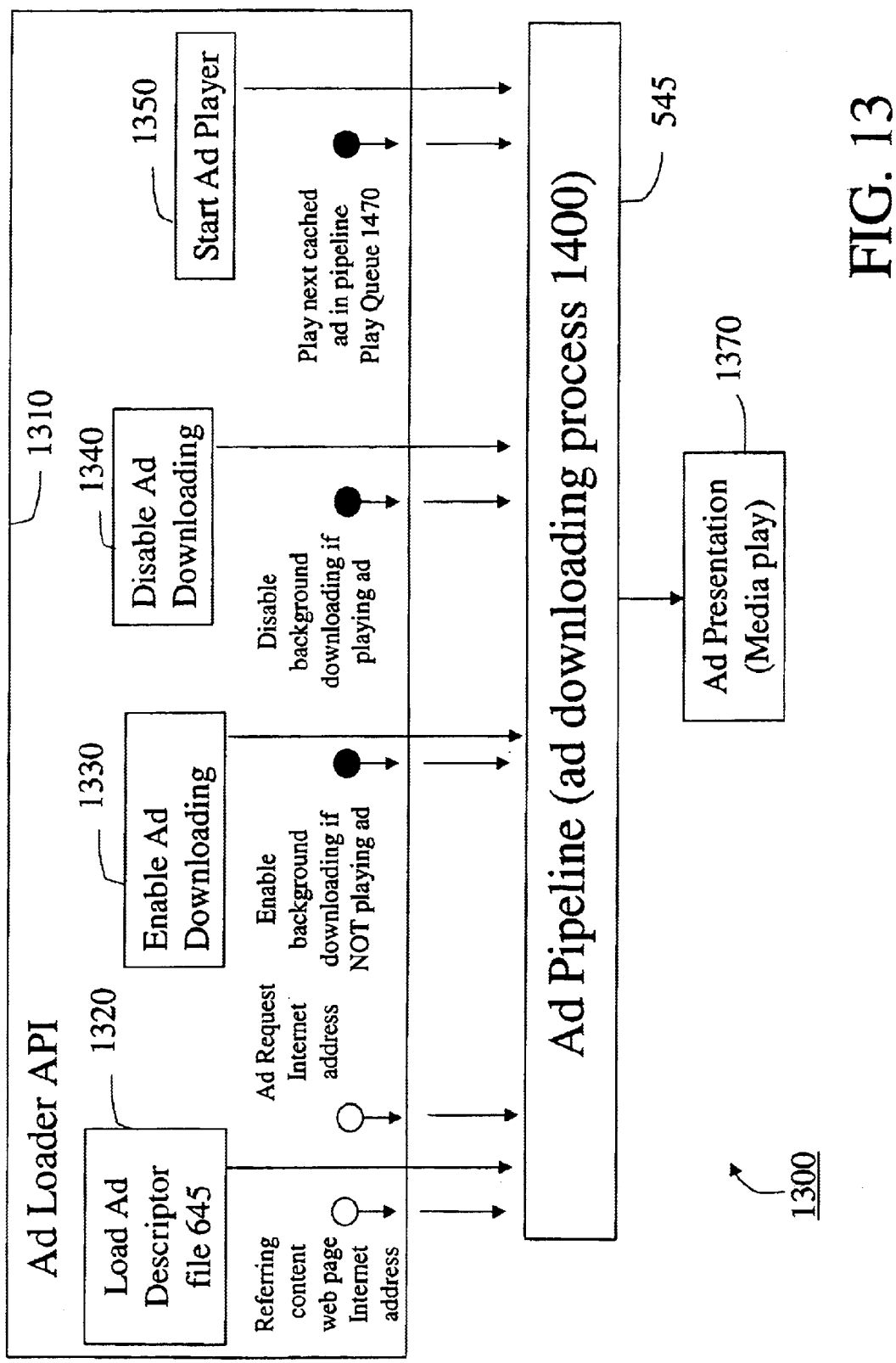
FIG. 13 depicts a high-level block diagram of Ad Loader process 1300 which can be used to provide advertiser control over various functions, for advertisement play and logging, implemented by AdController applet 424.

FIG. 13 depicts a high-level block diagram of Ad Loader process 1300 which forms a portion of AdController applet 424. Process 1300 provides an advertiser (specifically an advertising programmer) with control over various functions, for advertisement play and logging, implemented by the AdController applet, specifically how and where this applet retrieves advertisements across a networked connection and how those advertisements are played. Through use of the Ad Loader, the AdController applet can be controlled, to an extent desired, by external programmatic calls.

As shown, this process includes Ad Loader API (application programming interface) 1310 which interfaces to Ad Pipeline 545 and through this pipeline controls how advertisements are presented, as symbolized by block 1370, by the player mechanisms. In particular, the Ad Loader API provides information regarding and, through setting various program variables, permits programmer control over advertisement display and downloading operations. In that regard, these variables provide a callback to the AdController applet indicating when a content page to which the user has just transitioned has completed its downloading; and can be used to: instruct the AdController applet when to download a next advertisement, when to play a next advertisement fully queued in the Ad Pipeline, start and stop a play timer (for use with, e.g., timer based ad play, as discussed above), log a message, set a mode so as to specify a desired location to display advertisements, suspend and resume download of advertisement files into the Ad Pipeline, suspend a current download for a given period of time, and suspend and resume advertisement play by the player mechanisms.

In that regard, the Ad Loader API configures Ad Pipeline 545 such that AdDescriptor file 645 is downloaded, as symbolized by block 1320, from a remote ad management system into the Ad Pipeline in response to receipt of an Internet address of an ad management system and, for targeted advertisements, a URL of a referring web page address. As symbolized by block 1330, the API configures the Ad Pipeline such that advertisement downloading is enabled only when AdController applet 424 is not playing an advertisement. Furthermore, as symbolized by block 1340, the API configures the Ad Pipeline such that advertisement downloading is disabled whenever the AdController applet is playing an advertisement. Furthermore, as symbolized by block 1350, the API configures the Ad Pipeline such that advertisement play is to commence in response to a request to play a next advertisement, i.e., one that is fully cached in the browser disk cache and having its AdDescriptor file then situated at the head of the play queue.

7. Ad Pipeline 545

FIG. 14 depicts a high-level block diagram of Ad Pipeline 545. As discussed above, the Ad Pipeline implements various threads and data structures which collectively load advertising files (needed media and player files) into the browser disk cache and, for media files, also into browser RAM cache, and then present fully downloaded advertisements. As noted, the Ad Pipeline employs Ad Producer process 1500, Ad Location process 1600 and Ad Downloader process 1700 (all of these processes, as noted above, are also threads).

In response to an incoming request to download an advertisement, Ad Pipeline 545 is invoked. Specifically, within this pipeline, first block 1410 executes to invoke Ad Producer process 1500 in response to an incoming request to download an advertisement. As discussed above, this request, issued by the Transition Sensor applet, includes an Internet address of a remote ad management system (e.g., system 25 shown in FIGS. 1B and 1C) on which an advertisement resides and is to be downloaded (through agent server 15 as a proxy server). Ad Producer process 1500, as will be discussed below in conjunction with FIG. 15, requests advertisement files, specifically an AdDescriptor file (e.g., file 645), from an Internet address specified in the request. During its execution, the Ad Producer process waits until it receives the Internet address of the remote advertising management system, whereupon this process then downloads AdDescriptor file 645 from the specified ad management system. Once this file has been downloaded, block 1420, shown in FIG. 14, executes to invoke Ad Location process 1600 (which will be discussed in detail below in conjunction with FIG. 16). During its execution, Ad Location process 1600 blocks until such time as AdDescriptor file 645 is fully downloaded by Ad Producer process 1500 and is provided to the Ad Location process, whereupon the Ad Location process writes this AdDescriptor file into download queue 1430.

After AdDescriptor file 645 has been written into the download queue, Ad Location process 1600, as will be discussed below in conjunction with FIG. 16, performs the following tasks: (a) on startup of process 1600, this process creates an Ad Producer object; (b) this process asks Ad Producer process 1500 for next AdDescriptor file 645; and (c) once process 1600 obtains AdDescriptor file 645 and, if download queue 1430 is not full, process 1600 writes that file into this queue. If this queue is then full, process 1600 simply waits until the queue is not full before writing the AdDescriptor file into the queue. Once the AdDescriptor file has been completely downloaded, Ad Location process 1600 inserts, as shown in block 925, this file into download queue 1430.

Once AdDescriptor file 645 is inserted into the download queue, then block 1440 executes to invoke Ad Downloader process 1700 Process 1700, which will be discussed below in conjunction with FIG. 17, performs a single chain of tasks. First, process 1700 blocks until such time as the downloaded AdDescriptor file has become available in the download queue. During its execution, this process asks download queue 1430 if it contains an AdDescriptor file, e.g., file 645. If so, then advertising files need to be downloaded for that particular AdDescriptor file. If the download queue is empty, then process 1700 both waits until that queue is not empty and also retrieves the AdDescriptor file over the network. Once Ad Downloader process 1700 has obtained this AdDescriptor file, process 1700 then downloads, all the media and required player files specified in the AdDescriptor file by using Browser Cache Proxy 1450, into browser disk (and RAM) cache 1460. Once all the advertising files have finished downloading, process 1700 moves the AdDescriptor file to play queue 1470. However, if the play queue is then full, the Ad Downloader process waits until play queue 1470 is not full before moving the AdDescriptor file into this queue for subsequent ad play. As discussed above, AdDescriptor file 645 for a fully queued ad (i.e., with its all the associated media and player residing on the client hard disk) is subsequently retrieved from play queue 1470 in response a request to play an advertisement, this request being issued in response to a Transition Sensor stop event.

8. Ad Producer Process 1500

Figure 15:
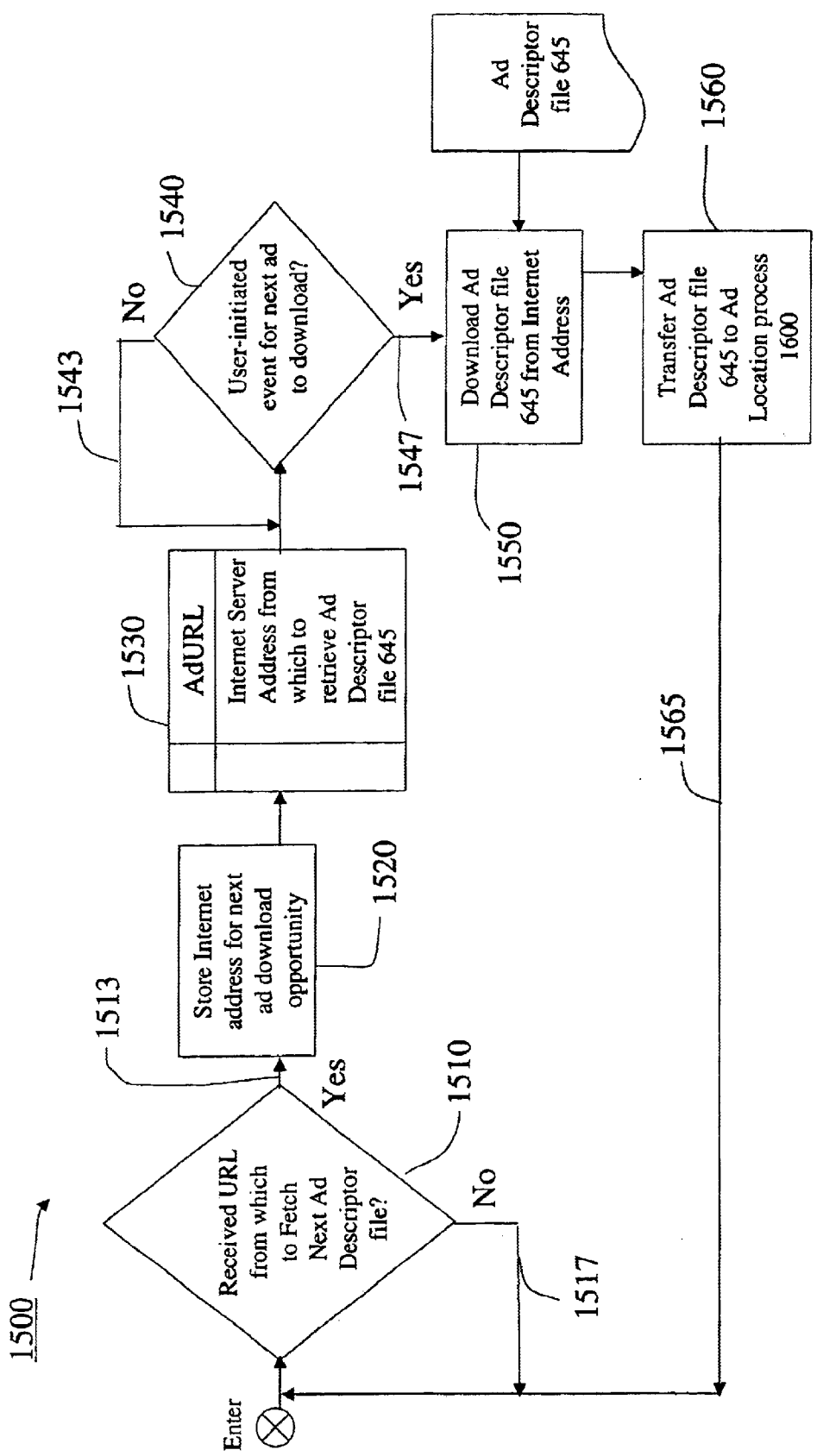
FIG. 15 depicts a high-level block diagram of Ad Producer process 1500 that is executed by Ad Pipeline 545 shown in FIG. 14.

FIG. 15 depicts a high-level block diagram of Ad Producer process 1500. As noted above, this process requests an AdDescriptor file from an Internet address communicated by the Transition Sensor applet and subsequently downloads that file in the browser disk cache.

As shown, upon entry into process 1500, execution first proceeds to decision block 1510. This ta block determines whether a URL has been received, from the Transition Sensor, from which to fetch an AdDescriptor file. If such a URL has not yet been received, then execution loops back, via NO path 1517, to this decision block. Alternatively, if such a URL has been received, then execution proceeds, via YES path 1513, to block 1520 which, in turn, stores this URL, as Ad URL 1530, for use during a next successive advertisement download opportunity.

Once this URL has been so stored, execution proceeds to decision block 1540. This block tests for an occurrence of a user-initiated event (click-stream) signifying that advertisement downloading can now occur, such as, e.g., when the user has just closed an existing advertisement frame and a next successive content page to which the user has transitioned is being rendered by the client browser. If such an event has not yet occurred, e.g., the next successive content web page is downloading, then execution merely loops back, via NO path 1543, back to decision block 1540. However, if such an event occurs, then this decision block routes execution, via YES path 1547, to block 1550. This latter block, when executed, downloads AdDescriptor file 645 using the URL communicated by the Transition Sensor. Once this file is completely downloaded, then block 1560 executes to transfer this file to Ad Location process 1600. Thereafter, execution loops back, via path 1565, to decision block 1510, and so forth.

9. Ad Location process 1600

Figure 16:
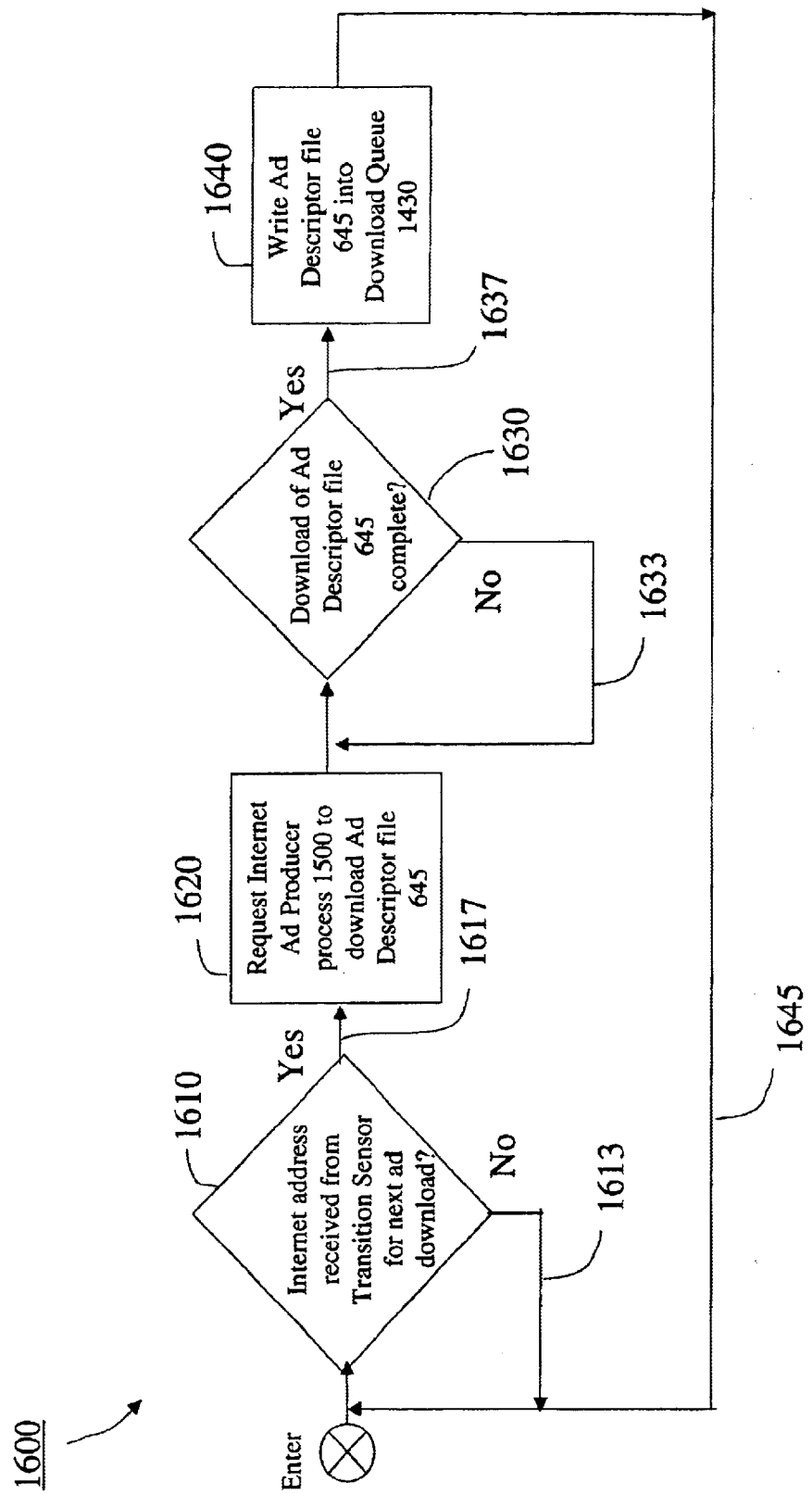
FIG. 16 depicts a high-level block diagram of Ad Location process 1600 that is also executed by Ad Pipeline 545 shown in FIG. 14.

FIG. 16 depicts a high-level block diagram of Ad Location process 1600. This process, as discussed above, accomplishes the following tasks: (a) on startup of this process, process 1600 creates an Ad Producer object; (b) process 1600 asks Ad Producer process 1500 for next AdDescriptor file 645; and (c) once process 1600 obtains AdDescriptor file 645 and, if download queue 1430 (see FIG. 14) is not full, process 1600 then writes that file into this queue. If this queue is then full, process 1600 simply waits until the queue is not full before writing the AdDescriptor file into the queue.

Upon entry into process 1600 and with respect to advertisement downloading itself, execution proceeds to decision block 1610. This decision block, when executed, determines whether an Internet address (URL) of an ad management system has been received from the Transition Sensor applet for a next successive advertisement download. If that address has not yet been received, then execution merely loops back, via NO path 1613, to decision block 1610. Alternatively, if such an address has been received but not yet processed, then decision block 1610 routes execution, via YES path 1617, to block 1620. This latter block requests Ad Producer process 1500 to download an AdDescriptor file, e.g., file 645, from this URL. Once this request occurs, execution proceeds to decision block 1630 to determine whether this AdDescriptor file has been completely downloaded. If this file download is still occurring, then execution merely loops back, via NO path 1633, to block 1630 to await completion of the download. Once this download completes, decision block 1630 routes execution, via YES path 1637, to block 1640. This latter block writes the downloaded AdDescriptor file into download queue 1430 providing this queue is not full. Once this occurs, execution is directed, via path 1645, back to decision block 1610, and so forth.

10. Ad Downloader process 1700

Figure 17:
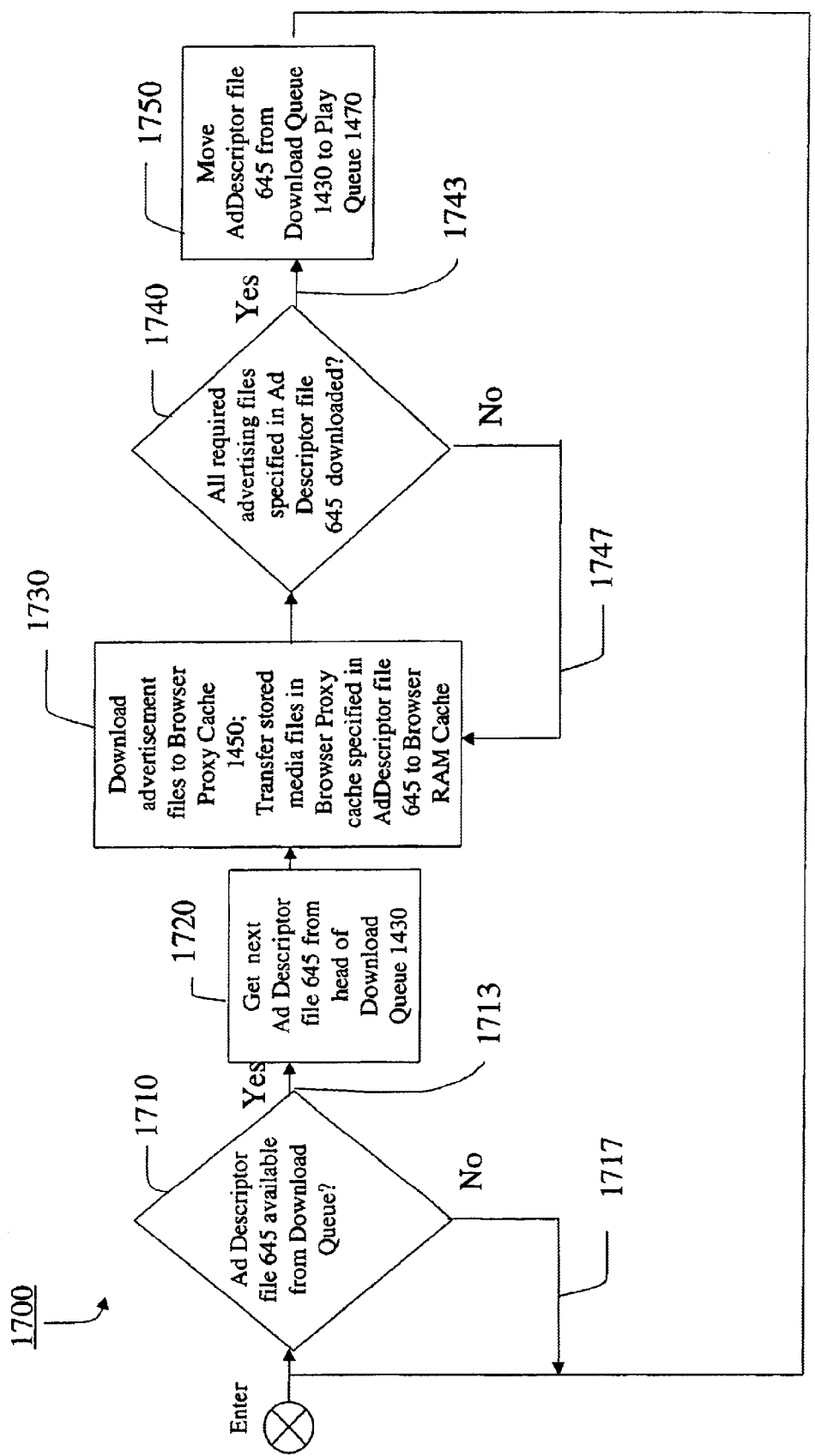
FIG. 17 depicts a high-level block diagram of Ad Downloader process 1700 that is also executed by Ad Pipeline 545 shown in FIG. 14.

FIG. 17 depicts a high-level block diagram of Ad Downloader process 1700. Essentially, as discussed above, process 1700 determines, from the download queue, if that queue contains an AdDescriptor file, e.g., file 645. If it does contain such an AdDescriptor file, then advertising files need to be downloaded for that file. Consequently, process 1700 then downloads required advertising files specified in that AdDescriptor file. Once this fully occurs, process 1700 moves the AdDescriptor file to the play queue.

In particular upon entry into process 1700, execution proceeds to decision block 1710. This decision block determines whether the download queue then contains an AdDescriptor file, e.g., file 645. If the queue is empty, then execution merely loops back, via NO path 1717, to this decision block to await such an AdDescriptor file. However, if download queue 1430 then contains such a file, process 1720 obtains the AdDescriptor file then situated at the head of this queue. Thereafter, block 1730 executes. This block downloads all the required advertising files, not than resident on the client hard disk, into browser proxy cache 1450. This block also transfers all the associated media files in the browser proxy cache to the browser RAM cache. Execution then proceeds to decision block 1740 which determines whether all required advertising files have then been downloaded. If any such file remains to be downloaded, then decision block 1740 routes execution, via NO path 1747, back to block 1730 to download that file. Alternatively, if all the required advertising files have been downloaded, then execution proceeds, via YES path 1743, to block 1750. This latter block moves the AdDescriptor file from download queue 1430 to an end of play queue 1470. Once the AdDescriptor file is written into the play queue, the corresponding advertisement is then ready to be presented to the user, in order relative to other AdDescriptor files then queued in the play queue, during an ensuing interstitial interval.

11. Transition Sensor Stop Method 1800

Figure 18:
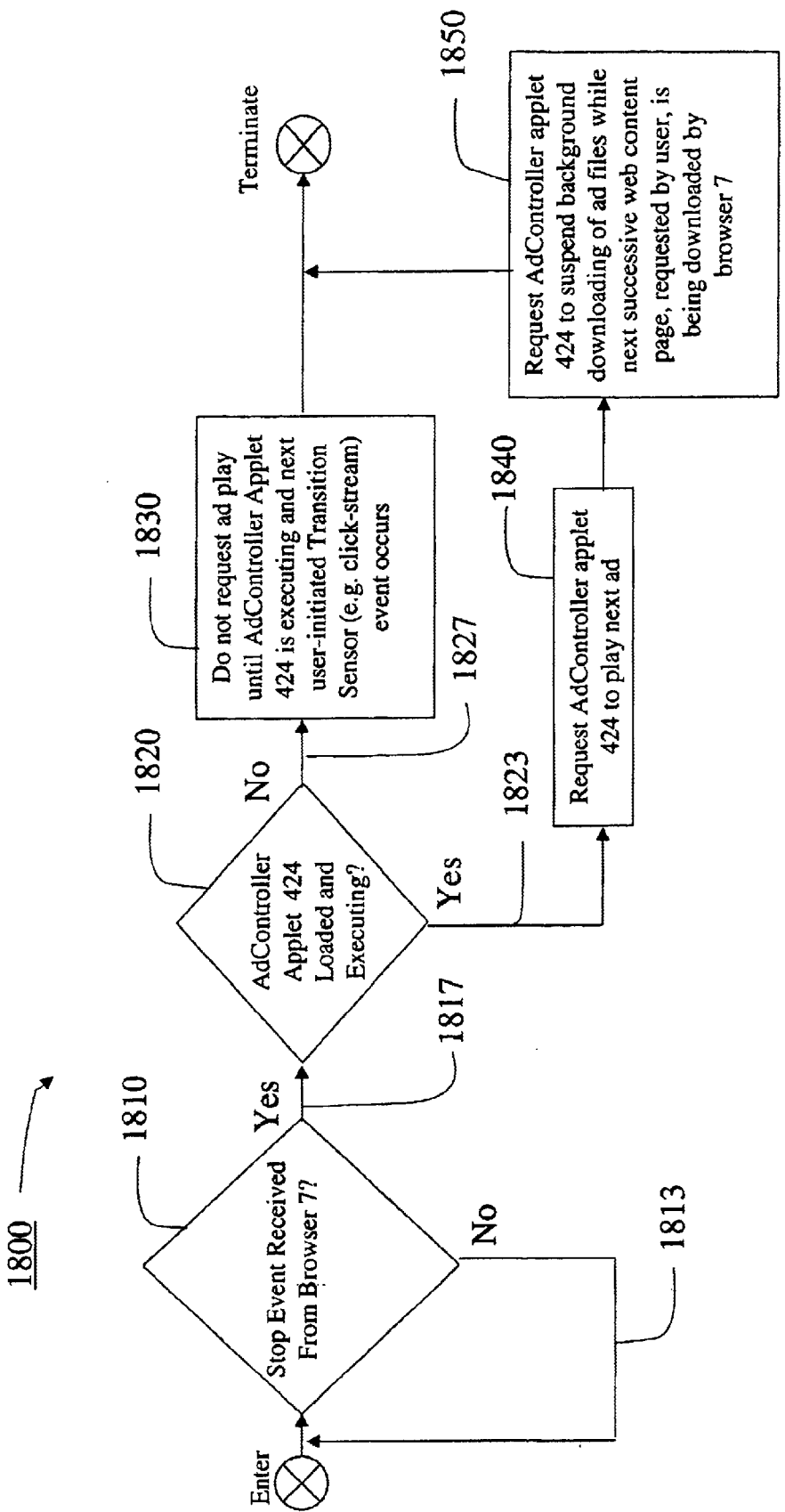
FIG. 18 depicts a flowchart of stop method 1800 invoked by Transition Sensor applet 422 shown in FIG. 4.

FIG. 18 depicts a flowchart of stop method 1800 invoked by Transition Sensor applet 422. This method, in response to a stop event generated by the browser, suspends downloading of advertisement files and initiates interstitial ad play.

In particular, upon entry into method 1800, decision block 1810 executes to determine if a stop event TV has been received from browser 7. If such a stop event has yet not occurred, then execution loops back, via NO path 1813, back to block 1810 to await occurrence of this event. When this event occurs, decision block 1810 directs execution, via YES path 1817, to decision block 1820. This latter decision block determines if AdController applet 424 is then loaded and executing. If this applet is not then executing, decision block 1820 routes execution, via NO path 1827, to block 1830. This latter block inhibits any request from being made to the AdController applet to play any advertisement until that applet is executing and, once that occurs, a next user-initiated (click-stream) event occurs. Thereafter, execution of method 1800 terminates. Alternatively, if the AdController applet is loaded and executing, then decision block 1820 routes execution, via YES path 1823, to block 1840. This latter block requests the AdController applet to play a next advertisement. Once this request is issued, then execution proceeds to block 1850. This block, in turn, requests the AdController applet to suspend "polite" background downloading of advertisement files while a next successive web content page, as requested by the user, is being downloaded by the browser. Once block 1850 executes, execution of method 1800 terminates.

12. Transition Sensor Start Method 1900

FIG. 19 depicts a flowchart of start method 1900 invoked by Transition Sensor applet 422. This method, in response to a start event generated by the browser, resumes background downloading of advertisement files.

Specifically, upon entry into method 1900, execution proceeds to decision block 1910 which, when executed, determines if a start event has been received from browser 7. If such a start event has not yet occurred, then execution loops back, via NO path 1913, back to block 1910 to await occurrence of this event. When this event occurs, decision block 1910 directs execution, via YES path 1917, to decision block 1920. This latter decision block determines if AdController applet 424 is then loaded and executing. If this applet is not then executing, decision block 1920 routes execution, via NO path 1927, to block 1930. Block 1930 inhibits any request from being made to the AdController applet to download any advertisement until that applet is executing and, once that occurs, a next user-initiated (click-stream) event occurs. Once the AdController applet begins executing and thereafter a next user-initiated (click-stream) event occurs, execution proceeds to block 1940. This latter block requests the AdController applet to resume background downloading of advertisement files. Once this downloading is resumed, method 1900, through execution of block 1960, waits for browser 7 to call Transition Sensor stop method 1800 whenever the user next unloads a web page currently rendered by the browser, i.e., causes a user initiated-event to transition to a next successive web page. Alternatively, if the AdController applet is loaded and executing, then decision block 1920 routes execution, via YES path 1923, to block 1950. Since at this point the next successive content web page has been fully executed by the browser and is, e.g., rendered to the user, block 1950 issues a request, through the apple: 115 registry, to the AdController applet to enable it to resume background downloading of advertisement files. Once this occurs, block 1940 is executed to issue a request to the AdController applet to resume the background downloading. Execution then proceeds to block 1960 to wait for browser 7 to call Transition Sensor stop method 1800 whenever the user next unloads a web page currently rendered by the browser, i.e., causes a user initiated-event to transition to a next successive web page. Whenever the browser generates a next Transition Sensor stop event, process 1900 terminates.

Although a single embodiment which incorporates the teachings of our present invention has been shown and described in considerable detail herein, those skilled in the art can readily devise many other embodiments and applications of the present invention that still utilize these teachings.

We claim:

1. Apparatus for a network server, for use in distributing an information object to a client computer, comprising:
   a processor; and
   a memory connected to the processor and storing computer executable instructions; and
   wherein the processor, in response to the instructions:
      receives a request from the client computer to download to the client computer an agent for rendering an information object, the request being issued by the client computer in response to execution, through a browser situated and executing in the client computer, of advertising code embedded in a web page to be displayed by the browser; and
      downloads, in response to the request, the agent to the client computer such that the agent is executed, under the browser, in the client computer for subsequently rendering the information object, wherein the request, when executed, by the browser causes the browser to dynamically write a plurality of predefined applet tags that collectively implement a script into the web page such that the script, when subsequently executed by the browser, causes the client computer to download the agent and instantiate and execute the agent.

2. The apparatus in claim 1 wherein the information object comprises a web advertisement and the code comprises advertising code.

3. The apparatus in claim 2 wherein the advertising code comprises a component which specifies the network server on which the agent resides, the network server being a distribution server.

4. The apparatus in claim 3 wherein the advertising code further comprises an advertising tag, and the agent downloaded from the distribution server.

5. The apparatus in claim 4 wherein the distribution server receives a request from the client computer, issued by the client computer as a result of the browser executing the tag, to download the script; and, in response to the request, downloads the script to the client computer.

6. The apparatus in claim 3 wherein the distribution server implements a proxy server, wherein a request issued by the client computer, as a result of executing an Ad Controller applet, to download a file is directed, via the proxy server, to an advertising server, and the file, as provided by the advertising server, is directed through the proxy server, to the client computer.

7. The apparatus in claim 6 wherein the file comprises an Ad Descriptor file.

8. The apparatus in claim 3 wherein the agent comprises first and second applets, wherein the client computer issues first and second requests to the distribution server to download, to the client computer, the first and second applets.

9. The apparatus in claim 8 wherein the first and second applets comprises a Transition Sensor and Ad Controller applets, respectively.

10. The apparatus in claim 9 wherein the advertising code comprises a component which specifies the network server on which the agent resides, the network server being a distribution server.

11. The apparatus in claim 10 wherein the advertising code further comprises an advertising tag, and the agent is downloaded from the distribution server.

12. The apparatus in claim 11 wherein the distribution server receives a request from the client computer, issued by the client computer as a result of the browser executing the tag, to download the script; and, in response to the request, downloads the script to the client computer.

13. The apparatus in claim 12 wherein the distribution server implements a proxy server, wherein a request issued by the client computer, as a result of executing an Ad Controller applet, to download a file is directed, via the proxy server, to an advertising server, and the file, as provided by the advertising server, is directed through the proxy server, to the client computer.

14. The apparatus in claim 13 wherein the file comprises an Ad Descriptor file.

15. In conjunction with apparatus for a network server, the server having a processor, and a memory connected to the processor and storing computer executable instructions; a method, for use in distributing an information object to a client computer, comprising the steps, performed by the processor in response to the executable instructions, of:
   receiving a request from the client computer to download to the client computer an agent for rendering an information object, the request being issued by the client computer in response to execution, through a browser situated and executing in the client computer, of code embedded in a web page to be displayed by the browser; and
   downloading, in response to the request, the agent to the client computer such that the agent is executed, under the browser, in the client computer for subsequently rendering the information object, wherein the request, when executed, by the browser causes the browser to dynamically write a plurality of predefined applet tags that collectively implement a script into the web page such that the script, when subsequently executed by the browser, causes the client computer to download the agent and instantiate and execute the agent.

16. The method in claim 15 wherein the information object comprises a web advertisement and the code comprises advertising code.

17. The method in claim 16 wherein the advertising code comprises a component which specifies the network server on which the agent resides, the network server being a distribution server.

18. The method in claim 17 wherein the advertising code further comprises an advertising tag, and the agent is downloaded from the distribution server.

19. The method in claim 18 further comprising the steps, performed by the distribution server, of:
receiving a request from the client computer, issued by the client computer as a result of the browser executing the tag, to download the script; and
in response to the request, downloading the script to the client computer.

20. The method in claim 17, wherein the distribution server implements a proxy server, further comprising the steps, performed in the distribution server, of:
directing, to an advertising server, a request issued by the client computer, as a result of executing an Ad Controller applet, to download a file from the advertising server; and
directing the file, as provided by the advertising server, to the client computer.

21. The method in claim 18 wherein the file comprises an Ad Descriptor file.

22. The method in claim 17 wherein the agent comprises first and second applets, wherein the client computer issues first and second requests to the distribution server to download, to the client computer, the first and second applets.

23. The method in claim 22 wherein the first and second applets comprises a Transition Sensor and Ad Controller applets, respectively.

24. The method in claim 23 wherein the advertising code comprises a component which specifies the network server on which the agent resides, the network server being a distribution server.

25. The method in claim 24 wherein the advertising code further comprises an advertising tag, and the agent is downloaded from the distribution server.

26. The method in claim 25 further comprising the steps, performed by the distribution server, of:
receiving a request from the client computer, issued by the client computer as a result of the browser executing the tag, to download the script; and
in response to the request, downloading the script to the client computer.

27. The method in claim 26, wherein the distribution server implements a proxy server, further comprising the steps, performed in the distribution server, of:
directing, to an advertising server, a request issued by the client computer, as a result of executing the Ad Controller applet, to download a file from the advertising server; and
directing the file, as provided by the advertising server, to the client computer.

28. The method in claim 27 wherein the file comprises an Ad Descriptor file.

29. Apparatus for a network server, for use in distributing an information object to a client computer, comprising:
a processor; and
a memory connected to the processor and storing computer executable instructions; and
wherein the processor, in response to the instructions:
receives a request from the client computer to download to the client computer an agent for rendering an information object, the request being issued by the client computer in response to execution, through a browser situated and executing in the client computer, of advertising code embedded in a web page to be displayed by the browser, the agent having an Ad Controller applet; and
downloads, in response to the request, the agent to the client computer such that the agent is executed, under the browser, in the client computer for subsequently rendering the information object;
wherein the network server implements a proxy server, such that a request issued by the client computer, as a result of executing the Ad Controller applet, to download a file is directed to an advertising server, and the file, as provided by the advertising server, is directed through the network server to the client computer.

30. The apparatus in claim 29 wherein the information object comprises a web advertisement and the code comprises advertising code.

31. The apparatus in claim 30 wherein the advertising code comprises a component which specifies the network server on which the agent resides, the network server being a distribution server.

32. The apparatus in claim 31 wherein the advertising code further comprises an advertising tag, which when executed, by the browser causes the browser to dynamically write a plurality of predefined applet tags that collectively implement a script into the web page such that the script, when subsequently executed by the browser, causes the client computer to download the agent from the distribution server and instantiate and execute the agent.

33. The apparatus in claim 32, wherein the distribution server receives a request from the client computer, issued by the client computer as a result of the browser executing the tag, to download the script; and, in response to the request, downloads the script to the client computer.

34. The apparatus in claim 30 wherein the file comprises an Ad Descriptor File.

35. The apparatus in claim 30 wherein the agent comprises first and second applets, wherein the client computer issues first and second requests to the distribution server to download, to the client computer, the first and second applets.

36. The apparatus in claim 35 wherein the first and second applets comprise a Transition Sensor applet and the Ad Controller applet, respectively.

37. The apparatus in claim 36 wherein the advertising code comprises a component which specifies the network server on which the agent resides, the network server being a distribution server.

38. The apparatus in claim 37 wherein the advertising code further comprises an advertising tag, which when executed, by the browser causes the browser to dynamically write a plurality of predefined applet tags that collectively implement a script into the web page such that the script, when subsequently executed by the browser, causes the client computer to download the agent from the distribution server and instantiate and execute the agent.

39. The apparatus in claim 38 wherein the distribution server receives a request from the client computer, issued by the client computer as a result of the browser executing the tag, to download the script; and, in response to the request, downloads the script to the client computer.

40. The apparatus in claim 39 wherein the file comprises an Ad Descriptor File.

41. In conjunction with apparatus for a network server, the server having a processor, and a memory connected to the processor and storing computer executable instructions; a method, for use in distributing an information object to a client computer, comprising the steps, performed by the processor and in response to the executable instructions, of:

receiving a request from the client computer to download to the client computer an agent for rendering an information object, the request being issued by the client computer in response to execution, through a browser situated and executing in the client computer, of advertising code embedded in a web page to be displayed by the browser, the agent having an Ad Controller applet; and downloading, in response to the request, the agent to the client computer such that the agent is executed, under the browser, in the client computer for subsequently rendering the information object;

wherein the network server implements a proxy server, such that a request issued by the client computer, as a result of executing the Ad Controller applet, to download a file is directed to an advertising server, and the file, as provided by the advertising server, is directed through the network server to the client computer.

42. The method in claim 41 wherein the information object comprises a web advertisement and the code comprises advertising code.

43. The method in claim 42 wherein the advertising code comprises a component which specifies the network server on which the agent resides, the network server being a distribution server.

44. The method in claim 43 wherein the advertising code further comprises an advertising tag, which when executed, by the browser causes the browser to dynamically write a plurality of predefined applet tags that collectively implement a script into the web page such that the script, when subsequently executed by the browser, causes the client computer to download the agent from the distribution server and instantiate and execute the agent.

45. The method in claim 44 further comprising the steps, performed by the distribution server, of:

receiving a request from the client computer, issued by the client computer as a result of the browser executing the tag, to download the script; and in response to the request, downloading the script to the client computer.

46. The method in claim 43 wherein the file comprises an Ad Descriptor File.

47. The method in claim 43 wherein the agent comprises first and second applets, wherein the client computer issues first and second requests to the distribution server to download, to the client computer, the first and second applets.

48. The method in claim 47 wherein the first and second applets comprise a Transition Sensor applet and the Ad Controller applet, respectively.

49. The method in claim 48 wherein the advertising code comprises a component which specifies the network server on which the agent resides, the network server being a distribution server.

50. The method in claim 49 wherein the advertising code further comprises an advertising tag, which when executed, by the browser causes the browser to dynamically write a plurality of predefined applet tags that collectively implement a script into the web page such that the script, when subsequently executed by the browser, causes the client computer to download the agent from the distribution server and instantiate and execute the agent.

51. The method in claim 50 further comprising the steps, performed by the distribution server, of:

receiving a request from the client computer, issued by the client computer as a result of the browser executing the tag, to download the script; and in response to the request, downloading the script to the client computer.

52. The method in claim 51 wherein the file comprises an Ad Descriptor File.

* * * * *